(12) United States Patent
Sakaguchi et al.

(10) Patent No.: US 10,173,719 B2
(45) Date of Patent: Jan. 8, 2019

(54) ELECTRIC POWER STEERING APPARATUS

(71) Applicant: NSK Ltd., Tokyo (JP)

(72) Inventors: Toru Sakaguchi, Maebashi (JP);
Toshikazu Onoe, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/522,418

(22) PCT Filed: Dec. 24, 2015

(86) PCT No.: PCT/JP2015/085955
§ 371 (c)(1),
(2) Date: Apr. 27, 2017

(87) PCT Pub. No.: WO2016/104571
PCT Pub. Date: Jun. 30, 2016

(65) Prior Publication Data
US 2017/0327145 A1 Nov. 16, 2017

(30) Foreign Application Priority Data

Dec. 25, 2014 (JP) .................. 2014-262244
Sep. 16, 2015 (JP) .................. 2015-183271
Nov. 24, 2015 (JP) .................. 2015-228993

(51) Int. Cl.
*B62D 5/04* (2006.01)
*G05B 13/04* (2006.01)
(Continued)

(52) U.S. Cl.
CPC ......... *B62D 5/0487* (2013.01); *B62D 5/0424* (2013.01); *B62D 5/0463* (2013.01);
(Continued)

(58) Field of Classification Search
CPC ........ B62D 5/0463; B62D 6/00; B62D 1/166; B62D 5/0487; B62D 5/0424; B62D 3/12; G05B 13/04
See application file for complete search history.

(56) References Cited

U.S. PATENT DOCUMENTS 6,073,721 A * 6/2000 Grabowski ............ B62D 5/065
180/422
6,408,235 B1 * 6/2002 Tanke, II ............. B62D 5/0469
180/443
(Continued)

FOREIGN PATENT DOCUMENTS

EP 2 708 445 A2 3/2014
JP 06-004417 A 1/1994
(Continued)

OTHER PUBLICATIONS

International Search Report of PCT/JP2015/085955 dated Mar. 29, 2016 [PCT/ISA/210].
(Continued)

*Primary Examiner* — Stephen Holwerda
(74) *Attorney, Agent, or Firm* — Sughrue Mion, PLLC

(57) ABSTRACT

An electric power steering apparatus that calculates a first current command value based on at least a steering torque and performs an assist-control of a steering system by driving a motor based on the first current command value, including: a configuration of a model following control including a viscoelastic model as a reference model within a predetermined angle at front of a rack end, wherein an offset is given to input or output of the viscoelastic model for preventing an overheat, resulting in suppressing a rack end hitting.

31 Claims, 43 Drawing Sheets

(51) Int. Cl.
 *B62D 6/00* (2006.01)
 *B62D 3/12* (2006.01)
(52) U.S. Cl.
 CPC .............. *B62D 5/0469* (2013.01); *B62D 6/00* (2013.01); *B62D 3/12* (2013.01)

(56) References Cited

U.S. PATENT DOCUMENTS

| | | | |
|---|---|---|---|
| 2008/0281490 A1* | 11/2008 | Wittig .................. | B62D 5/0457 701/41 |
| 2008/0306655 A1* | 12/2008 | Ukai ...................... | B62D 5/046 701/42 |
| 2012/0232754 A1* | 9/2012 | Champagne ......... | B62D 5/0469 701/41 |

FOREIGN PATENT DOCUMENTS

| | | |
|---|---|---|
| JP | 2008-149971 A | 7/2008 |
| JP | 4115156 B2 | 7/2008 |
| WO | 2014/195625 A2 | 12/2014 |

OTHER PUBLICATIONS

International Preliminary Report on Patentability of PCT/JP2015/085955 dated Sep. 21, 2016 [PCT/IPEA/409].

* cited by examiner

PRIOR ART

FIRST EXAMPLE

SECOND EXAMPLE

FIG.31 EIGHTH EXAMPLE

FIG.41 TWELFTH EXAMPLE

TWELFTH EXAMPLE

FIG.46 THIRTEENTH EXAMPLE

ELECTRIC POWER STEERING APPARATUS

CROSS REFERENCE TO RELATED APPLICATIONS

This application is a National Stage of International Application No. PCT/JP2015/085955, filed Dec. 24, 2015, claiming priorities based on Japanese Patent Application Nos. 2014-262244, filed Dec. 25, 2014, 2015-183271, filed Sep. 16, 2015 and 2015-228993 filed Nov. 24, 2015, the contents of all of which are incorporated herein by reference in their entirety.

TECHNICAL FIELD

The present invention relates to an electric power steering apparatus that calculates a current command value based on at least a steering torque, drives a motor by using the current command value, and provides a steering system of a vehicle with an assist torque, and in particular to the electric power steering apparatus that sets a viscoelastic model as a reference (normative) model, decreases the assist torque by reducing the current command value near a rack end, decreases a striking energy by attenuating a force at an end hitting time, suppresses a hitting sound (a noisy sound) that a driver feels uncomfortable, and improves a steering feeling.

BACKGROUND ART

An electric power steering apparatus (EPS) which provides a steering system of a vehicle with an assist torque by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feed-back control of a motor current. The feed-back control adjusts a voltage supplied to the motor so that a difference between a current command value and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (Central Processing Unit) (including an MPU (Micro Processing Unit) and an MCU (Micro Controller Unit)), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31 to calculate a current command value Iref1, and the calculated current command value Iref1 is inputted into a subtracting section 32B, where a detected motor current value Im is subtracted from the current command value Iref1. A deviation I (=Iref1−Im) which is the subtracted result in the subtracting section 32B is controlled in the current control section 35 such as a proportional-integral (PI) control and so on. The voltage control value Vref obtained by the current control is inputted into a PWM-control section 36 which calculates duty command values, and PWM-drives the motor 20 through an inverter circuit 37 by means of a PWM signal. The motor current value Im of the motor 20 is detected by a motor current detector 38, and is inputted and fed back to the subtracting section 32B. Further, a rotational angle sensor 21 such as a resolver is connected to the motor 20 and a steering angle θ is detected and outputted.

In such the electric power steering apparatus, when a large assist torque from the motor is applied to the steering system near the maximum steering angle (the rack end) thereof, a strong impact (a shock) occurs at a time when the steering system reaches at the maximum steering angle, and the driver may feel uncomfortable because of generating the hitting noise (noisy sound) due to the shock.

Accordingly, the electric power steering apparatus that includes a steering angle judging means for judging whether the steering angle of the steering system reaches at a front by a predetermined value from the maximum steering angle and a correcting means for correcting which decreases the assist torque by reducing the power supplied to the motor when the steering angle reaches at a front by a predetermined value from the maximum steering angle, is disclosed in Japanese Examined Patent Application Publication No. H6-4417 B2 (Patent Document 1).

Further, the electric power steering apparatus disclosed in Japanese Patent No. 4115156 B2 (Patent Document 2) is that: the electric power steering apparatus that judges whether an adjustment mechanism becomes near an end position or not, controls a driving means so as to decrease a steering assist when the adjustment mechanism reaches at near the end position, and evaluates an adjustment speed determined by a position sensor in order to determine the speed when the adjustment mechanism approaches to the end position.

THE LIST OF PRIOR ART DOCUMENTS

Patent Documents

Patent Document 1: Japanese Examined Patent Application Publication No. H6-4417 B2
Patent Document 2: Japanese Patent No. 4115156 B2

SUMMARY OF THE INVENTION

Problems to be Solved by the Invention

However, since the electric power steering apparatus disclosed in Patent Document 1 decreases the power when the steering angle reaches at a front by a predetermined value from the maximum steering angle and the steering speed or the like is not entirely considered, it is impossible to perform a fine current-decreasing control. Patent Document 1 does not disclose the characteristics to decrease the assist torque of the motor and a concrete configuration is not shown.

Further, although the electric power steering apparatus disclosed in Patent Document 2 decreases an assist amount toward the end position, it adjusts the decreasing speed of the assist amount in response to a velocity approaching to the end position and sufficiently falls down the speed at the end position. However, Patent Document 2 shows only to vary the characteristic changing in response to the speed and is not subjected based on a physical model. Furthermore, since Patent Document 2 does not perform the feed-back control, there is a fear that the characteristic or the result vary depending on a road surface condition (a load state).

The present invention has been developed in view of the above-described circumstances, and it is an object of the present invention is to provide a high-performance electric power steering apparatus that constitutes a control system based on a physical model, constitutes a model following control that an output (a distance to a rack end) of a controlled object follows-up to an output of a reference model, eliminates or reduces the occurrences of a noisy sound and a shock force at an end hitting without giving any uncomfortable steering feeling to a driver. To provide an electric power steering apparatus that prevents overheat of the ECU and the motor which may occur when a steering holding state is continued at a front of the rack end, and takes a safety countermeasure against the model following control, is also another object of the present invention.

Means for Solving the Problems

The present invention relates to an electric power steering apparatus that calculates a first current command value based on at least a steering torque and performs an assist-control of a steering system by driving a motor based on the first current command value, the above-described object of the present invention is achieved by that comprising: a first converting section to convert the first current command value to a first rack axial force; a rack position converting section to convert a rotational angle of the motor to a judgment rack position; a rack end approach judging section to judge that a steering approaches to a rack end based on the judgment rack position and to output a rack displacement and a switching signal; a viscoelastic model following control section to generate, with a configuration of a model following control, a second rack axial force including the viscoelastic model as the reference model based on the first rack axial force, the rack displacement and the switching signal; a second converting section to convert the second rack axial force to a second current command value; and an overheat protection control section to calculate an offset, which is subtracted from the first rack axial force or an output of the viscoelastic model of the viscoelastic model following control section, based on vehicle state information; wherein the viscoelastic model following control section comprises: a feed-forward control section to output a third rack axial force by feed-forward controlling based on the first rack axial force; a feed-back control section to output a fourth rack axial force by feed-back controlling based on the rack displacement and the first rack axial force; a first switching section to switch-ON or -OFF an output of the third rack axial force by the switching signal; a second switching section to switch-ON or -OFF an output of the fourth rack axial force by the switching signal; and an adding section to output the second rack axial force by adding outputs of the first and second switching sections; wherein the assist-control is performed based on a third current command value obtained by adding the second current command value to the first current command value so as to suppress a rack end hitting.

Further, the above-described object of the present invention is achieved by that: comprising: a first converting section to convert the first current command value to a first rack axial force; a rack position converting section to convert a rotational angle of the motor to a judgment rack position; a rack end approach judging section to judge that a steering approaches to a rack end based on the judgment rack position and to output a rack displacement and a switching signal; a viscoelastic model following control section to generate, with a configuration of a model following control, a second rack axial force including the viscoelastic model as the reference model based on the first rack axial force, the rack displacement and the switching signal; a second converting section to convert the second rack axial force to a second current command value; and an overheat protection control section to calculate an offset, which is subtracted from the first rack axial force or an output of the viscoelastic model of the viscoelastic model following control section, based on vehicle state information; wherein the viscoelastic model following control section comprises: a feed-forward control section to output a third rack axial force by feed-forward controlling based on the rack displacement; a feed-back control section to output a fourth rack axial force by feed-back controlling based on the rack displacement and the first rack axial force; a first switching section to switch-ON or -OFF an output of the third rack axial force by the switching signal; a second switching section to switch-ON or -OFF an output of the fourth rack axial force by the switching signal; and an adding section to output the second rack axial force by adding outputs of the first and second switching sections; wherein the assist-control is performed based on a third current command value obtained by adding the second current command value to the first current command value so as to suppress a rack end hitting.

Furthermore, the above-described object of the present invention is achieved by that: comprising: a configuration of a model following control including a viscoelastic model as a reference model within a predetermined angle at front of a rack end; wherein a control output in the model following control is limited in a range by setting different upper limiting value and lower limiting value depending on a steering direction, and a rack end hitting is suppressed.

Effects of the Invention

Because the electric power steering apparatus according to the present invention constitutes a control system based on the physical model, it is possible to easily see daylight for a constant design. Since the present electric power steering apparatus constitutes the model following control so that the output (the distance to the rack end) of the controlled object follows-up to output of the reference model, the present invention has an advantage effect that a robust (tough) end-hitting suppressing-control becomes possible against variations of the load state (external disturbance) and the controlled object.

Further, since an offset is given to an input in the viscoelastic model or an output from the viscoelastic model, a current which passes through the motor is possible to be small, and the overheat of the ECU and the motor can be prevented.

Furthermore, since a range of the controlled output in the model following control is provided, an uncomfortable feeling due to an excessive controlled output can be suppressed.

MODE FOR CARRYING OUT THE INVENTION

Figure 1:
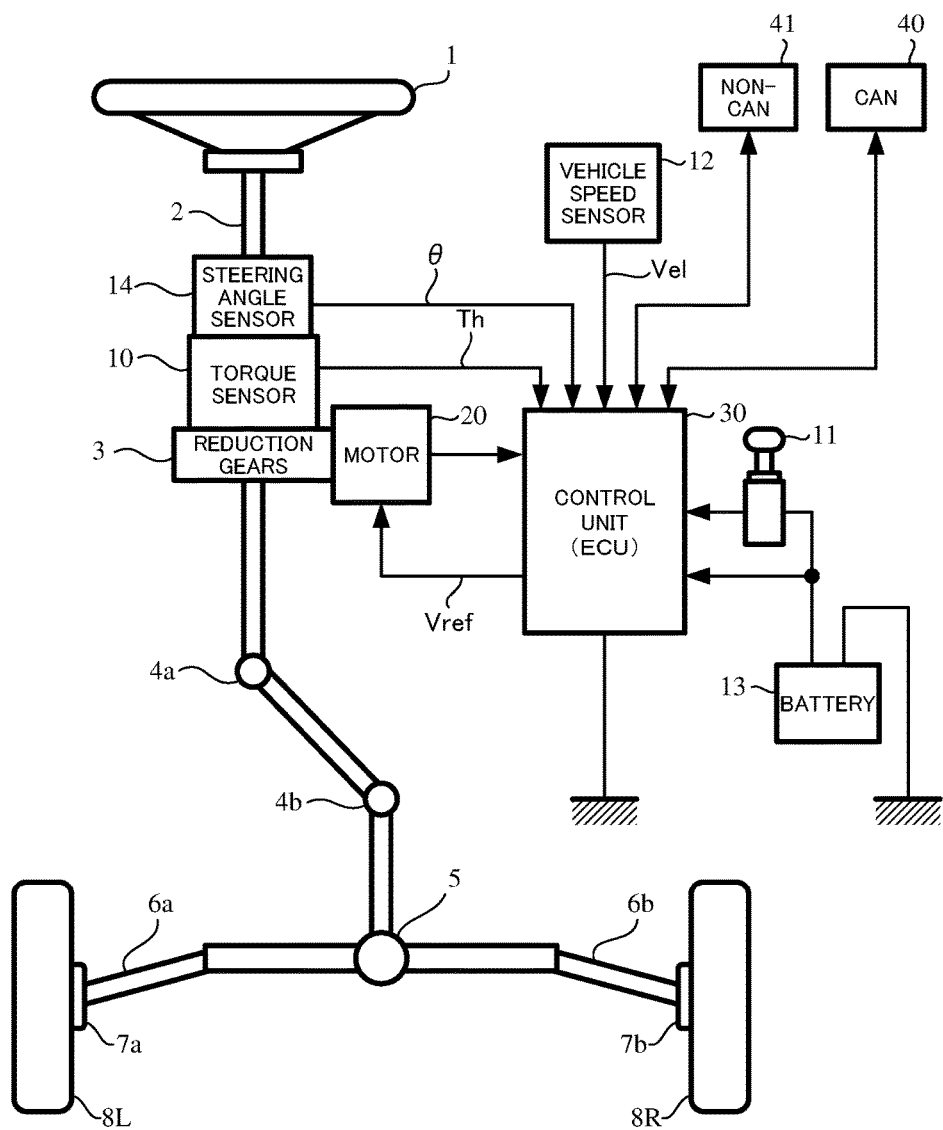
FIG. 1 is a configuration diagram illustrating a general outline of an electric power steering apparatus.

An electric power steering apparatus according to the present invention constitutes a control system based on a physical model near a rack end, sets a viscoelastic model (a spring constant and a viscous friction coefficient) as a reference (normative) model, constitutes a model following control so that an output (a distance to the rack end) of a controlled object follows-up to output of the reference model, eliminates or reduces an occurrence of a noisy sound at an end hitting time without giving a steering uncomfortable feeling to a driver, and attenuates a shock force.

The model following control comprises a viscoelastic model following control section, and the viscoelastic model following control section comprises a feed-back control section, or a feed-forward control section and a feed-back control section. The viscoelastic model following control section performs a normal assist-control out of a predetermined angle at front of the rack end, and performs the model following control within the predetermined angle at the front of the rack end so as to suppress the shock force at the rack end hitting time.

Further, a process that gives an offset to an input in a viscoelastic model or an output from the viscoelastic model (hereinafter referred to as "offset process") and a process that limits the maximum value of an assist force (hereinafter referred to as "maximum value limiting process") are performed in the present invention.

In the offset process, overheat of the ECU and the motor which may occur in a case of continuing a steering holding state at front of the rack end, is prevented by giving the offset to the input or the output of the viscoelastic model in the viscoelastic model following control section such that the motor current is small. Concretely, the offset is subtracted from a rack axial force or the column axial torque which is inputted into the viscoelastic model following control section, or a target rack displacement (a target steering angle) which is outputted from the viscoelastic model. Thereby, the rack axial force or the column axial torque, which is outputted from the viscoelastic model following control section, is suppressed, this suppression is fed-back to a current command value, and then a motor current becomes small. The offset is calculated at an overheat protection control section. The overheat protection control section judges (hereinafter referred to "offset calculating conditions" as the conditions used for this judgement) conditions that a large motor current passed in a steering holding state based on the current command value, a steering torque, a motor rotational speed or a rack displacement speed and so on which are vehicle state information, and then calculates the offset if the above state is continued. The gradually larger a value of the offset is, the smaller the motor current intermittently becomes. However, if a part of the condition of the steering holding state judgment is not established, an operation that the value of the offset becomes large is stopped. If a steering position is out of the predetermined angle at front of the rack end, the offset is reset to zero so as not to give. Further, by setting an upper limiting value for the offset, the motor current does not excessively becomes small. By setting a lower limiting value of the current command value instead of the upper limiting value of the offset, and the offset value is memorized as an upper limiting offset when the current command value becomes the lower limiting value, and keeping the offset value to the upper limit offset while the current command values is smaller than the lower limiting value, the motor current may not be excessively small. By performing the model following control and an offset assignment to the input/output of the viscoelastic model with an integration, the overheat protection is performed together with preventing the rack end hitting. In addition, by enabling both functions individually, it is possible to reduce a possibility that the current value is hunting (vibration) and a driver feels uncomfortable.

In the model following control, the assist force is outputted to balance a sum of a hand input of the driver and a counter force from tires so that a virtual rack end exists. Namely, in order not to progress the handle even if the steering arrive at the rack end when the driver turns the handle, the assist force is outputted so as to balance the sum of the hand input and the counter force from the tires (In a case that the friction between the tires and a road surface is extremely small, the sum is only the hand input of the driver). However, in this case, since the assist is performed to the reverse direction against the steering direction of the driver, the maximum value of the assist force due to a maximum limiting process is limited, considering a safety. Similarly, even in a case that the assist is performed to the same direction as the steering direction of the driver, the maximum value of the assist force is also limited.

Hereinafter, embodiments of the present invention will be described with reference to the accompanying drawings.

Figure 2:
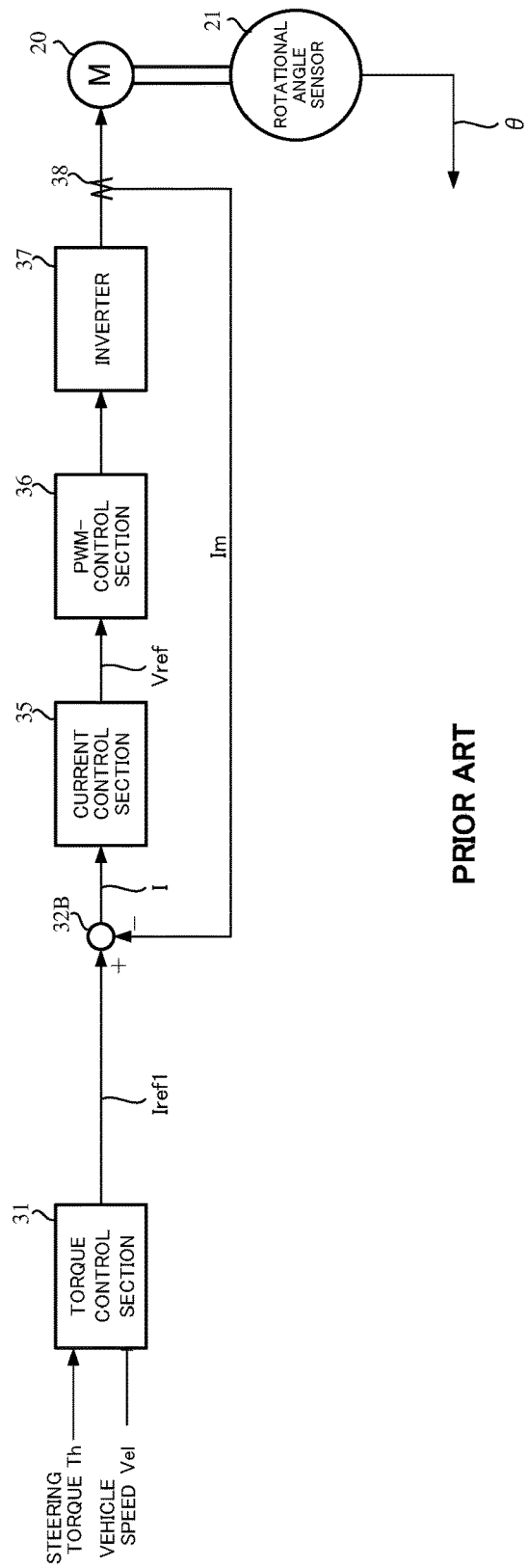
FIG. 2 is a block diagram showing a general configuration example of a control system of the electric power steering apparatus.
Figure 3:
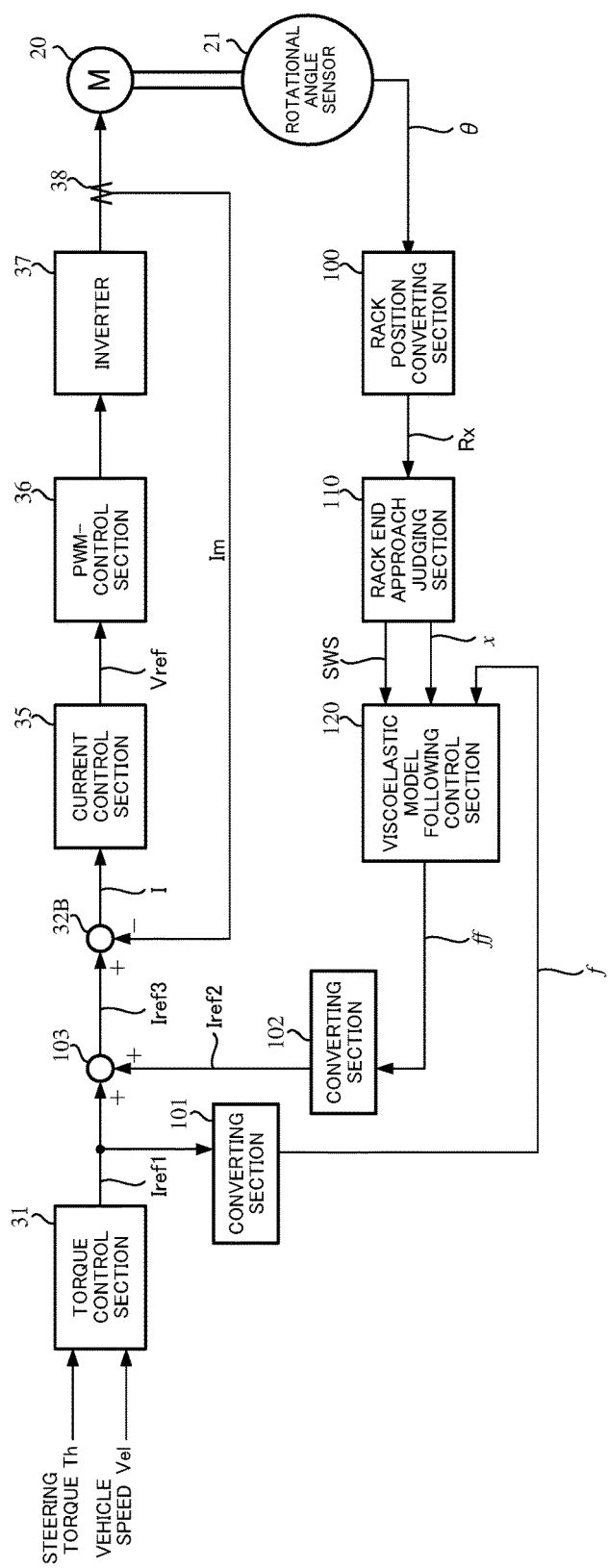
FIG. 3 is a block diagram showing a configuration example of the present invention.

FIG. 3 shows an example of the embodiment of the present invention corresponding to FIG. 2, a current command value Iref1 is converted to the rack axial force f in the converting section 101, and the rack axial force f is inputted into a viscoelastic model following control section 120. Although the rack axial force f is equivalent to a column shaft torque, the column shaft torque is conveniently considered as the rack axial force in the following explanation. The same configuration as that of FIG. 2 are designated with the same numerals of FIG. 2, and an explanation is omitted.

A conversion from the current command value Iref1 to the rack axial force f is performed based on the below Equation 1.

$$f = G1 \times Iref1 \qquad \text{[Equation 1]}$$

where, Kt is a torque constant [Nm/A], Gr is a reduction ratio, Cf is a stroke ratio [m/rev.], and $G1 = Kt \times Gr \times (2\pi/Cf)$.

Figure 4:
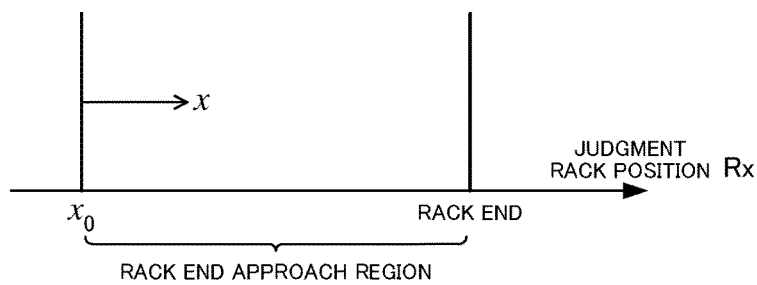
FIG. 4 is a diagram showing a characteristic example of a rack position converting section.

A rotational angle θ from a rotational angle sensor 21 is inputted into a rack position converting section 100 and is converted to a judgement rack position Rx. The judgement rack position Rx is inputted into a rack end approach judging section 110. As shown in FIG. 4, the rack end approach judging section 110 activates an end-hitting suppressing control function and outputs the rack displacement x and a switching signal SWS when the judgement rack position Rx is judged within a predetermined position $x_0$. The switching signal SWS and the rack displacement x are inputted into the viscoelasticmodel following control section 120 together with the rack axial force f. A rack axial force ff, which is control-calculated in the viscoelastic model following control section 120, is converted to the current command value Iref2 in a converting section 102. The current command value Iref2 is added to the current command value Iref1 in an adding section 103, and the added value is obtained as a current command value Iref3. The above described assist-control is performed based on the current command value Iref3.

As well, the predetermined position $x_0$ which sets a rack end approach region as shown in FIG. 4 enables to set an appropriate position. The predetermined position $x_0$ is not determined uniquely by using a rack ratio stroke, type of a vehicle, a feeling or the like, and normally sets at a front of the rack end whose range is 1 [mm] to 50 [mm]. Although a rotational angle θ is obtained from a rotational angle sensor 21 that is coupled to the motor, it may be obtained from a steering angle sensor.

The conversion from the rack axial force ff to the current command value Iref2 in the converting section 102 is performed based on the Equation 2.

$$Iref2 = ff/G1 \quad \text{[Equation 2]}$$

Figure 5:
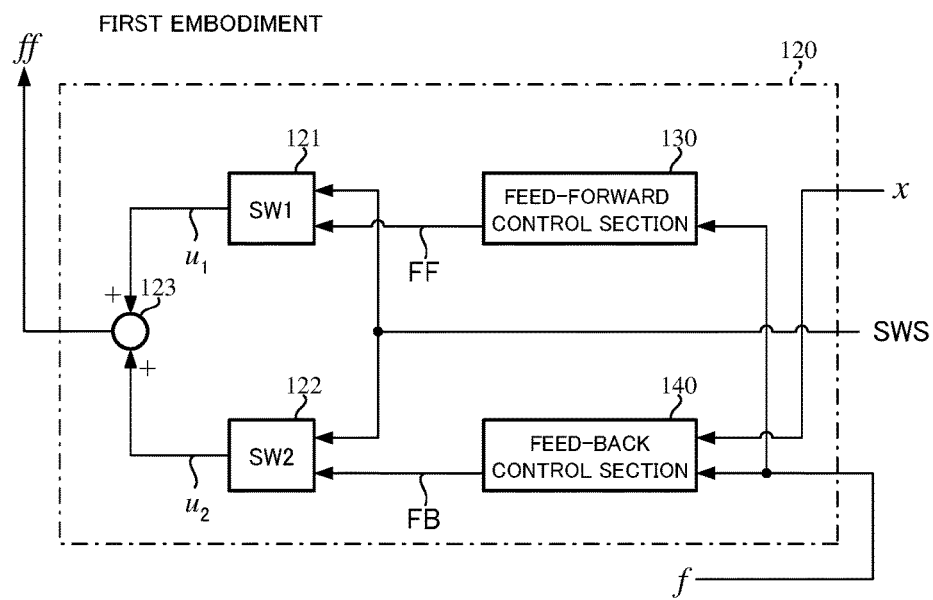
FIG. 5 is a block diagram showing a configuration example (the first embodiment) of a viscoelastic model following control section according to the present invention.
Figure 6:
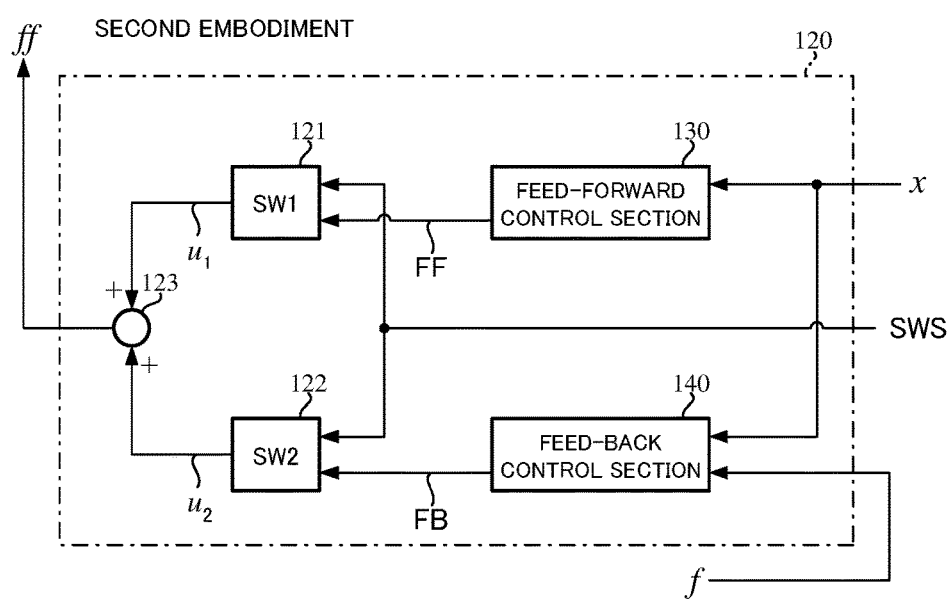
FIG. 6 is a block diagram showing a configuration example (the second embodiment) of a viscoelastic model following control section according to the present invention.

The detail of the viscoelastic model following control section 120 is shown in FIG. 5 or FIG. 6.

In the first embodiment shown in FIG. 5, the rack axial force f is inputted into a feed-forward control section 130 and a feed-back control section 140, and the rack displacement x is inputted into the feed-back control section 140. A rack axial force FF from the feed-forward control section 130 is inputted into a switching section 121, and a rack axial force FB from the feed-back control section 140 is inputted into a switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as a rack axial force $u_1$ and the rack axial force FB from the switching section 122 is outputted as a rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

Further, in the second embodiment shown in FIG. 6, the rack displacement x is inputted into a feed-forward control section 130 and a feed-back control section 140, and the rack axial force f is inputted into the feed-back control section 140. The following process is the same as that of the first embodiment, the rack axial force FF from the feed-forward control section 130 is inputted into the switching section 121, and the rack axial force FB from the feed-back control section 140 is inputted into the switching section 122. The switching sections 121 and 122 are switched-ON or -OFF by the switching signal SWS. When the switching sections 121 and 122 are switched-OFF by the switching signal SWS, each of outputs $u_1$ and $u_2$ is zero. When the switching sections 121 and 122 are switched-ON by the switching signal SWS, the rack axial force FF from the switching section 121 is outputted as the rack axial force $u_1$ and the rack axial force FB from the switching section 122 is outputted as the rack axial force $u_2$. The rack axial forces $u_1$ and $u_2$ from the switching section 121 and 122 are added in the adding section 123, and a rack axial force of the added value ff is outputted from the viscoelastic model following control section 120. The rack axial force ff is converted to the current command value Iref2 in the converting section 102.

Figure 7:
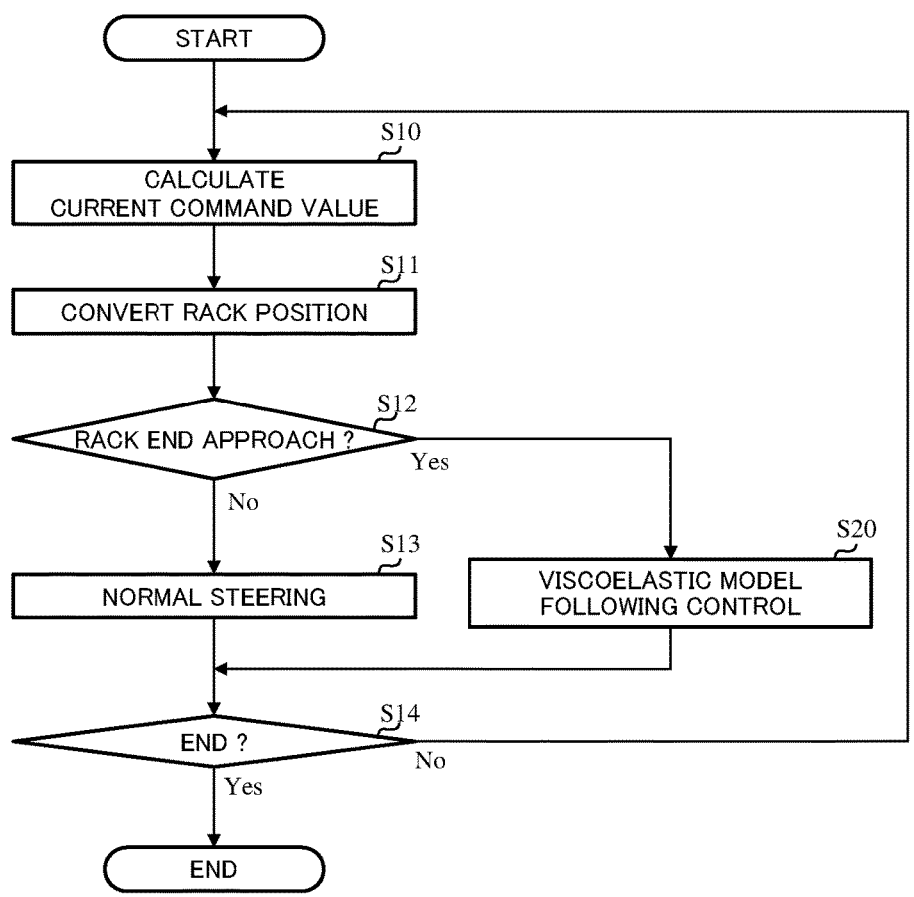
FIG. 7 is a flowchart showing an operation example (overall) of the present invention.
Figure 8:
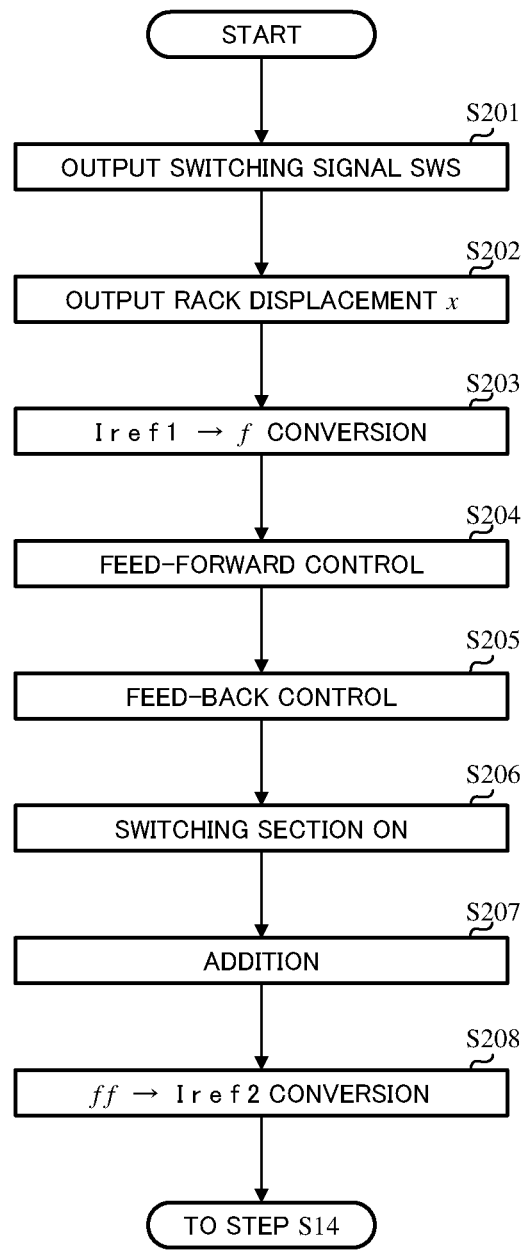
FIG. 8 is a flowchart showing an operation example of the viscoelastic model following control section.

In the above structures, an overall operation example is described with reference to a flowchart of FIG. 7, and then an operation example of the viscoelastic model following control (the first and second embodiments) is described with reference to a flowchart of FIG. 8.

In a start stage, the switching sections 121 and 122 are switched-OFF by the switching signal SWS. When the operation is started, the torque control section 31 calculates the current command value Iref1 based on the steering torque Th and the vehicle speed Vel (Step S10), and the rack position converting section 100 converts the rotational angle θ from the rotational angle sensor 21 to the judgement rack position Rx (Step S11). The rack end approach judging section 110 judges whether the rack position approaches near the rack end based on the judgement rack position Rx or not (Step S12). In a case that the rack position is not near the rack end, the rack axial force ff from the viscoelastic model following control section 120 is not outputted and normal steering control based on the current command value Iref1 is performed (Step S13). This control is continued to the end (Step S14).

On the other hand, in a case that the rack position is near the rack end, the viscoelastic model following control is performed in the viscoelastic model following control section 120 (Step S20). As shown in FIG. 8, the rack end approach judging section 110 outputs the switching signal SWS (Step S201) and the rack displacement x (Step S202). The converting section 101 converts the current command value Iref1 to the rack axial force f by using the Equation 1 (Step S203). In the first embodiment shown in FIG. 5, the feed-forward control section 130 performs the feed-forward control based on the rack axial force f (Step S204), and the feed-back control section 140 performs the feed-back control based on the rack displacement x and the rack axial force f (Step S205). Further, in the second embodiment shown in FIG. 6, the feed-forward control section 130 performs the feed-forward control based on the rack displacement x (Step S204), and the feed-back control section 140 performs the feed-back control based on the rack displacement x and the rack axial force f (Step S205). In both cases, the order of the feed-forward control and the feed-back control may be alternated.

The switching signal SWS from the rack end approach judging section 110 is inputted into the switching sections 121 and 122, and the switching sections 121 and 122 are switched-ON (Step S206). When the switching sections 121 and 122 are switched-ON, the rack axial force FF from the feed-forward control section 130 is outputted as the rack axial force $u_1$ and the rack axial force FB from the feed-back control 140 is outputted as the rack axial force $u_2$. The rack axial forces $u_1$ and $u_2$ are added in the adding section 123 (Step S207), and then the rack axial force ff which is the added result is converted to the current converting value Iref2 in the converting section 102 by using the Equation 2 (Step S208).

The viscoelastic model following control section 120 according to the present invention is a control system based on the physical model near the rack end, constitutes the model following control which sets the viscoelastic model (a spring constant $k_0$ [N/m] and a viscous friction coefficient $\mu$ [N/(m/s)]) as the reference model (input: a force and output: the physical model which is described in the displacement), and attenuates the shock force at a time to hit to the rack end.

Figure 9:
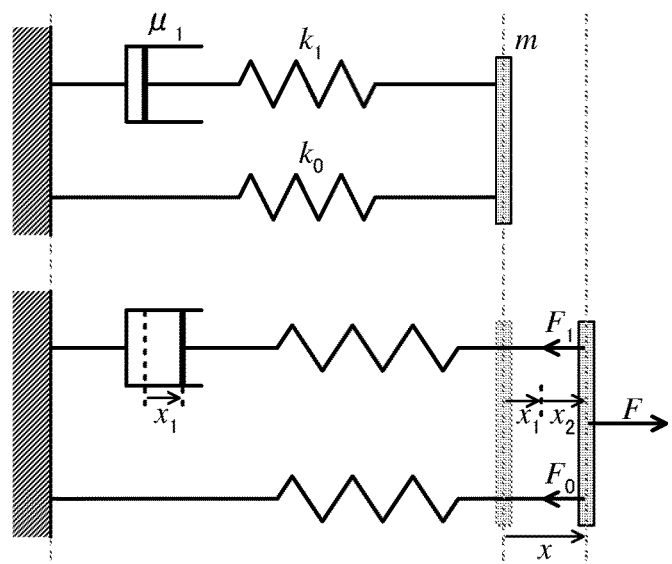
FIG. 9 is a schematic diagram of the viscoelastic model.

FIG. 9 is a schematic diagram near the rack end, and a relationship between mass m and forces $F_0$ and $F_1$ is represented by the Equation 3. The derivation of the equations of the viscoelastic model is described in, for example, "Elementary Mechanics for Elastic Membrane and Viscoelasticity" (Kenkichi OHBA) of "Engineering Sciences & Technology", Kansai University, official journal of a scientific society, Vol. 17 (2010).

$$F = m\ddot{x} + F_0 + F_1 \quad \text{[Equation 3]}$$

Assuming that spring constants $k_0$ and $k_1$ are defined for the rack displacements $x_1$ and $x_2$, respectively, and then the below Equations 4 to 6 are established.

$$x = x_1 + x_2 \quad \text{[Equation 4]}$$

$$F_0 = k_0 x \quad \text{[Equation 5]}$$

$$F_1 = \mu_1 \frac{dx_1}{dt} = k_1 x_2 \quad \text{[Equation 6]}$$

Therefore, the Equation 7 is obtained by substituting the Equations 4 to 6 into the Equation 3.

$$F = m\ddot{x} + k_0 x + k_1 x_2 \quad \text{[Equation 7]}$$
$$= m\ddot{x} + k_0 x + k_1(x - x_1)$$
$$= m\ddot{x} + (k_0 + k_1)x - k_1 x_1$$

The Equation 8 is a result that the Equation 7 is differentiated, and then the Equation 9 is obtained by multiplying the Equation 8 by "$\mu_1/k_1$".

$$\dot{F} = m\dddot{x} + (k_0 + k_1)\dot{x} - k_1 \dot{x}_1 \quad \text{[Equation 8]}$$

$$\frac{\mu_1}{k_1}\dot{F} = \frac{\mu_1}{k_1}m\dddot{x} + \frac{\mu_1}{k_1}(k_0 + k_1)\dot{x} - \mu_1 \dot{x}_1 \quad \text{[Equation 9]}$$

Then, the Equation 10 is obtained by adding the Equations 7 and 9.

$$F + \frac{\mu_1}{k_1}\dot{F} = \quad \text{[Equation 10]}$$
$$m\ddot{x} + \frac{\mu_1}{k_1}m\dddot{x} + (k_0 + k_1)x - k_1 x_1 + \frac{\mu_1}{k_1}(k_0 + k_1)\dot{x} - \mu_1 \dot{x}_1$$

The Equation 11 is obtained by substituting the Equations 4 and 6 to the Equation 10.

$$F + \frac{\mu_1}{k_1}\dot{F} = m\ddot{x} + \frac{\mu_1}{k_1}m\dddot{x} + k_0 x + \mu_1(1 + k_0/k_1)\dot{x} \quad \text{[Equation 11]}$$

Here, $\mu_1/k_1 = \tau_e$, $k_0 = E_r$, and $\mu_1(1/k_0 + 1/k_1) = \tau_\delta$ are assumed, the Equation 11 can be expressed by the Equation 12. The Equation 13 is obtained by performing Laplace transform to the Equation 12.

$$F + \tau_e \dot{F} = \tau_e m\dddot{x} + m\ddot{x} + E_r(x + \tau_\delta \dot{x}) \quad \text{[Equation 12]}$$

$$(1 + \tau_e s)F(s) = \{\tau_e m s^3 + m s^2 + E_r(1 + \tau_\delta s)\}X(s) \quad \text{[Equation 13]}$$

The Equation 14 is obtained by summarizing the Equation 13 with "$X(s)/F(s)$".

$$\frac{X(s)}{F(s)} = \frac{1 + \tau_e s}{\tau_e m s^3 + m s^2 + E_r(1 + \tau_\delta s)} \quad \text{[Equation 14]}$$

The Equation 14 represents a third order physical model (transfer function) which indicates the characteristic from the input force f to the output displacement x. When the spring with the spring constant "$k_1 = \infty$" is used, "$\tau_e \to 0$" is satisfied. Because of "$\tau_\delta = \mu_1 \cdot 1/k_0$", the Equation 15 which is a quadratic function is derived.

$$\frac{X(s)}{F(s)} = \frac{1}{m \cdot s^2 + \mu_1 \cdot s + k_0} \quad \text{[Equation 15]}$$

The quadratic function represented by the Equation 15 as the reference model Gm is described in the present invention. That is, a function represented by the Equation 16 is the reference model Gm. Here, "$\mu_1$" is equal to $\mu$ ($\mu_1 = \mu$).

$$Gm = \frac{1}{m \cdot s^2 + \mu \cdot s + k_0} \quad \text{[Equation 16]}$$

Next, an actual plant 146 of the electric power steering apparatus is represented by "P" which is denoted by the Equation 17. Then, when the reference model following control according to the present invention is designed by a two-degree-of-freedom control system, the system is a configuration of FIG. 10 expressed as actual models Pn and Pd. A block 143 (Cd) shows a control element section. (refer to, for example, Hajime MAEDA and Toshiharu SUGIE, "System Control Theory for Advanced Control", published by Asakura Shoten in Japan)

$$P = \frac{Pn}{Pd} = \frac{N}{D} = \frac{1}{m \cdot s^2 + \eta \cdot s} \quad \text{[Equation 17]}$$

In order to express the actual plant P with a ratio of a stable rational function, N and D are represented by the below Equation 18. A numerator of "N" is that of "P", and a numerator of "D" is a denominator of "P". However, "$\alpha$" is determined such that a pole of "$(s+\alpha)=0$" can be selected arbitrary.

$$N = \frac{1}{(s+\alpha)^2}, D = \frac{m \cdot s^2 + \eta \cdot s}{(s+\alpha)^2} \quad \text{[Equation 18]}$$

When the reference model Gm is applied to the configuration of FIG. 10, it is necessary to set "1/F" as the below Equation 19 in order to satisfy "x/f=Gm". As well, the Equation 19 is derived from the Equations 16 and 18.

$$\frac{1}{F} = Gm N^{-1} = \frac{(s+\alpha)^2}{m \cdot s^2 + \mu \cdot s + k_0} \quad \text{[Equation 19]}$$

A block N/F of the feed-back control section is represented by the below Equation 20.

$$\frac{N}{F} = \frac{1}{m \cdot s^2 + \mu \cdot s + k_0} \quad \text{[Equation 20]}$$

A block D/F of the feed-forward control section is represented by the below Equation 21.

$$\frac{D}{F} = \frac{m \cdot s^2 + \eta \cdot s}{m \cdot s^2 + \mu \cdot s + k_0} \quad \text{[Equation 21]}$$

In an example of the two-degree-of-freedom control system shown in FIG. 10, an input (the current command value corresponding to the rack axial force or the column axial torque) u to the actual plant P is represented by the below Equation 22.

$$u = u_1 + u_2 = \frac{D}{F}f + C_d e = \frac{D}{F}f + \left(\frac{N}{F}f - x\right)C_d \quad \text{[Equation 22]}$$

Further, an output (the rack displacement) x of the actual plant P is represented by the below Equation 23.

$$x = uP = P\frac{D}{F}f + P\left(\frac{N}{F}f - x\right)C_d = P\frac{D}{F}f + P\frac{N}{F}C_d f - PC_d x \quad \text{[Equation 23]}$$

When the Equation 23 is summarized and arranged the term of the output x to the left-hand side and the term of f to the right-hand side, the below Equation 24 is derived.

$$(1 + PC_d)x = P\left(\frac{D}{F} + \frac{N}{F}C_d\right)f \quad \text{[Equation 24]}$$

The below Equation 25 is obtained by expressing the Equation 24 as the transfer function of the output x against the input f. Here, the actual plant P is expressed as "P=Pn/Pd" after the third term.

$$\frac{x}{f} = \frac{P\left(\frac{D}{F} + \frac{N}{F}C_d\right)}{1 + PC_d} = \frac{\frac{Pn}{Pd}\left(\frac{D}{F} + \frac{N}{F}C_d\right)}{1 + \frac{Pn}{Pd}C_d} = \frac{\frac{D}{F} + \frac{N}{F}C_d}{\frac{Pd}{Pn} + C_d} = \frac{Pn}{F}\frac{NC_d + D}{PnC_d + Pd} \quad \text{[Equation 25]}$$

If the actual plant P is correctly expressed, it is possible to obtain the relations "Pn=N" and "Pd=D". The below Equation 26 is obtained from the Equation 25 since the characteristics of the output x against the input f is represented as "Pn/F (=N/F)".

$$\frac{x}{f} = \frac{Pn}{F}\frac{PnC_d + Pd}{PnC_d + Pd} = \frac{Pn}{F} \quad \text{[Equation 26]}$$

The characteristic of the output x against the input f (the reference model (the transfer function)) is considered as the Equation 27.

$$\frac{x}{f} = \frac{\omega_n^2}{s + 2\zeta\omega_n s + \omega_n^2} \quad \text{[Equation 27]}$$

It is possible to achieve the Equation 26 by putting "1/F" to the below Equation 28.

$$\frac{1}{F} = \frac{\omega_n^2}{s + 2\zeta\omega_n s + \omega_n^2}Pn^{-1} \quad \text{[Equation 28]}$$

Figure 10:
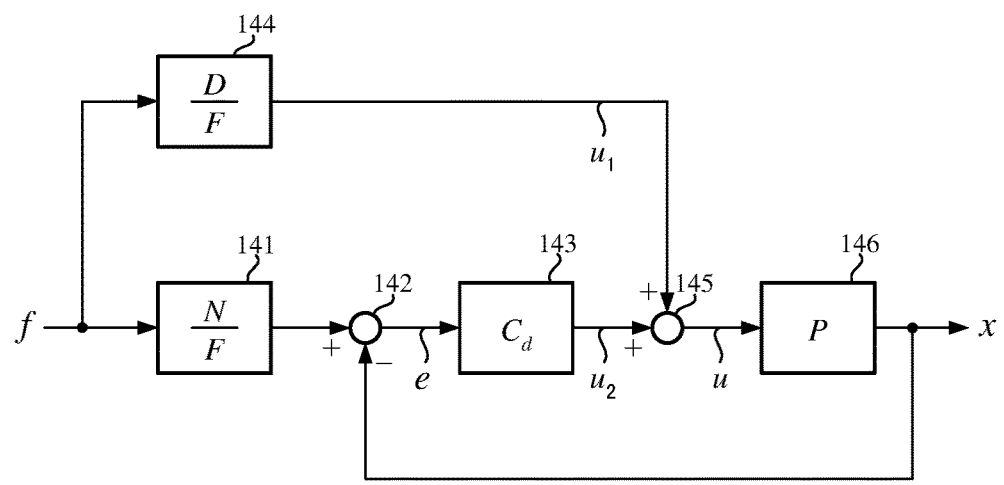
FIG. 10 is a block diagram showing detailed principle of the viscoelastic model following control section.
Figure 11A:
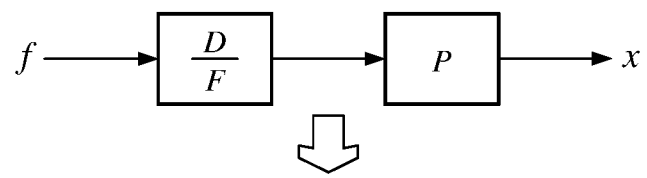
FIGS. 11A, 11B and 11C are block diagrams showing detailed principle of the viscoelastic model following control section.
Figure 11B:
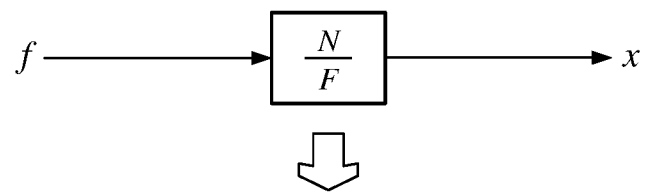
Figure 11C:
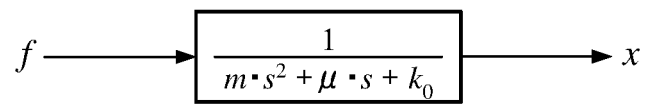

In FIG. 10, when the feed-forward control system is considered as a path of "a block 144→the actual plant P", this system is expressed as FIGS. 11A, 11B and 11C. Here, considering P as N/D (P=N/D), FIG. 11A can be expressed as FIG. 11B, and then FIG. 11C is obtained by using the Equation 20. Since an equation "f=(m·s²+μ·s+k₀)x" is satisfied from FIG. 11C, the below Equation 29 is obtained by performing an inverse Laplace transform to the equation "f=(m·s²+μ·s+k₀)x".

$$f = m\ddot{x} + \mu\dot{x} + k_0 x \quad \text{[Equation 29]}$$

Figure 12:
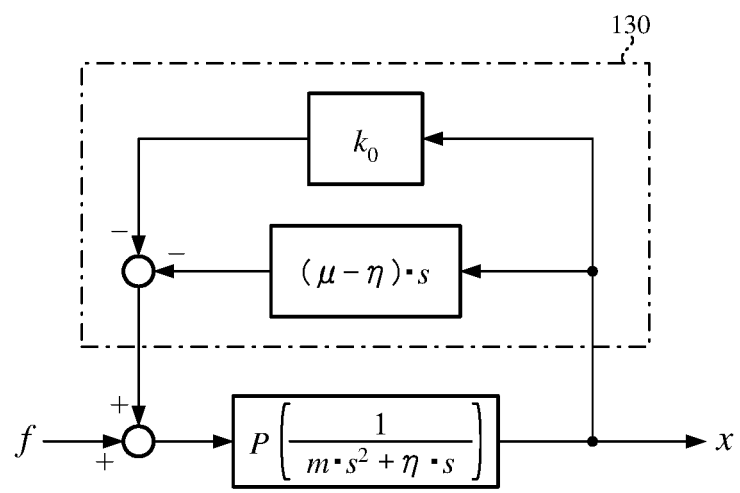
FIG. 12 is a block diagram showing detailed principle of the viscoelastic model following control section.

On the other hand, considering a transfer function block of the feed-forward control system as shown in FIG. 12, the below Equation 30 is satisfied in the input f and the output x.

$$\{f - (\mu - \eta) \cdot s \cdot x - k_0 x\}\frac{1}{m \cdot s^2 + \mu \cdot s} = x \quad \text{[Equation 30]}$$

The below Equation 31 is obtained by summarizing the Equation 30, and the below Equation 32 is derived by summarizing the Equation 31 with respect to the input f.

$$f - \{(\mu - \eta) \cdot s + k_0\} \cdot x = (m \cdot s^2 + \mu \cdot s)x \quad \text{[Equation 31]}$$

$$f = \{m \cdot s^2 + (\mu - \eta + \eta) \cdot s + k_0\} \cdot x \quad \text{[Equation 32]}$$

Figure 13:
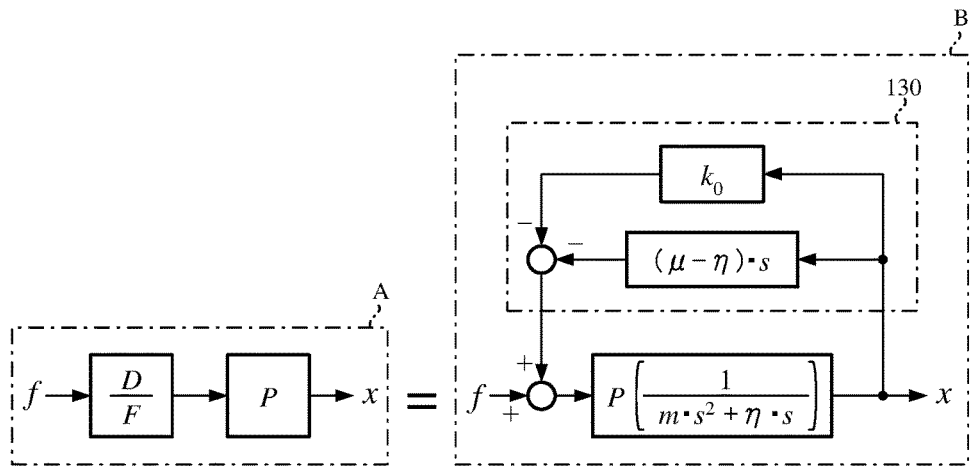
FIG. 13 is a block diagram showing detailed principle of the viscoelastic model following control section.

The above Equation 29 is obtained by performing the inverse Laplace transform on the Equation 32. Consequently, the feed-forward control sections A and B are equivalent each other as shown in FIG. 13.

Figure 14:
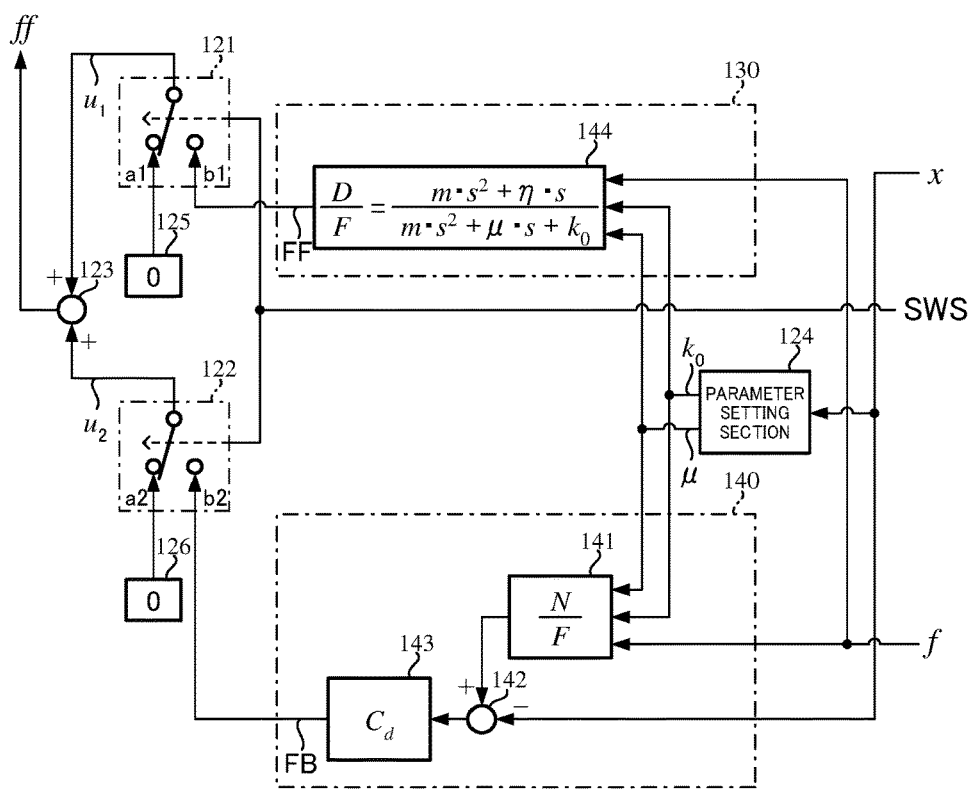
FIG. 14 is a block diagram showing a detailed configuration example (the first example) of a viscoelastic model following control section.

Considering the above-described premise, concrete configuration examples of the present invention will be described with reference to FIG. 14 and FIG. 15. The first example shown in FIG. 14 is corresponding to the first embodiment shown in FIG. 5, the rack axial force f is inputted into the feed-forward element 144 ("D/F" shown in the Equation 21) in the feed-forward control section 130 and the feed-back control section 140, and the rack displacement x is inputted into the feed-back control section 140. Further, the second example shown in FIG. 15 is corresponding to the second embodiment shown in FIG. 6, the rack displacement x is inputted into the spring constant term 131 and the viscous friction coefficient term 132 in the feed-forward control section 130, and the rack axial force f is inputted into the feed-back control section 140.

In the first example of FIG. 14, the rack axial force FF is inputted into a contact point b1 of the switching section 121. Further, in the second example of FIG. 15, an output of the spring constant term 131 is subtracted from an output of the viscous friction coefficient term 132 at a subtracting section 133, the rack axial force FF of the subtracted result is inputted into a contact point b1 of the switching section 121. A fixed value "0" from the fixing section 125 is inputted into a contact point a1 of the switching section 121.

Figure 15:
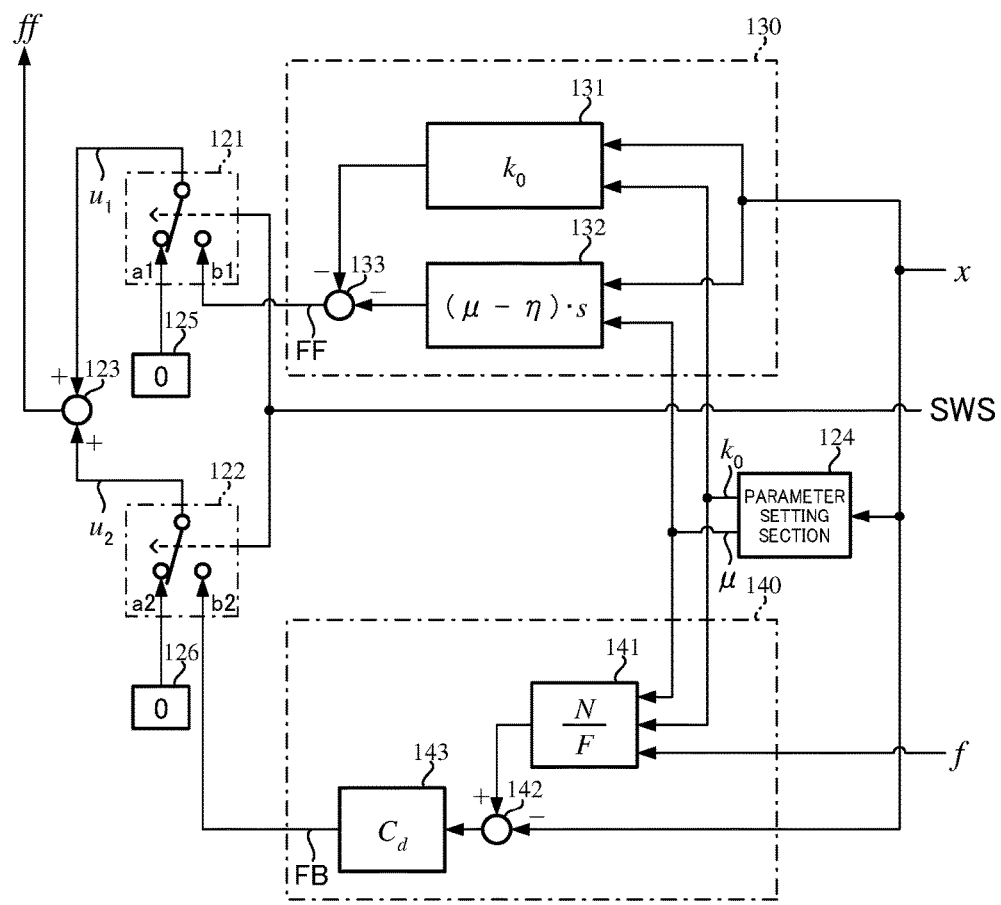
FIG. 15 is a block diagram showing a detailed configuration example (the second example) of a viscoelastic model following control section.

The feed-back control section 140 comprises the feed-back element (N/F) 141, the subtracting section 142 and the control element section 143 in any of the first example of FIG. 14 and the second example of FIG. 15, the rack axial force FB from the feed-back control section 140, that is, the output of the control element section 143 is inputted into the contact point b2 of the switching section 122. The fixed value "0" from the fixing section 126 is inputted into the contact point a2 of the switching section 122. The feed-back element (N/F) 141 is a reference model as above described and is equivalent to the viscoelastic model, and the output from the feed-back element (N/F) 141 is a target rack displacement.

Figure 16:
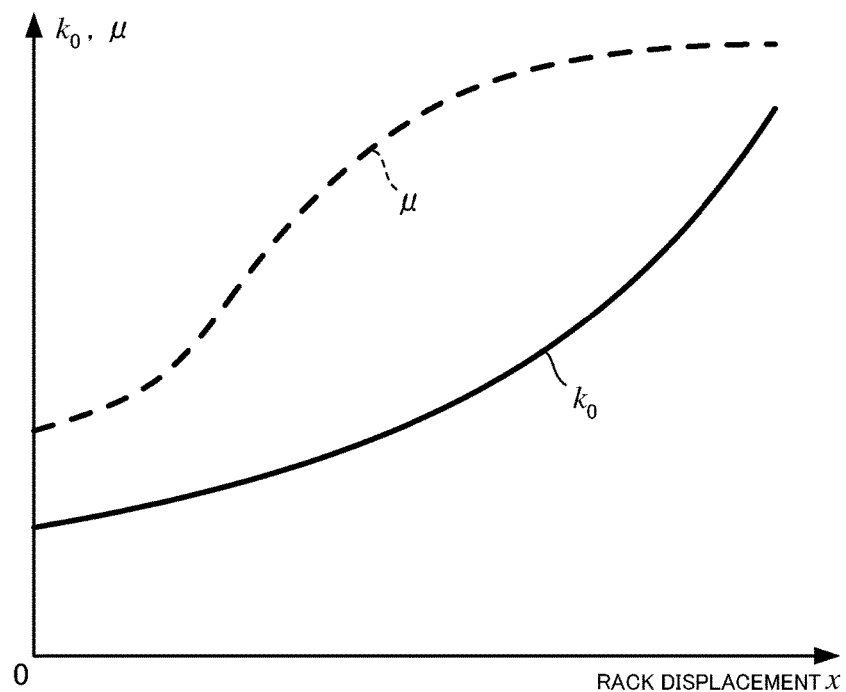
FIG. 16 is a diagram showing an example of changing parameters of a reference model depending on a rack position.

In the first example of FIG. 14, the rack axial force f is inputted into the feed-forward element 144 in the feed-forward control section 130 as well as the feed-back element (N/F) 141 in the feed-back control section 140. The rack displacement x is subtracting-inputted into the subtracting section 142 in the feed-back control section 140 and the parameter setting section 124. The parameter setting section 124 outputs the spring constant $k_0$ and the viscous friction coefficient $\mu$ of characteristics as shown in FIG. 16 corresponding to the rack displacement x, and the spring constant $k_0$ and the viscous friction coefficient $\mu$ are respectively inputted into the feed-forward element 144 in the feed-forward control section 130 as well as the feed-back element (N/F) 141 in the feed-back control section 140.

In the second example of FIG. 15, the rack displacement x is inputted into the spring constant term 131 and the viscous friction coefficient term 132 and the subtracting section 142 in the feed-back control section 140 as well as the parameter setting section 124. The rack axial force f is inputted into the feed-back element (N/F) 141. The parameter setting section 124 outputs the spring constant $k_0$ and the viscous friction coefficient $\mu$ described-above corresponding to the rack displacement x, and the spring constant $k_0$ is inputted into the spring constant term 131 and the feed-back element (N/F) 141 and the viscous friction coefficient $\mu$ is inputted into the viscous friction coefficient term 132 and the feed-back element 141.

Further, the switching signal SWS is inputted into the switching sections 121 and 122 in any of the first and second examples, the contact points of the switching sections 121 and 122 are normally connected to the contact points a1 and a2 respectively and are switched to the contact points b1 and b2.

In such the configuration, the operation example of the second example of FIG. 15 will be described with reference to flowcharts of FIG. 17.

The switching signal SWS is outputted from the rack end approach judging section 110 (Step S21), and the rack displacement x is outputted (Step S22). The rack displacement x is inputted into the spring constant term 131, the viscous friction coefficient term 132, the parameter setting section 124 and the subtracting section 142. The parameter setting section 124 sets the spring constant $k_0$ and the viscous friction coefficient $\mu$ obtained in accordance with the characteristics shown in FIG. 16 in the spring constant term 131, the viscous friction coefficient term 132 and the feed-back element (N/F) 141 (Step S23). Further, the converting section 101 converts the current command value Iref1 to the rack axial force f (Step S23A), and the rack axial force f is inputted into the feed-back element (N/F) 141 and then is N/F-calculated (Step S24). The N/F-calculated value is adding-inputted into the subtracting section 142 and then the rack displacement x is subtracted (Step S24A), and the subtracted result is Cd-calculated at the control element section 143 (Step S24B). The calculated rack axial force FB is outputted from the control element section 143 and then is inputted into the contact point b2 of the switching section 122.

The viscous friction coefficient term 132 in the feed-forward control section 130 performs a calculation "$(\mu-\eta)$ s" based on the viscous friction coefficient $\mu$ (Step S25), and sets the spring constant $k_0$ in the spring constant term 131 (Step S25A). The subtracting section 133 performs a subtraction of the output of the spring constant $k_0$ element and the output of "$(\mu-\eta)$ s" element (Step S25B) and outputs the rack axial force FF as the subtraction result. The rack axial force FF is inputted into the contact point b1 of the switching section 121. Besides, the calculation order of the feed-forward control section 130 and the feed-back control section 140 is may be alternated.

The switching signal SWS from the rack end approach judging section 110 is inputted into the switching sections 121 and 122, and the contact points a1 and a2 of the switching sections 121 and 122 are respectively switched to the contact points b1 and b2. The rack axial forces $u_1$ and $u_2$ from the switching sections 121 and 122 are added at the adding section 123 (Step S26), and the rack axial force ff being the addition result is converted to the current command value Iref2 at the converting section 102 (Step S26A). The current command value Iref2 is inputted into the adding section 103 and then is added to the current command value Iref1 (Step S27) so that the steering control is performed and returns to the Step S14.

As well, the control element section 143 (Cd) may be any of a PID (Proportional-Integral-Differential)-control, a PI-control, or a PD control. Further, only a portion (element) that the rack axial force f and a rack displacement x input is different, and operations of the first example as shown in FIG. 14 are the same as that of the second example. In the first example of FIG. 14 and the second example of FIG. 15, although the both control calculations of the feed-forward control section 130 and the feed-back control section 140 are performed, the configuration of only the feed-forward control section 130 or the configuration of only the feed-back control section 140 may be adopted.

Next, examples of the present invention (the third example to the seventh example) that perform the offset process will be described.

Figure 18:
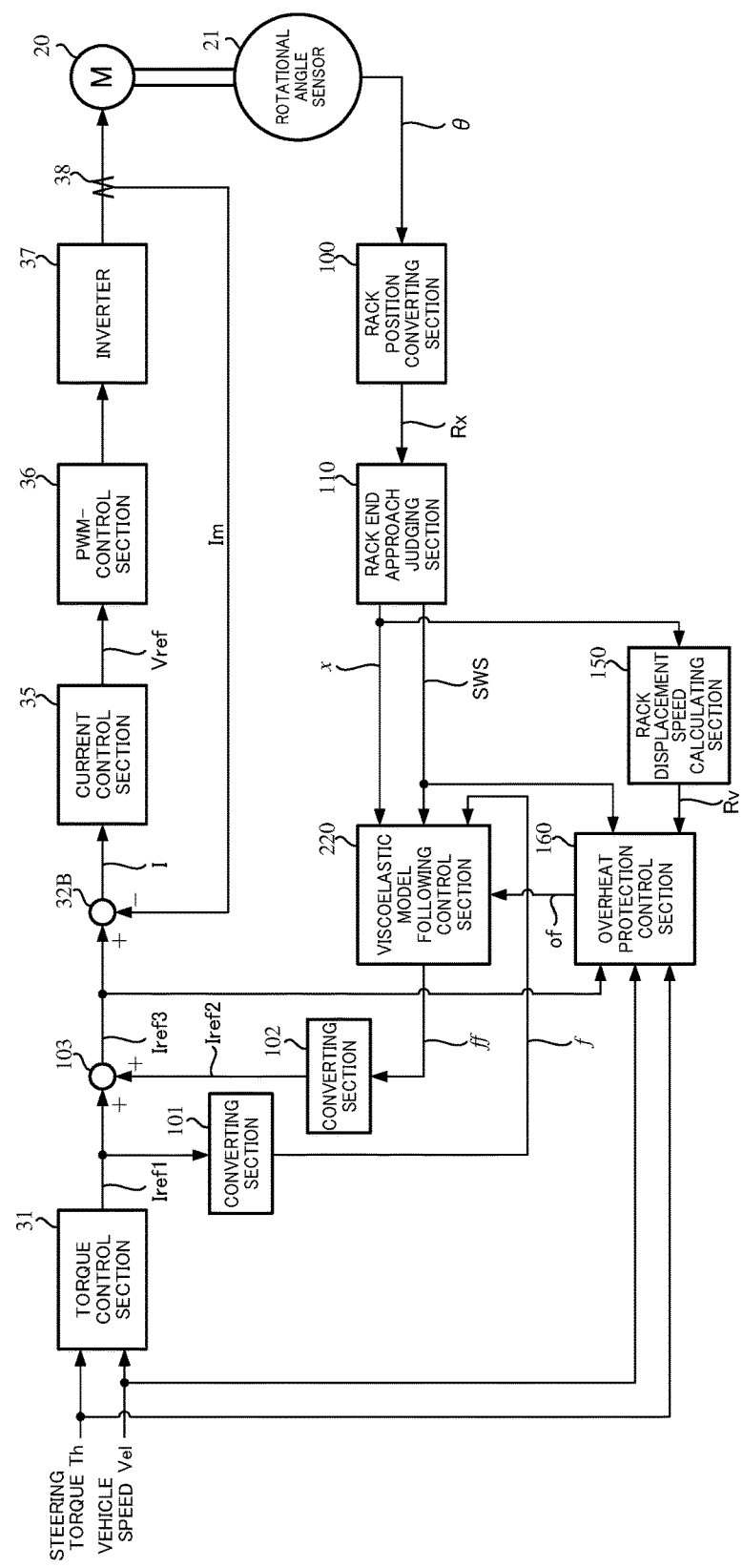
FIG. 18 is a block diagram showing a configuration example (the third and fourth examples) of the present invention.

FIG. 18 shows the example of the present invention that performs the offset process corresponding to FIG. 3. In comparison with the embodiment as shown in FIG. 3, a rack displacement speed calculating section 150 and an overheat protection control section 160 are added. The rack displacement x and the switching signal SWS which are outputted from the rack end approach judging section 110 are inputted into the viscoelastic model following control section 220, and further the rack displacement x is inputted into the rack displacement speed calculating section 150 and the switching signal SWS is inputted into the overheat protection control section 160. The rack displacement speed calculating section 150 calculates a rack displacement speed Rv from the rack displacement x, and outputs the rack displacement speed Rv to the overheat protection control section 160. The overheat protection control section 160 inputs the switching signal SWS and the rack displacement speed Rv as well as the steering torque Th, the vehicle speed Vel and a below-described current command value Iref3, and calculates the offset "of". The offset "of" is inputted into the viscoelastic model following control section 220 together the rack axial force f, the switching signal SWS and the rack displacement x. The rack axial force ff which is control-calculated at the viscoelastic model following control section 220 is converted to the current command value Iref2 at the converting section 102. Since other configurations are the same as those of FIG. 3, the explanations are omitted.

Figure 19:
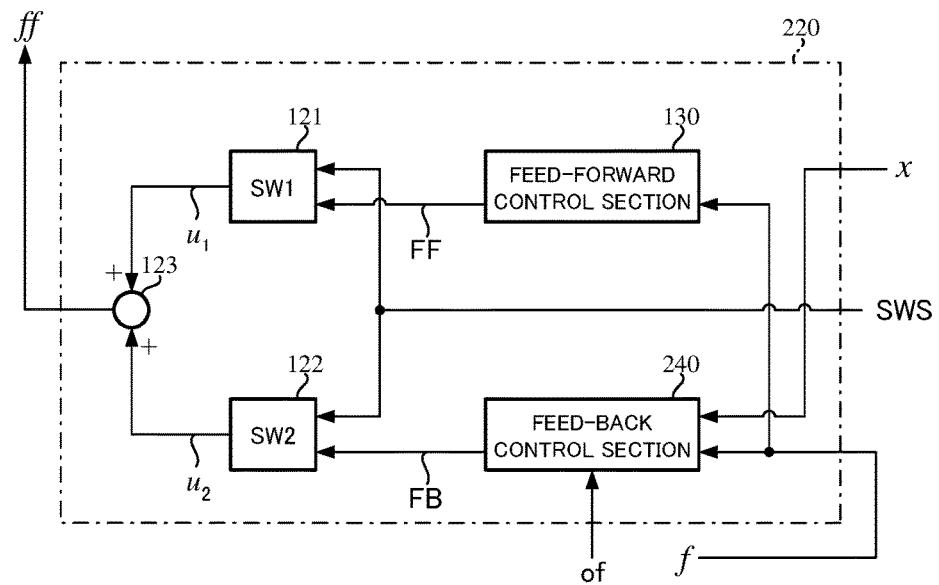
FIG. 19 is a block diagram showing a configuration example (the third example) of the viscoelastic model following control section.
Figure 20:
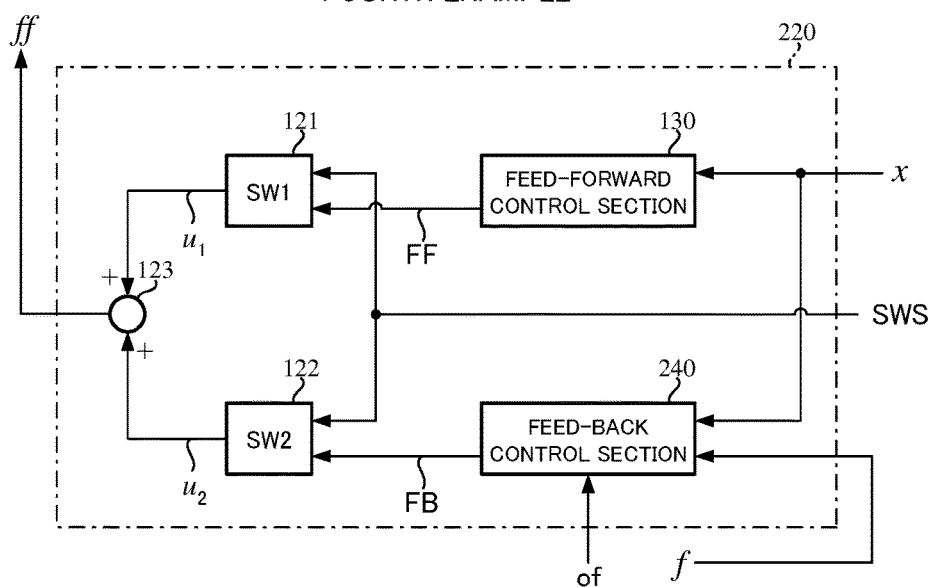
FIG. 20 is a block diagram showing a configuration example (the fourth example) of the viscoelastic model following control section.

Details of the viscoelasticmodel following control section 220 is shown in FIG. 19 (the third example) corresponding to FIG. 5 and FIG. 20 (the fourth example) corresponding to FIG. 6.

The offset "of" that is outputted from the overheat protection control section 160 is inputted into a feed-back control section 240. Other configurations are the same as those of the first embodiment of FIG. 5 or those of the second embodiment of FIG. 6.

In such a configuration, the overall operation example and the operation example of the viscoelastic model following control will be described with reference to flowcharts of FIG. 21, FIG. 22 and FIG. 23.

Figure 21:
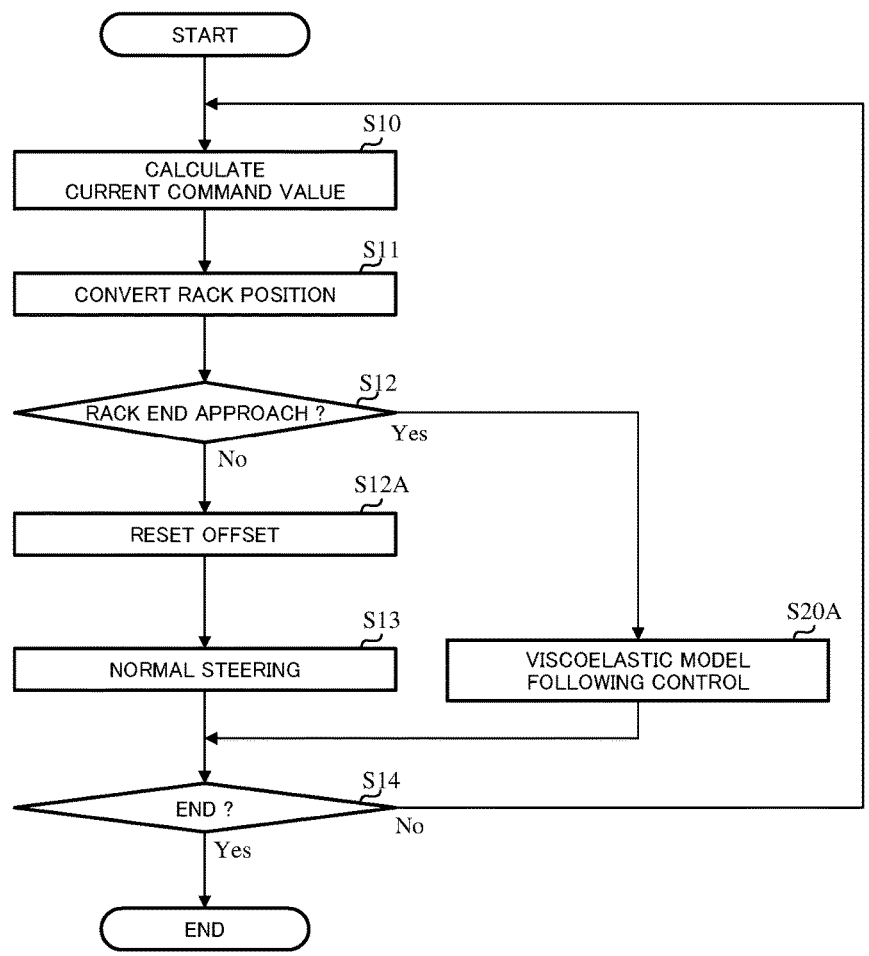
FIG. 21 is a flowchart showing an operation example (the third and fourth examples) of the present invention.

FIG. 21 shows the overall operation example in a flowchart. In comparison with the flowchart of FIG. 7, a Step S12A is added, and the operation of the viscoelastic model following control is changed as below described (Step S20A). Other operations are the same as those of the first embodiment or the second embodiment.

In the Step S12A, the rack end approach judging section 110 judges whether the steering approaches to the rack end based on the judgment rack position Rx or not. In a case that a judgement result is not a rack end approach, an operation that the value of the offset "of" at the overheat protection control section 160 is reset to zero, is performed.

In a case that the rack end approach judging section 110 judges the rack end approach, the overheat protection control section 160 and the viscoelastic model following control section 220 is performed (Step S20A).

Figure 22:
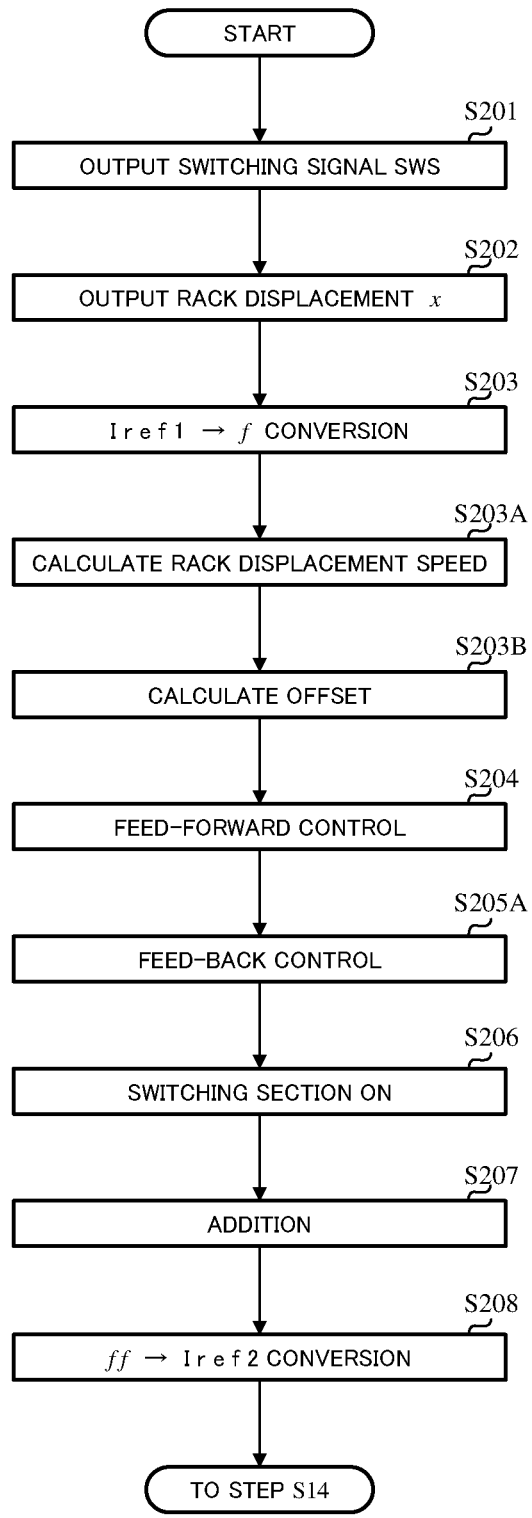
FIG. 22 is a flowchart showing an operation example (the third and fourth examples) of the viscoelastic model following control section.

FIG. 22 shows an operation example of the viscoelastic model following control in a flowchart. In comparison with the flowchart of FIG. 8, Steps S203A and 5203B are added, and the operation of the feed-back control is changed (changed from the Step S205 to Step S205A). Other operations are the same as those of the first embodiment or the second embodiment. The feed-back control of the Step S205A is performed at the feed-back control section 240, and the operation is explained in a detailed explanation of the viscoelastic model following control section 220 as described below.

At the Step S203A, the rack displacement x that is outputted from the rack end approach judging section is inputted into the rack displacement speed calculating section 150, and then the operation that the rack displacement speed Rv is calculated from the rack displacement x is performed. At the Step S203B, the overheat protection control section 160 detects the rack end approach due to the switching signal SWS, and calculates the offset "of" based on the steering torque Th, the vehicle speed Vel, the rack displacement speed Rv and the current command value Iref3.

Figure 23:
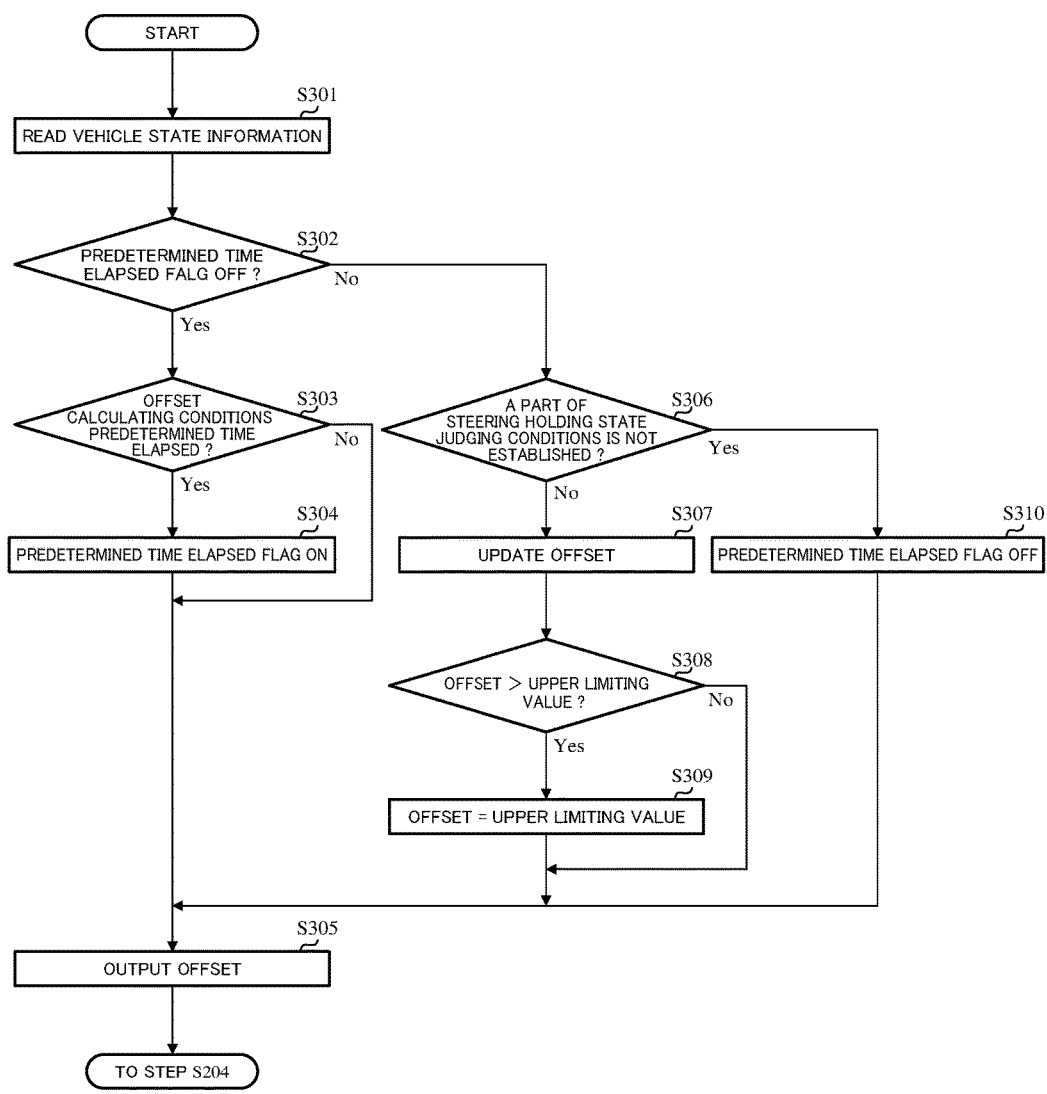
FIG. 23 is a flowchart showing an operation example (the third and fourth examples) of an overheat protection control section.

The calculation of the offset "of" in the overheat protection control section 160 is performed in a procedure as shown in FIG. 23.

The offset "of" is updated only when the offset calculating conditions are established for a predetermined time. A flag (hereinafter referred to as "predetermined-time elapsed flag") that shows a state whether the predetermined time is elapsed or not by "ON" or "OFF" is provided, and is "OFF2 at the starting time. A value of the offset "of" is set to zero at the starting time.

When the overheat protection control section 160 detects the rack end approach due to the output of the switching signal SWS, the overheat protection control section 160 reads the current command value Iref3, the steering torque Th, the rack displacement speed Rv and the vehicle speed Vel that are the vehicle state information (Step S301) and confirms the predetermined-time elapsed flag (Step S302).

In a case that the predetermined-time elapsed flag is "OFF", the overheat protection control section 160 confirms whether the offset calculating conditions are established for the predetermined time (Step S303). The offset calculating conditions are "the vehicle speed Vel is lower than a predetermined vehicle speed value", and "the steering torque Th is larger than a predetermined steering torque value", and "the rack displacement speed Rv is lower than a predetermined speed value", and "the current command value Iref3 is larger than a predetermined current command value". The time that the offset calculating conditions are established is measured by using a time counter. When the offset calculating conditions are established for the predetermined time, the predetermined-time elapsed flag is switched-ON (Step S304), and the offset "of" is outputted (Step S305). When the offset calculating conditions are not established for the predetermined time, the predetermined-time elapsed flag is remained and the offset "of" is outputted (Step S305).

In a case that the predetermined-time elapsed flag is "ON", the overheat protection control section 160 confirms whether a part of the steering holding state conditions is not established (Step S306). That is, the overheat protection control section 160 confirms whether at least one condition among the three conditions "the vehicle speed Vel is lower than a predetermined vehicle speed value", "the steering torque Th is larger than a predetermined steering torque value" and "the rack displacement speed Rv is lower than a predetermined speed value" is not established. In a case that the three conditions are established, a predetermined value is added to the offset "of", and then the offset "of" is updated (S307). Then, the overheat protection control section 160 confirms whether the updated offset "of" is larger than a predetermined upper limiting value (Step S308), the predetermined upper limiting value is set to the offset "of" when the updated offset "of" is larger than the predetermined upper limiting value (Step S309). When the updated offset "of" is not larger than the predetermined upper value, a value of the offset "of" is not changed, and then the offset "of" is outputted (Step S305). In a case that at least one condition among the above three conditions is not established, the predetermined-time elapsed flag is switched-OFF (Step S310), and the offset "of" is outputted without being updated (Step S305). When the predetermined-time elapsed flag is switched-OFF, the time counter, which is used at Step S303, is simultaneously cleared to zero.

When the steering is out of the predetermined angle at front of the rack end and the rack end approach judging section 110 judges "not rack end approach", a value of the offset "of" is reset to zero as described above (Step S12A).

The calculated offset "of" as described-above is inputted into the feed-back control section 240 in the viscoelastic model following control section 220.

As well, in the offset calculating conditions, the condition related to the vehicle speed Vel may not be mandatory, and other conditions may be added. The condition of the motor rotational speed may be used instead of that of the rack displacement speed Rv. Namely, the condition "the motor rotational speed is smaller than a predetermined rotational speed" may be used. In this case, the motor rotational speed is calculated from the rotational angle θ which is outputted from the rotational angle sensor 21. Further, the update of the offset "of" is performed by an addition of the predetermined value. However, if the offset "of" is updated so as to gradually increase, the offset "of" may be updated by using another methods such as an exponential function to increase.

Here, the viscoelastic model following control section 220 will be described in detail, with reference to FIGS. 24 and 25.

Figure 24:
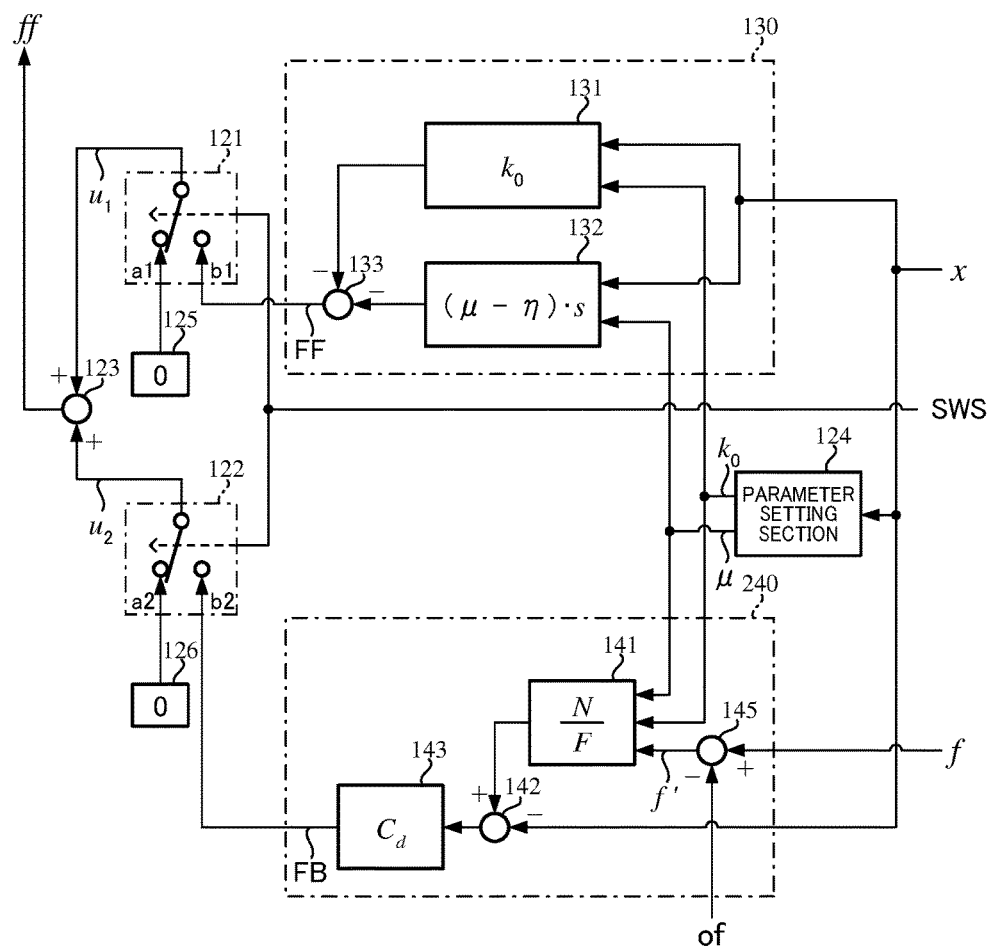
FIG. 24 is a block diagram showing a detailed configuration example (the fourth example) of the viscoelastic model following control section.

A concrete configuration example of the viscoelastic model following control section 220 in the fourth example of FIG. 20 is shown in FIG. 24. This is corresponding to the second example as shown in FIG. 15, and the feed-back control section 140 is replaced to a feed-back control section 240. Since other configurations are the same as that of the second example, the explanations are omitted.

The feed-back control section 240 comprises a feed-back element (N/F) 141, a control element section 143 and subtracting sections 142 and 145, and the offset "of" from the overheat protection control section 160 is subtracting-inputted into the subtracting section 145.

The rack axial force f which is inputted into the feed-back control section 240 is adding-inputted into the subtracting section 145, the offset "of" which is subtracting-inputted into the subtracting section 145 is subtracted from the rack axial force f, and the subtracted result is inputted into the feed-back element (N/F) 141 as a rack axial force f'.

Figure 25:
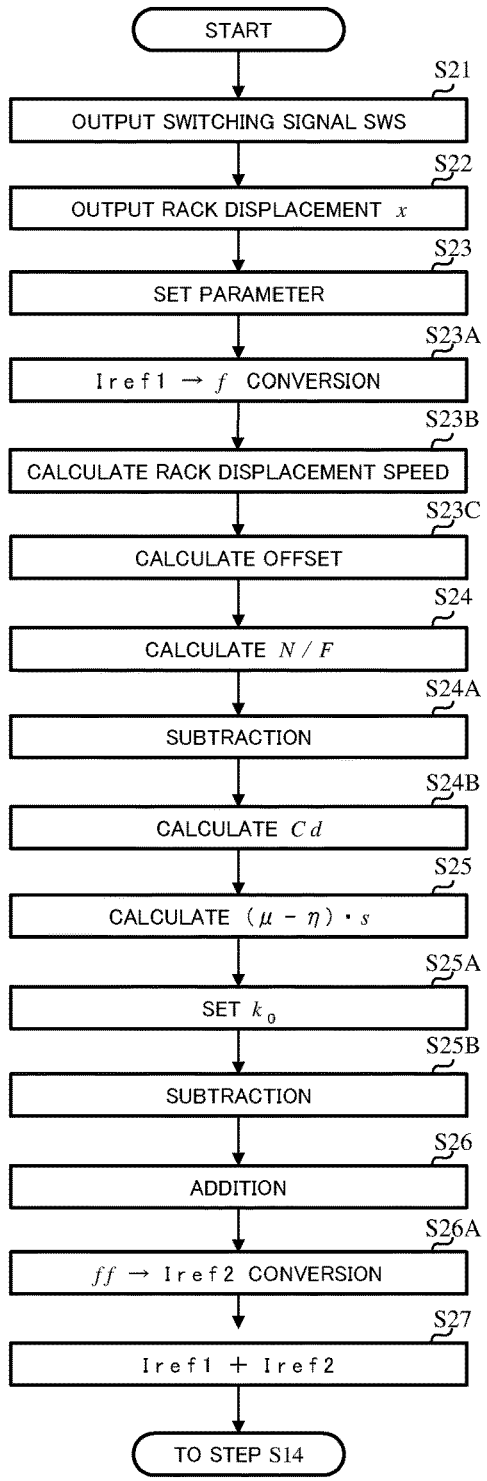
FIG. 25 is a flowchart showing an operation example (the fourth example) of the viscoelastic model following control section.

An operation example in such a configuration is shown in a flowchart of FIG. 25.

Figure 17:
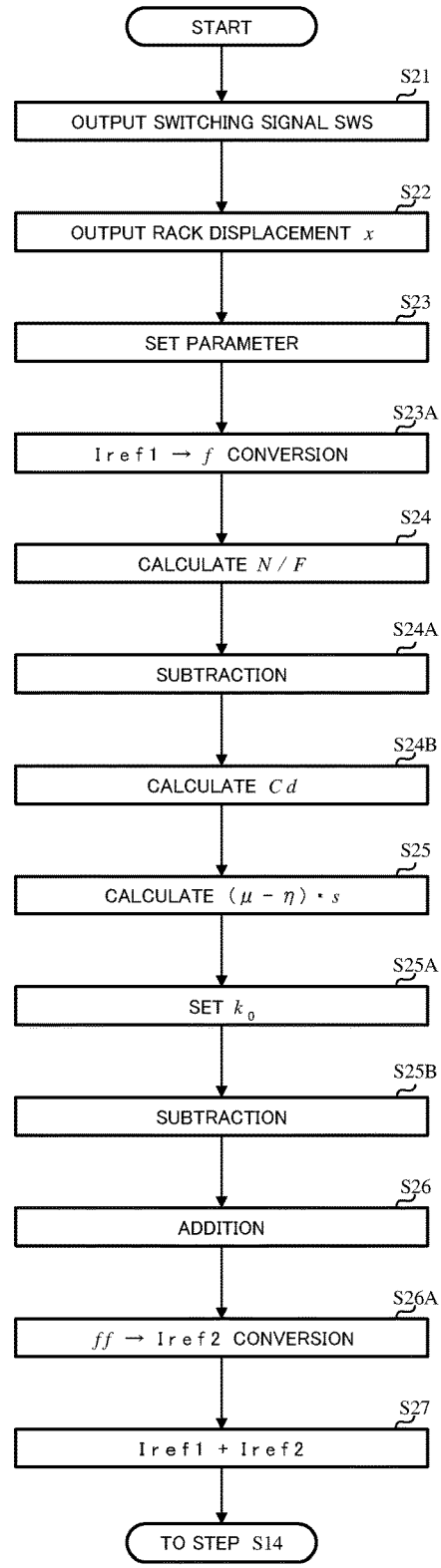
FIG. 17 is a flowchart showing an operation example (the second example) of the viscoelastic model following control section.

First, in similar to the operation of the second example as shown in FIG. 17, the switching signal SWS and the rack displacement x are outputted from the rack end approach judging section 110 (Steps S21 and S22), and the rack displacement x is inputted into the spring constant term 131, the viscous friction coefficient term 132, the parameter setting section 124 and the subtracting section 142. The parameter setting section 124 sets the spring constant $k_0$ and the viscous friction coefficient $\mu$ in the spring constant term 131, the viscous friction coefficient term 132 and the feed-back element (N/F) 141 (Step S23), and the converting section 101 converts the current command value Iref1 to the rack axial force f (Step S23A). The rack axial force f is adding-inputted into the subtracting section 145. The rack displacement speed calculating section 150 calculates the rack displacement speed Rv from the rack displacement x (Step S23B), the rack displacement speed Rv is inputted into the overheat protection control section 160 together the switching signal SWS, the steering torque Th, the vehicle speed Vel and the current command value Iref3, and the offset "of" is calculated at the overheat protection control section 160 (Step S23C). The offset "of" is subtracting-inputted into the subtracting section 145, the rack axial force f' subtracted the offset "of" from the rack axial force f is inputted into the feed-back element (N/F) 141 and then is N/F-calculated (Step S24).

Thereafter, the similar operations with the Steps S24A to S27 in the second example are performed, and the operation returns to the Step S14.

As well, a configuration that is replaced the feed-back control section 140 in the first example as shown in FIG. 14 with the feed-back control section 240 in the fourth example as shown in FIG. 24 can be considered as a concrete configuration example of the viscoelastic model following control section 220 in the third example of FIG. 19. An operation of the configuration example is different from only an input part (an element) of the rack axial force f and the rack displacement x, and is same with the operation of the fourth example.

Figure 26:
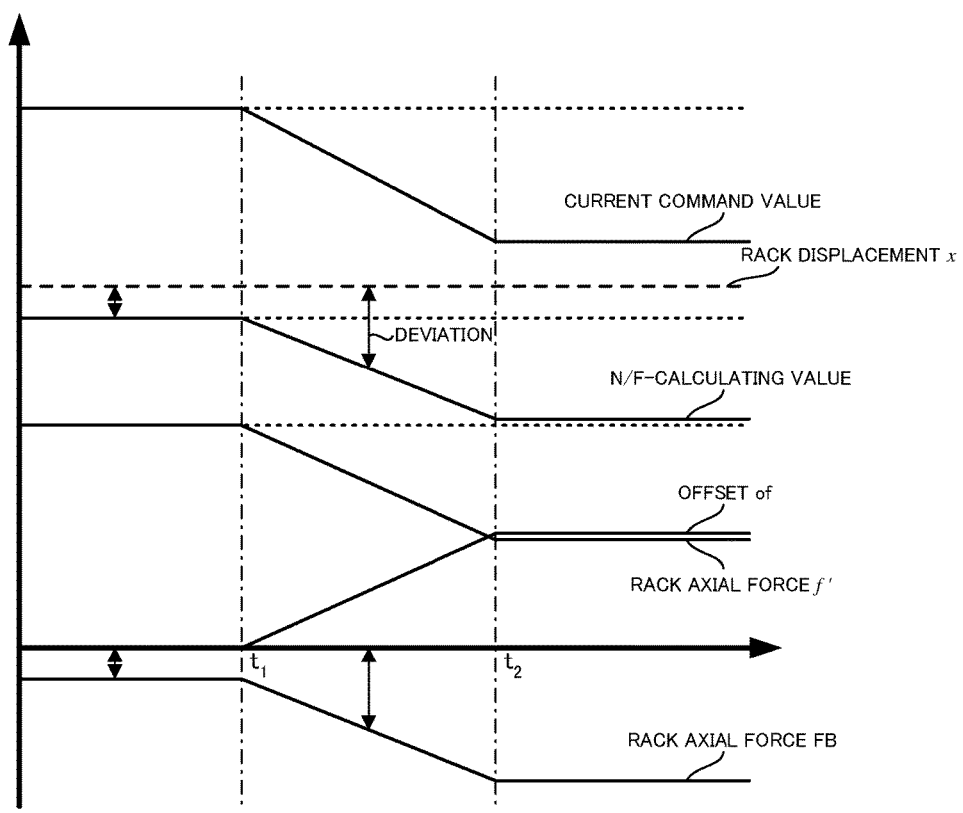
FIG. 26 is an image diagram showing a varying example of a data due to applying an offset.

Here, a variation image of respective data (signals) due to the offset assignment is shown in FIG. 26. In FIG. 26, a horizontal axis is a time and a vertical axis is amplitudes of the respective data. Since FIG. 26 is intended to show a variation aspect, the magnitudes of the respective data are different from real magnitudes. Although a time lag actually occurs in a timing which the respective data vary, it is assumed that the time lag no occurs in this case and the rack axial force f and the rack displacement x that are inputted from the viscoelastic model following control section 220 are constant.

If the offset calculating conditions are established for a predetermined time at a time point $t_1$ when the steering is within the predetermined angle at front of the rack end, a value of the offset "of" gradually increases and the rack axial force f' decreases corresponding to the increasing amount of the offset "of". As a result, the N/F-calculated value which is an output from the viscoelasticmodel also decreases, and a deviation relative to the rack displacement x which is calculated at the subtracting section 142 increases. Further, the rack axial force FB that is an output of the control element section (Cd) 143 inputting the deviation, decreases. Since the rack axial force FB decreases as described above, the current command value also decreases.

In a case that a function of the offset assignment does not exist, the respective data are constant as shown by the dotted line in FIG. 26. As a result, since the motor current does not decrease and there is a possibility to overheat the ECU and the motor, it is understood that the function of the present embodiment acts effectively.

Assuming that the offset "of" arrives at the upper limiting value at a time point $t_2$, the offset "of" keeps the upper limiting value after the time point $t_2$ and other data also constantly holds values of the time point $t_2$. In this way, it is possible to prevent excessively decreasing the current command value.

As described above, in the above examples (the third example and the fourth example), the motor current does not excessively decrease by setting the offset to the upper limiting value. However, it is also possible to prevent that the motor current excessively decreases by setting the lower limiting value of the current command value instead of the upper limiting value of the offset, memorizing the value of the offset when the current command value is the lower limiting value as a upper limiting offset, and holding the upper limiting offset as the offset value while the current command value is smaller than the lower limiting value.

Although a configuration of the example (the fifth example) in this case is similar to the above examples (the third and fourth examples), an operation of calculating the offset "of" at the overheat protection control section 160 is different.

Figure 27:
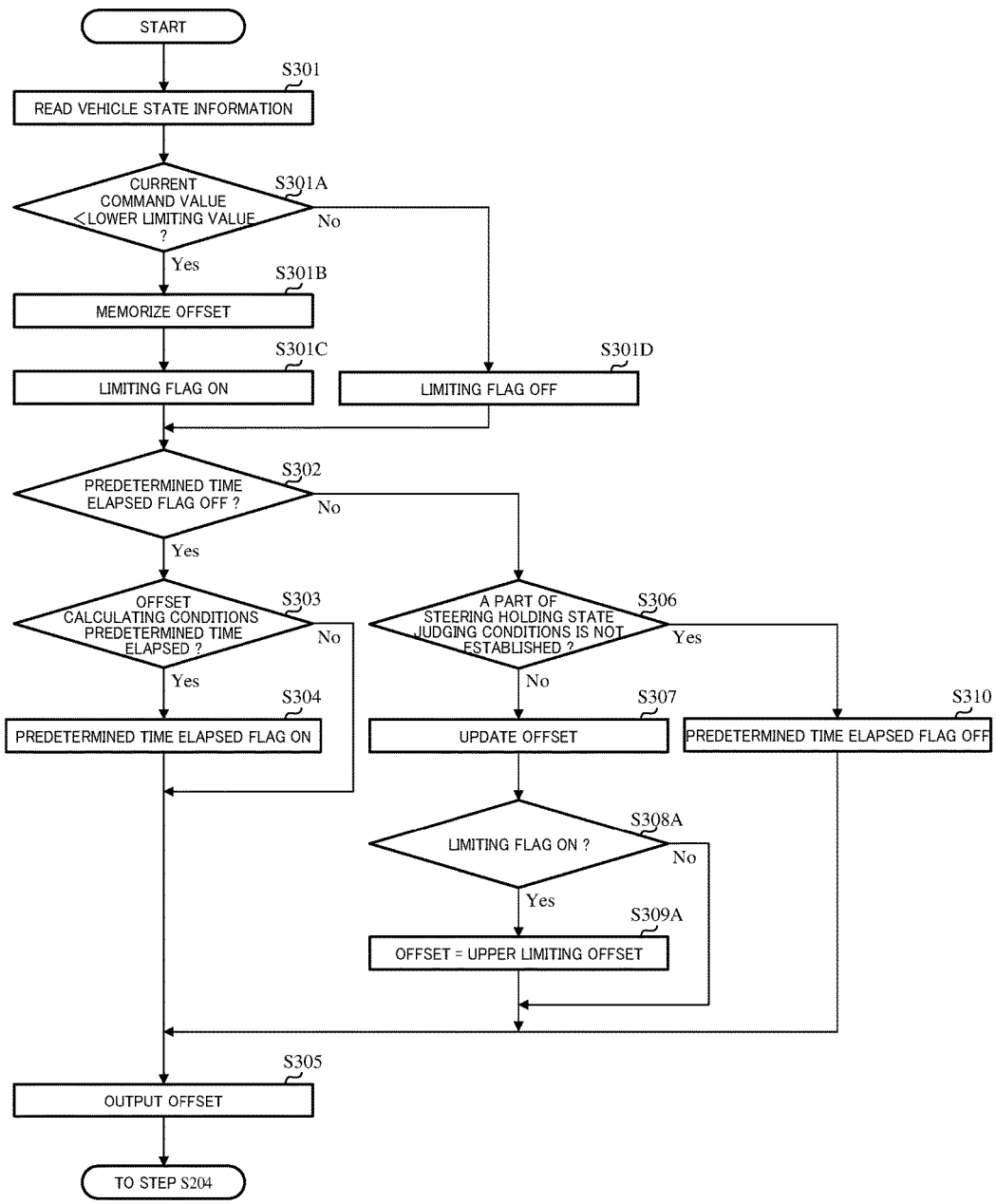
FIG. 27 is a flowchart showing another operation example (the fifth example) of the overheat protection control section.

FIG. 27 is a flowchart showing an operation example of calculating the offset "of" at the overheat protection control section 160 in the fifth example. In comparison with the flowchart as shown in FIG. 23, Steps S301A to S301D are added after reading the current command value Iref3, the steering torque Th, the rack displacement speed Rv and the vehicle speed Vel (Step S301), and the Steps S308 and S309 are replaced by Steps S308A and 5309A after updating the offset "of" (Step S307). Further, in this example, a flag (hereinafter referred to as "limiting flag") that shows a state whether the current command value becomes the lower limiting value or not by "ON/OFF" is provided, and the limiting flag is "OFF" at the starting stage.

The overheat protection control section 160 confirms whether the read current command value Iref3 is smaller than the predetermined lower limiting value or not (Step S301A). In a case that the current command value Iref3 is smaller than the predetermined lower limiting value, the value of the offset value "of" at this point is memorized as the upper limiting offset (Step S301B), and the limiting flag is set to "ON" (Step S301C). In a case that the current command value Iref3 is not smaller than the predetermined lower limiting value, the limiting flag is set to "OFF" (Step S301D).

After updating the offset "of" (Step S307), the limiting flag is confirmed (Step S308A). In a case that the limiting flag is "ON", the upper limiting offset is set to the value of the offset "of". In a case that the limiting flag is "OFF", the value of the offset "of" is not changed.

In this manner, since the offset is limited by the magnitude of the current command value which is directly affected to the overheat of the ECU and the motor, it is possible to effectively prevent the overheat of the ECU and the motor.

The subtraction of the offset also enables to perform not to the rack axial force f that is inputted into the feed-back element (N/F) 141 which is the viscoelastic model, but to the N/F-calculated value that is outputted from the feed-back element (N/F) 141.

Figure 28:
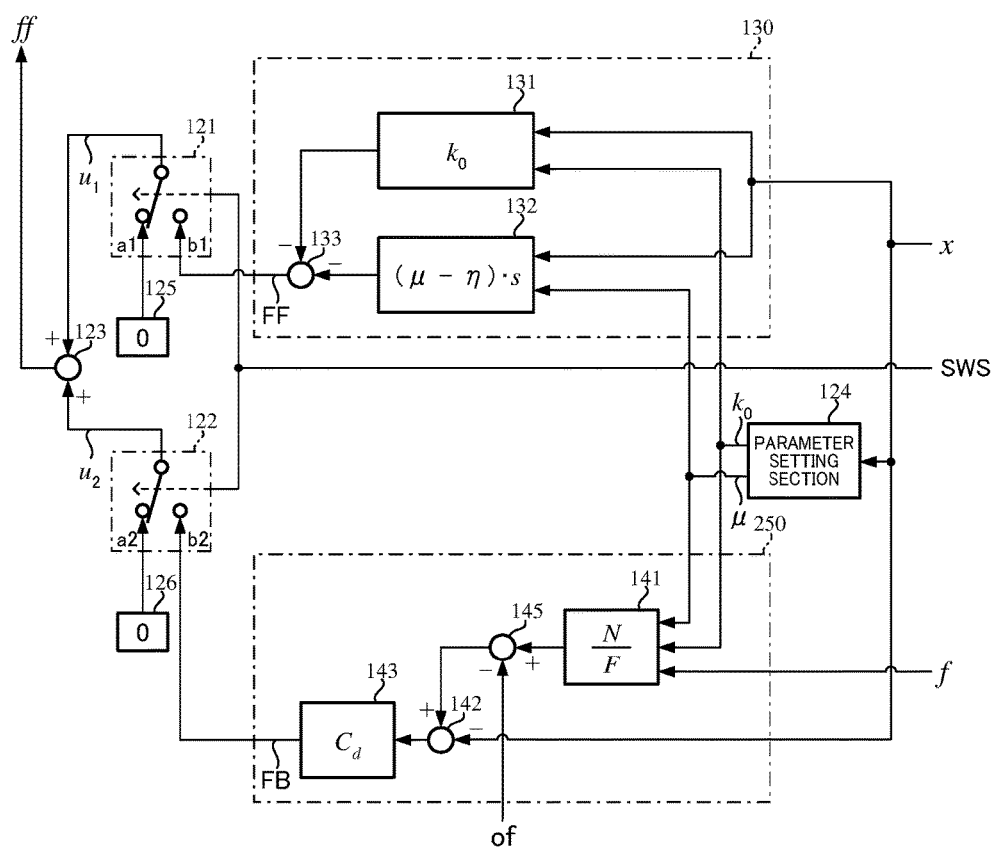
FIG. 28 is a block diagram showing another detailed configuration example (the sixth example) of the viscoelastic model following control section.

In comparison with a configuration example of the viscoelastic model following control section in the fourth example as shown in FIG. 24, FIG. 28 shows a configuration example (the sixth example) that performs the subtraction of the offset "of" to the N/F-calculated value which is outputted from the feed-back element (N/F) 141.

The configurations of FIG. 28 other than the feed-back control section 250 are same with those of the fourth example of FIG. 24, and elements of the feed-back control section 250 of FIG. 28 are also same with those of the fourth example of FIG. 24. However, connections of the elements are different. The rack axial force f is not inputted into the subtracting section 145, but into the feed-back element (N/F) 141, and the N/F-calculated value which is outputted from the feed-back element (N/F) 141 is not adding-inputted into the subtracting section 142, but into the subtracting section 145. The offset "of" is subtracted from the N/F-calculated value at the subtracting section 145, the subtracted value is adding-inputted into the subtracting section 142, the rack displacement x is subtracted from the subtracted value, and the above subtracted result is inputted into the control element section 143.

The flow of the rack axial force at the feed-back control section in the sixth example is same with that of the above other examples (the third example to the fifth example). Because the offset is applied in the same flow, the effect equivalent to other examples can be obtained in the sixth example.

Besides, even to the configuration example of the viscoelastic model following control section in the third example, it is possible to perform the subtraction of the offset "of" to the N/F-calculated value which is outputted from the feed-back element (N/F) 141.

The process performed by using the rack displacement x in the above examples (the third example to the sixth example) can be performed by a displacement (hereinafter referred to as "rotational angle displacement") $\theta d$ of the rotational angle $\theta$ instead of the rack displacement x. Since the rack position is relevant to the rotational angle such that the rotational angle $\theta$ is converted to the judgement rack position Rx at the rack position converting section 100 of the above example, a replacement between the rack displacement and the rotational angle, which the predetermined position or the predetermined angle at front of the rack end serves as a base point, is possible.

Figure 29:
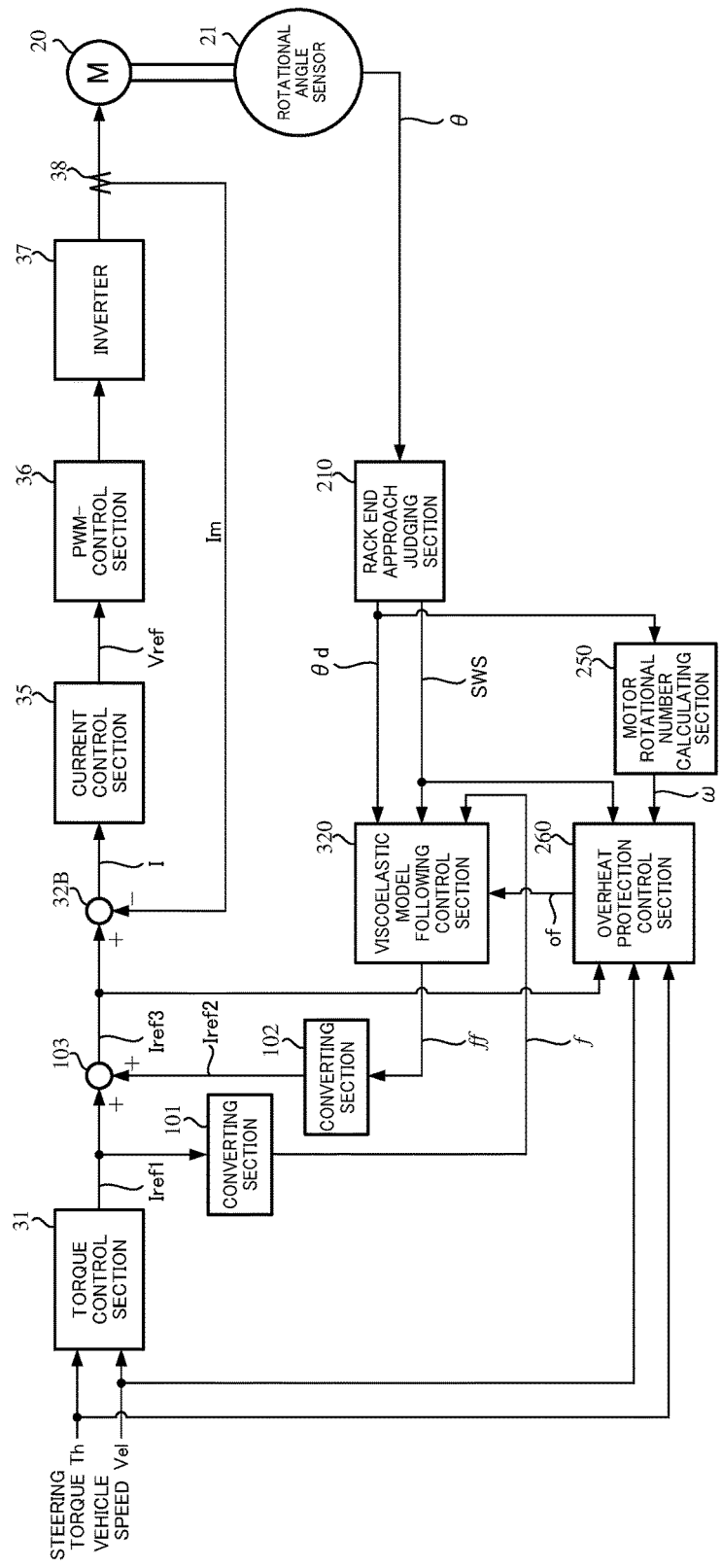
FIG. 29 is a block diagram showing a configuration example (the seventh example) of the present invention.

An example (the seventh example) in a case of using a rotational angle displacement $\theta d$ instead of the rack displacement x is shown in FIG. 29, corresponding to FIG. 18.

In the seventh example, since it is not necessary to obtain the rack position, the rack position converting section 100 is not required. Further, the rack end approach judging section 110, the rack displacement speed calculating section 150, the overheat protection control section 160 and the viscoelastic model following control section 220 are respectively replaced by the rack end approach judging section 210, the motor rotational speed calculating section 250, the overheat protection control section 260 and the viscoelastic model following control section 320. The rotational angle $\theta$ from the rotational sensor 21 is inputted into the rack end approach judging section 210, the rack end approach judging section 210 enables a suppression control function when the rack end approach judging section 210 judges that the rotational angle $\theta$ is between the rotational angle corresponding to the rack end and the rotational angle $\theta_0$ corresponding to the predetermined position at front of the rack end, and then outputs a rotational angle displacement $\theta d$ which is a deviation between the rotational angle $\theta$ and the rotational angle $\theta_0$ as well as the switching signal SWS.

The rotational angle displacement $\theta d$ is inputted into the viscoelastic model following section 320 and the motor rotational speed calculating section 250, and the switching signal SWS is inputted into the viscoelastic model following section 320 and the overheat protection control section 260. The motor rotational speed calculating section 250 calculates the motor rotational speed $\omega$ from the rotational angle displacement $\theta d$, and outputs the motor rotational speed $\omega$ to the overheat protection control section 260. The overheat protection control section 260 calculates the offset "of" by using the motor rotational speed $\omega$ instead of the rack displacement speed Rv. The viscoelastic model following control section 320 calculates the rack axial force ff by using the rotational angle displacement $\theta d$ instead of the rack displacement x.

Figure 30:
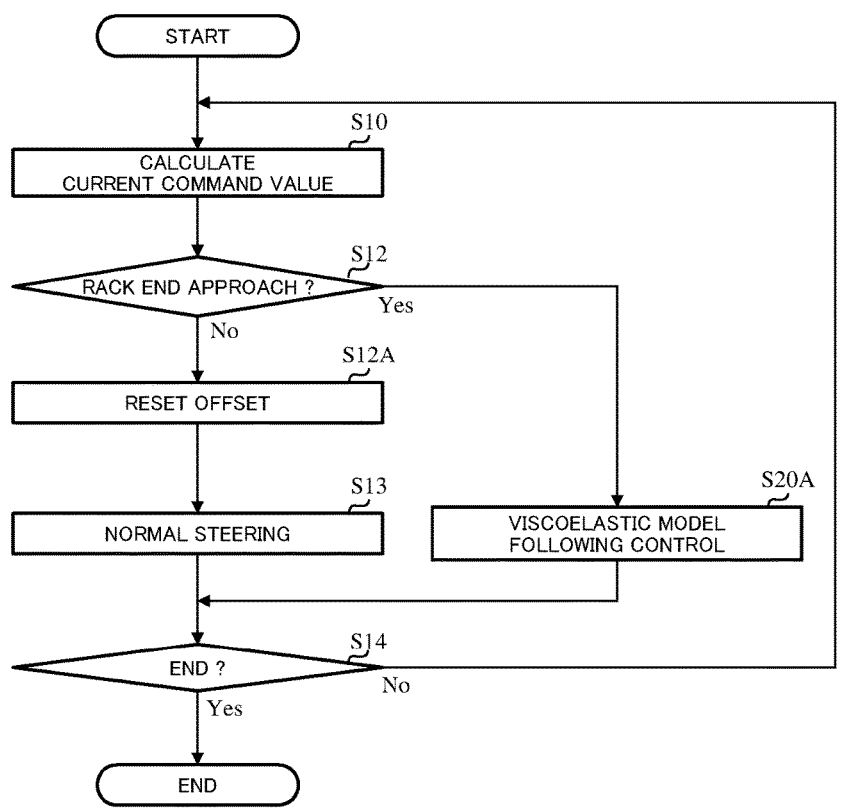
FIG. 30 is a flowchart showing an operation example (the seventh example) of the present invention.

An overall operation example of the seventh example is shown in FIG. 30. In comparison with the operation example as shown in FIG. 21, a process (Step S11) of the rack position conversion that converts the rotational angle $\theta$ to the judgement rack position Rx is omitted. The rotational angle displacement $\theta d$ instead of the rack displacement x is calculated and is used in other processes. Although it is different to calculate and use the motor rotational speed $\omega$ instead of the rack displacement speed Rv, the operation is the same.

Since the rotational angle is directly used by using the rotational angle displacement $\theta d$ instead of the rack displacement x, reductions in a process amount and a calculating error are achieved.

Although both control calculations of the feed-forward control section and the feed-back control section are performed in the above examples (the third example to the seventh example), the configuration of only the feed-back control section may be adopted.

Next, examples (the eighth example to the thirteen the example) of the present invention which perform the maximum value limiting process will be described. In the examples, the rack axial force (and the column axial torque) is considered as being set to a positive value when the handle is turned to the right (hereinafter referred to as "right turning steering"), and being set to a negative value when the handle is turned to the left (hereinafter referred to as "left turning steering").

Figure 31:
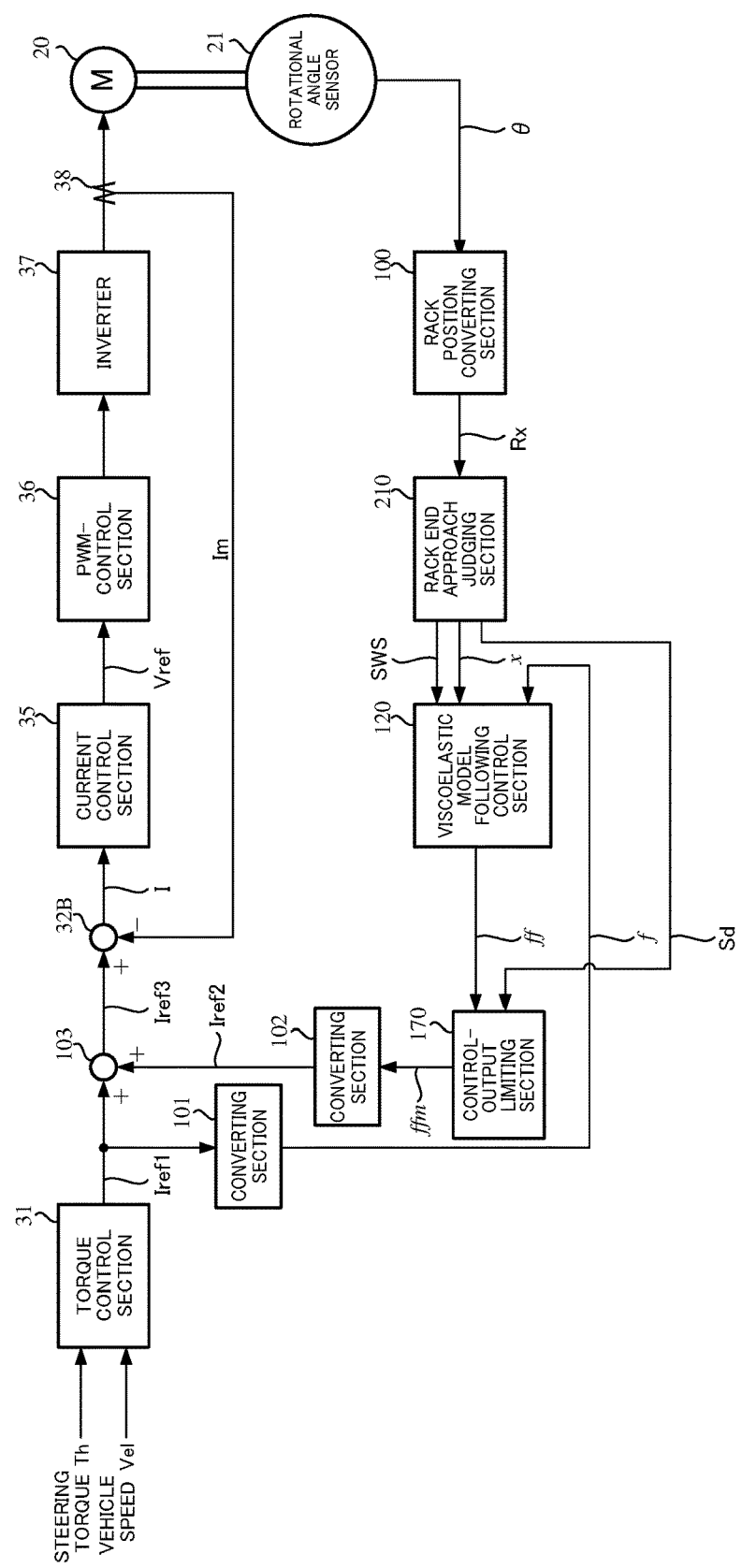
FIG. 31 is a block diagram showing a configuration example (the eighth example) of the present invention.

First, the eighth example of the present invention will be described. FIG. 31 shows a configuration example of the eighth example corresponding to FIG. 3. In comparison with the embodiment as shown in FIG. 3, a control-output limiting section 170 is added, and the rack end approach judging section 110 is replaced by a rack end approach judging section 210.

The rack end approach judging section 210 outputs a direction signal Sd that indicates a steering direction of the handle other than the rack displacement x and the switching signal SWS. The steering direction is judged based on the judgment rack position Rx that is inputted into the rack end approach judging section 210, and the direction signal Sd that is set to "right turning" in a case of right turning steering and is set to "left turning" in a case of left turning steering, is outputted.

The control-output limiting section 170 limits the maximum value and the minimum value of the rack axial force ff (control output) which is outputted from the viscoelastic model following control section 120. An upper limiting value and a lower limiting value (hereinafter referred to a general term of the upper limiting value and the lower limiting value as "limiting value") to the rack axial force ff, are set for limiting. The "limiting value" in a case of the right turning steering and the "limiting value" in a case of the left turning steering are individually set. For example, in a case of the right turning steering, the upper limiting value (hereinafter referred to as "right turning upper-limiting value") RU1 is set to a predetermined value Fx1 (for example, 2 [Nm] (Newton meter)) as the following Equation 33, and the lower limiting value (hereinafter referred to as "right turning lower-limiting value") RL1 is set to a value which subtracts a predetermined value Fx2 (for example, 10 [Nm]) from a sign-inverted value of the maximum output fmax (positive value) of a system as the following Equation 34.

$$RU1 = Fx1 \quad \text{[Equation 33]}$$

$$RL1 = -fmax - Fx2 \quad \text{[Equation 34]}$$

In a case of left turning steering, the upper limiting value (hereinafter referred to as "left turning upper-limiting value") LU1 and the lower limiting value (hereinafter referred to as "left turning lower-limiting value") LL1 are set to values which exchange the upper limiting value for the lower limiting value in a case of the right turning steering. Thus, the following Equations 35 and 36 are established.

$$LU1 = fmax + Fx2 \quad \text{[Equation 35]}$$

$$LL1 = -Fx1 \quad \text{[Equation 36]}$$

The direction signal Sd that is outputted from the rack end approach judging section 210 is inputted into the control-output limiting section 170. When the direction signal Sd is "right turning", the rack axial force ff is limited by using the right turning upper-limiting value RU1 and the right turning lower-limiting value RL1. When the direction signal Sd is "left turning", the rack axial force ff is limited by using the left turning upper-limiting value LU1 and the left turning lower-limiting value LL1. The limited rack axial force ff is outputted to the converting section 102 as a rack axial force ffm.

In such a configuration, an operation example of the eighth example will be described with reference to flowcharts of FIGS. 32 and 33.

Figure 32:
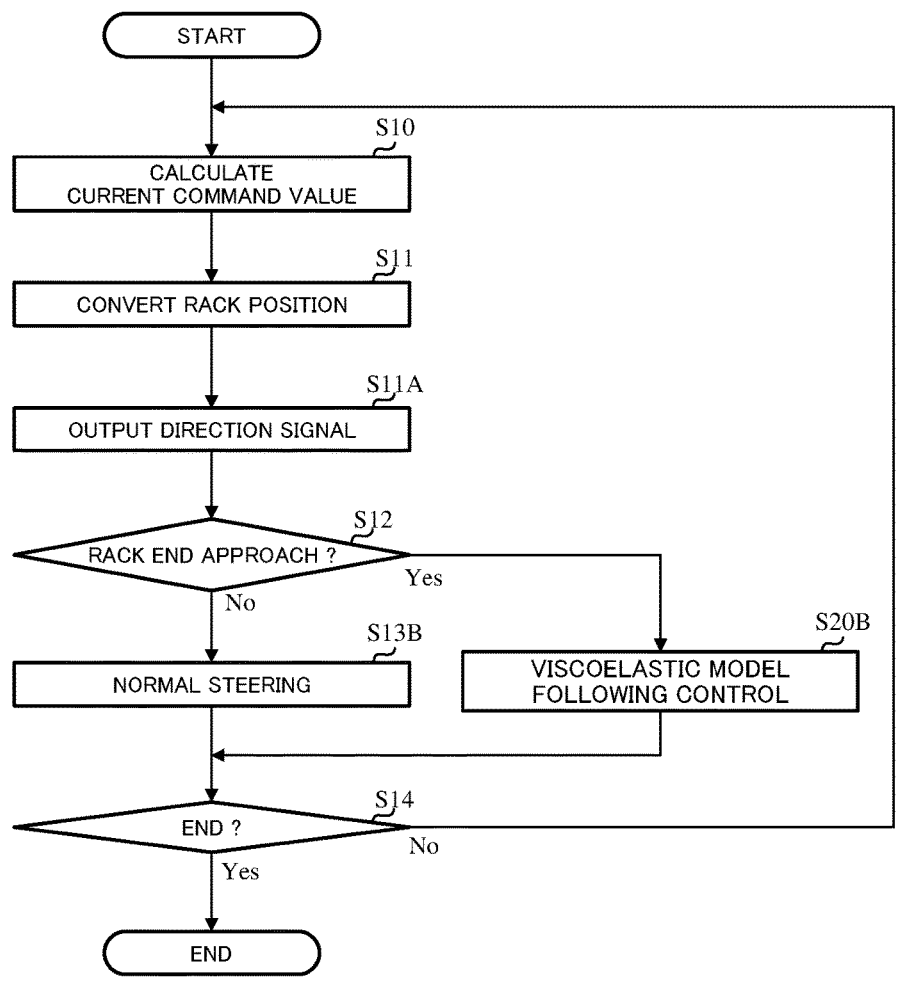
FIG. 32 is a flowchart showing an operation example (the eighth example) of the present invention.

An overall operating example is shown in a flowchart of FIG. 32. In comparison with the flowchart of FIG. 7, an output (Step S11A) of the direction signal Sd is added. Since the process at the control-output limiting section 170 is added in the normal steering (Step S13) and the viscoelastic model following control (Step S20), changes are arisen (Steps S13B and S20B).

At the Step S11A, the rack end approach judging section 210 judges the steering direction of the handle based on the inputted judgement rack position Rx, and outputs the judgement result (the right turning or the left turning) as the direction signal Sd to the control-output limiting section 170.

Figure 33:
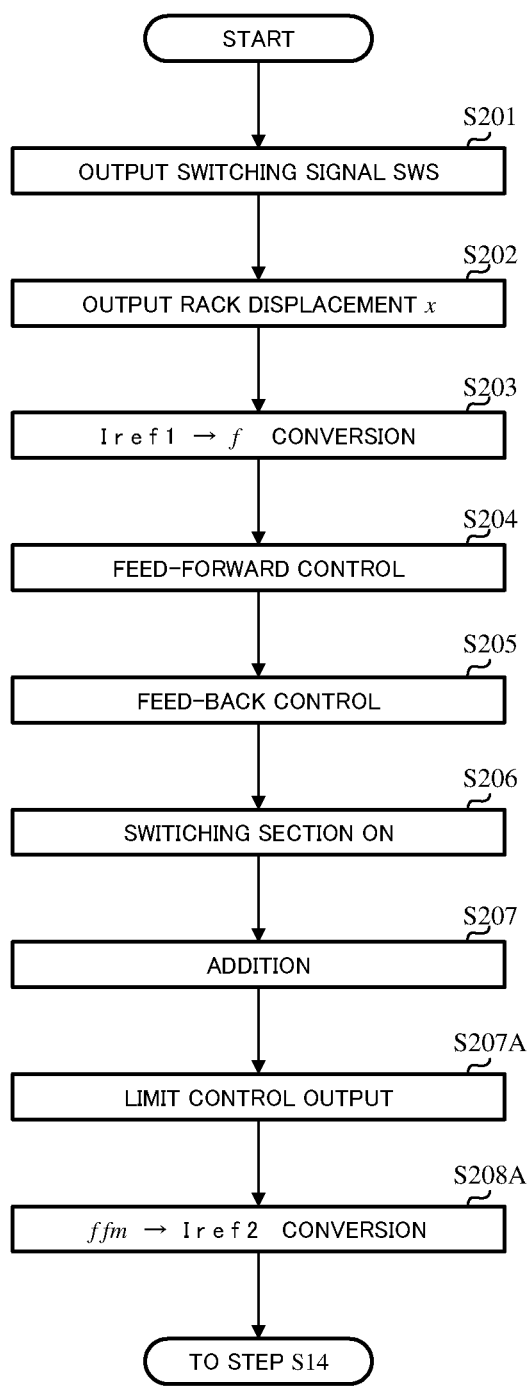
FIG. 33 is a flowchart showing an operation example (the eighth example) of the viscoelastic model following control section.

An operation example at the viscoelastic model following control (Step S20B) is shown in a flowchart of FIG. 33. In comparison with the flowchart of FIG. 8, a Step S207A is added. At the Step S207A, the rack axial force ff which is outputted from the viscoelastic model following control section 120 is limited based on the direction signal Sd which is outputted from the rack end approach judging section 210.

Figure 34:
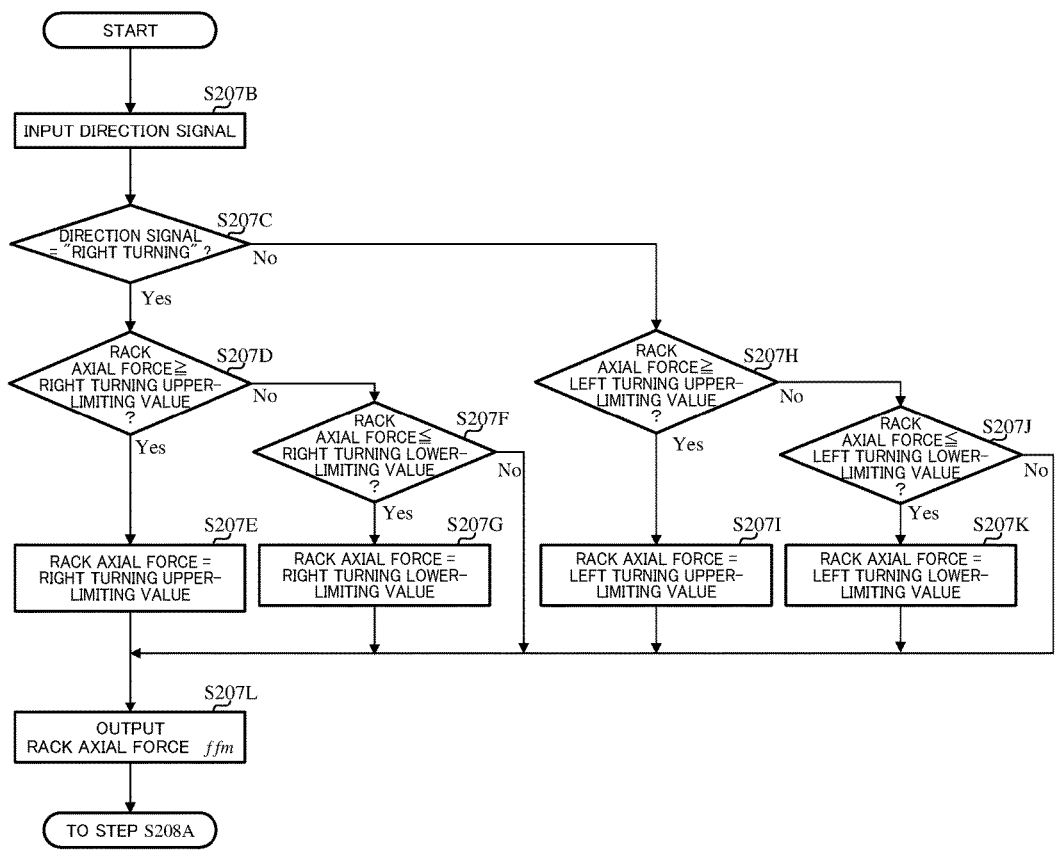
FIG. 34 is a flowchart showing an operation example (the eighth example) of a controlled output limiting section.

A detailed operation example of the Step S207A is shown in FIG. 34. The direction signal Sd is inputted into the control-output limiting section 170 (Step S207B). Then, in a case that the direction signal Sd is the "right turning" (Step S207C), if the rack axial force ff is the right turning upper-limiting value RU1 or more (Step S207D), the value of the rack axial force ff is set to the right turning upper-limiting value RU1 (Step S207E), if the rack axial force ff is the right turning lower-limiting value RL1 or less (Step S207F), the value of the rack axial force ff is set to the right turning lower-limiting value RL1 (Step S207G), and if the rack axial force ff is other values, the axial force ff is not changed. In a case that the direction signal Sd is the "left turning" (Step S207C), if the rack axial force ff is the left turning upper-limiting value LU1 or more (Step S207H), the value of the rack axial force ff is set to the left turning upper-limiting value LU1 (Step S207I), if the rack axial force ff is the left turning lower-limiting value LL1 or less (Step S207J), the value of the rack axial force ff is set to the left turning lower-limiting value LL1 (Step S207K), and if the rack axial force ff is other values, the axial force ff is not changed. The limited rack axial force ff is outputted as the rack axial force ffm (Step S207L), the rack axial force ffm is converted to the current command value Iref2 at the converting section 102 (Step S208A), and the current command value Iref2 is added to the current command value Iref1 at the adding section 103.

In a case of the normal steering (Step S13B), the rack axial force ff which is outputted from the viscoelastic model following control section 120 is limited in similar to the case of the viscoelastic model following control. However, since the value of the rack axial force ff in this case is zero, the rack axial force ff is directly outputted as the rack axial force ffm.

The left turning upper-limiting value and the left turning lower-limiting value are used the values that are respectively exchanged for the right turning upper-limiting value and the right turning lower-limiting value. However, the left turning upper-limiting value and the left turning lower-limiting value may not be used to exchange values, for example using different predetermined values. The same limiting values may be used in cases of the right turning steering and the left turning steering. In that case, since the direction signal Sd is not required, the judgement of the steering direction of the handle at the rack end approach judging section 210 and the switching operation by the direction signal Sd at the control-output limiting section 170 are also not needed.

The ninth example of the present invention will be described.

Although the limiting value to the rack axial force ff in the eighth example is a fixed value, in the ninth example, the limiting value is set based on the rack axial force f which is converted from the current command value Iref1. A more appropriate limiting value can be set by setting the limiting value based on the rack axial force f.

Figure 35:
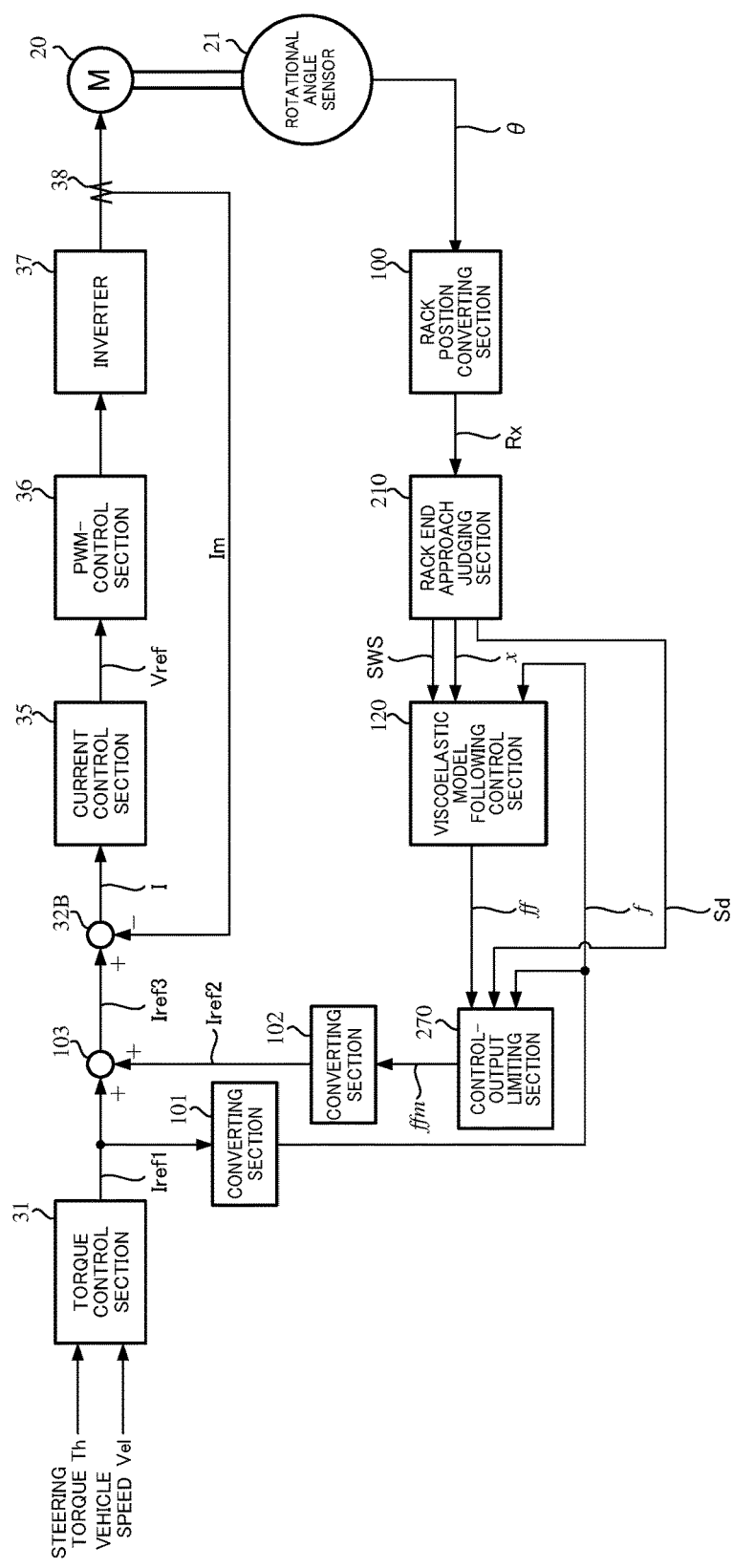
FIG. 35 is a block diagram showing a configuration example (the ninth example) of the present invention.

A configuration example of the ninth example is shown in FIG. 35. In comparison with the configuration example of the eighth example as shown in FIG. 31, the control-output limiting section 170 is replaced by a control-output limiting section 270. The rack axial force ff and the direction signal Sd other than the rack axial force f which is outputted from the converting section 101 are inputted into the control-output limiting section 270, and the control-output limiting section 270 limits the maximum value and the minimum value of the rack axial force ff based on the direction signal Sd and the rack axial force f. Concretely, for example, the right turning upper-limiting value RU2 is set to a value which adds a predetermined value Fx3 (for example, 2 [Nm]) to the rack axial force f as a following Equation 37, and the right turning lower-limiting value RL2 is set to a value which subtracts a predetermined value Fx4 (for example, 10 [Nm]) from a sign-inverted value of the rack axial force f as a following Equation 38.

$$RU2=f+Fx3 \quad \text{[Equation 37]}$$

$$RL2=-f-Fx4 \quad \text{[Equation 38]}$$

The left turning upper-limiting value LU2 and the left turning lower-limiting value LL2 are set to values which exchange the right turning upper-limiting value RU2 for the right turning lower-limiting value RL2 as following Equations 39 and 40.

$$LU2=-f+Fx4 \quad \text{[Equation 39]}$$

$$LL2=f-Fx3 \quad \text{[Equation 40]}$$

Figure 36:
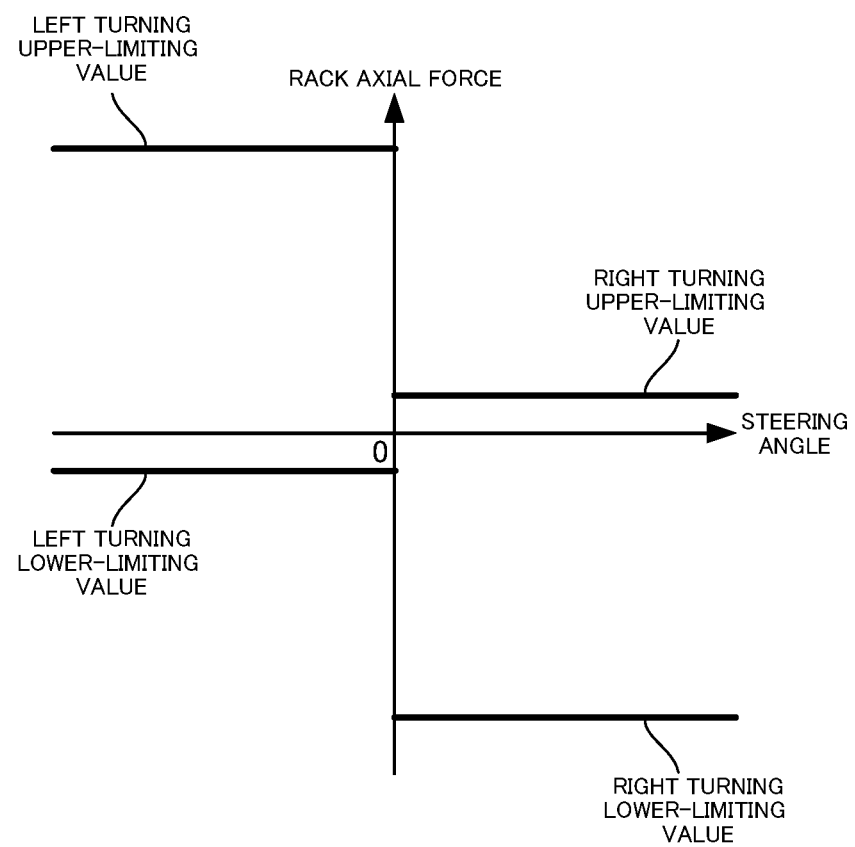
FIG. 36 is a diagram showing a varying example of a limiting value according to the eighth example.
Figure 37:
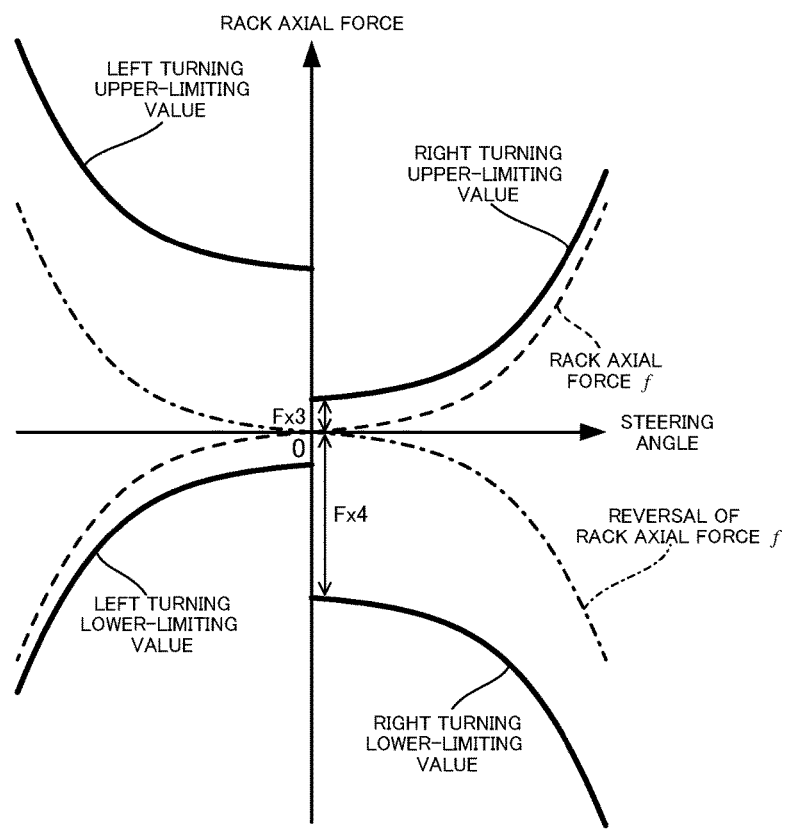
FIG. 37 is a diagram showing a varying example of the limiting value according to the ninth example.

For example, in a case that the rack axial force f varies to the steering angle as indicated by dotted lines in FIG. 37, although the limiting values of the eighth example are constant independent off the rack axial force f as shown in FIG. 36, the limiting values of the ninth example varies as indicated by solid lines in FIG. 37.

In such a configuration, an operation example of the ninth example will be described with reference to a flowchart of FIG. 38.

Figure 38:
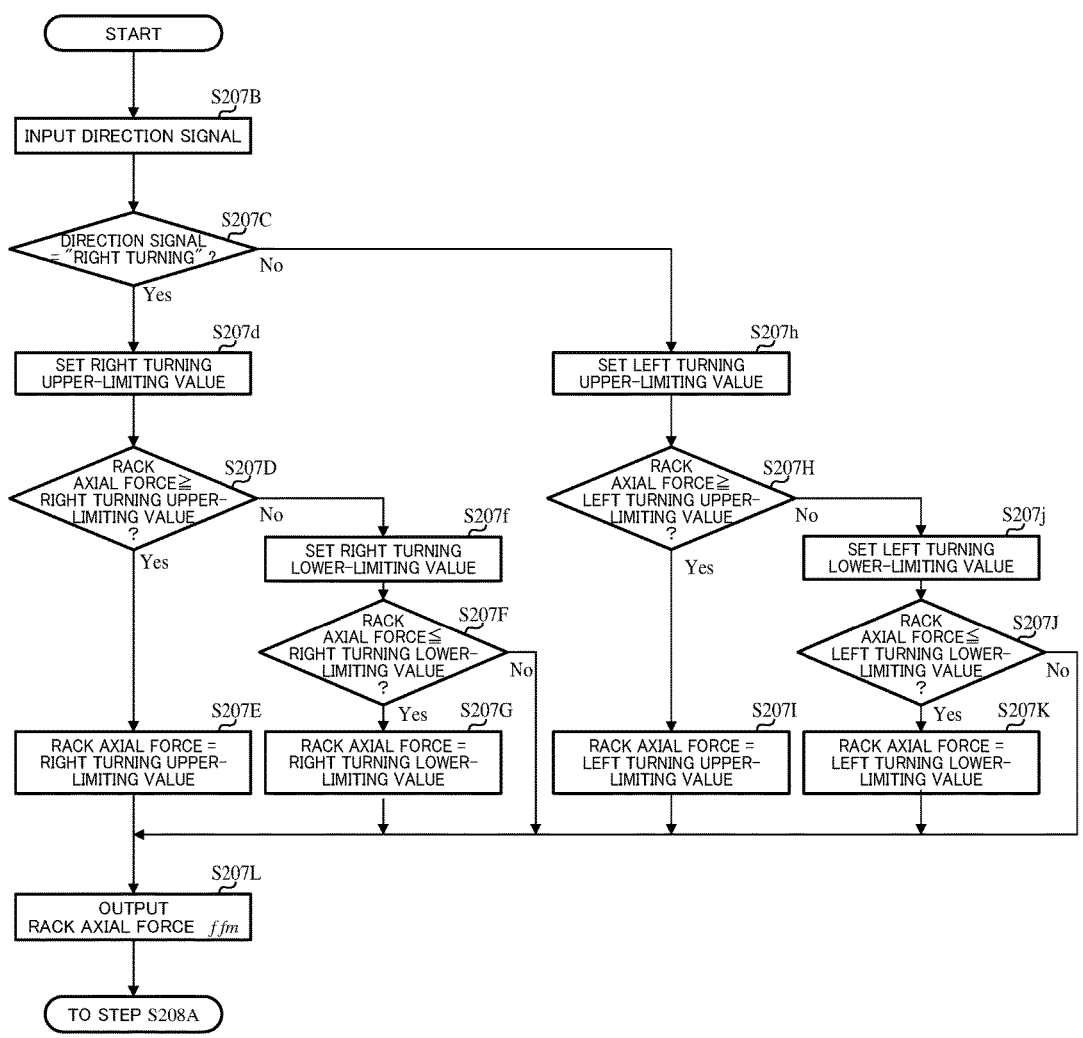
FIG. 38 is a flowchart showing an operation example (the ninth example) of the controlled output limiting section.

FIG. 38 is a flowchart showing an operation example of a control-output limiting section 270. In comparison with the operation example of the eighth example as shown in FIG. 34, respective limiting values are set based on the rack axial force f which is outputted from the converting section 101 before comparing the rack axial force ff, which is outputted from the viscoelastic model following control section 120, with the limiting value. That is, the right turning upper-limiting value RU2 is set by using the Equation 37 (Step S207d) before comparing the rack axial force ff with the right turning upper-limiting value RU2, the right turning lower-limiting value RL2 is set by using the Equation 38 (Step S207f) before comparing the rack axial force ff with the right turning lower-limiting value RL2, the left turning upper-limiting value LU2 is set by using the Equation 39 (Step S207h) before comparing the rack axial force ff with the left turning upper-limiting value LU2, and the left turning lower-limiting value LL2 is set by using the Equation 40 (Step S207j) before comparing the rack axial force ff with the left turning lower-limiting value LL2. Other operations are same with those of the eighth example.

As well, the predetermined values "Fx1" and "Fx2" which are used in the eighth example may be used as the predetermined values "Fx3" and "Fx4" which are used in the calculation of the limiting values. Further, the left turning upper-limiting value and the left turning lower-limiting value may not be used the values which the right turning upper-limiting value and the right turning lower-limiting value are exchanged in similar to the eighth example. The left turning upper-limiting value and the left turning lower-limiting value may not be used to exchange values, for example, by using different predetermined values. The same limiting values may be used in cases of the right turning steering and the left turning steering.

A tenth example of the present invention will be described.

In the tenth example, although the limiting values are set based on the rack axial force f in similar to the ninth example, in the torque that is more than or equal to the control amount which is further limited, the addition and subtraction of the predetermined values in calculations of the right turning lower-limiting value and the left turning upper-limiting value, are inverted so as to steer in the directions to the end in comparison with the ninth example. However, the right turning lower-limiting value is not larger than zero and the left turning upper-limiting value is not smaller than zero, such that the right turning upper-limiting value and the left turning lower-limiting value are not cross with the other limiting value of each turning direction.

Although a configuration example of the tenth example is basically same with that of the ninth example as shown in FIG. 35, an operation at the control-output limiting section is different. At the control-output limiting section, for example, aright turning upper-limiting value RU3 is set to add the rack axial force f to a predetermined value "Fx5" (for example, 2 [Nm]) as a following Equation 41, and a right turning lower-limiting value RL3 is set to add a sign-inverted value of the rack axial force f to a predetermined value "Fx6" (for example, 5 [Nm]) as a following Equation 42. When the right turning lower-limiting value RL3 is larger than zero, the right turning lower-limiting value RL3 is set to zero.

$$RU3=f+Fx5 \quad \text{[Equation 41]}$$

$$RL3=-f+Fx6 \quad \text{[Equation 42]}$$

A left turning upper-limiting value LU3 and a left turning lower-limiting value LL3 are set to values which exchange the right turning upper-limiting value RU3 for the right turning lower-limiting value RL3, and are expressed as Equations 43 and 44. When the left turning upper-limiting value LU3 is smaller than zero, the left turning upper-limiting value LU3 is set to zero.

$$LU3=-f-Fx6 \quad \text{[Equation 43]}$$

$$LL3=f-Fx5 \quad \text{[Equation 44]}$$

Figure 39:
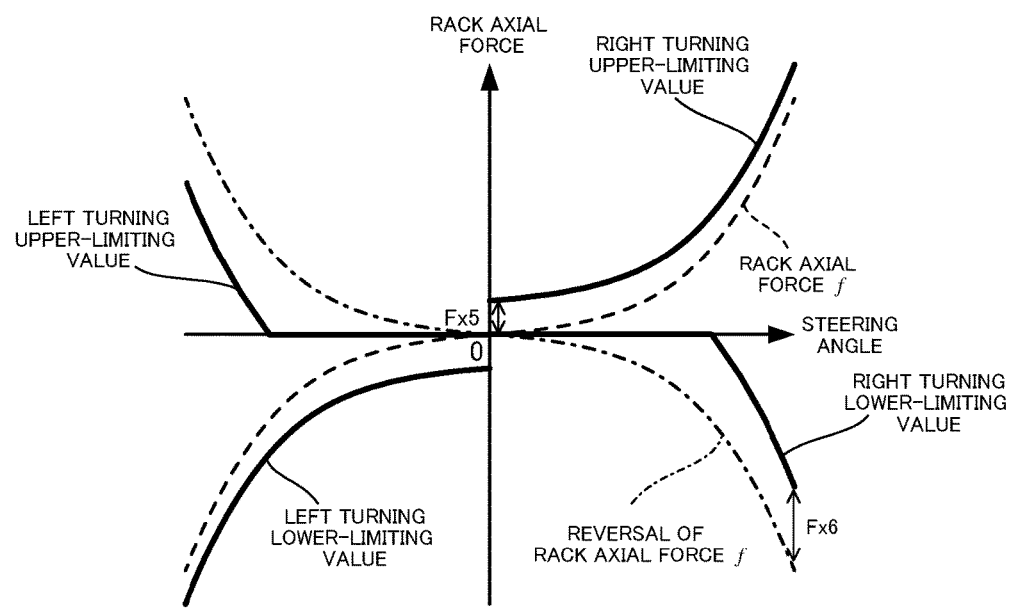
FIG. 39 is a diagram showing a varying example of the limiting value according to the tenth example.

For example, in a case that the rack axial force f varies to the steering angle as indicated by dotted lines in FIG. 39, the limiting values of the tenth example vary as indicated by solid lines in FIG. 39.

The operation of the tenth example at the control-output limiting section is only different from that of the ninth example as described above. Other operations are same with those of the ninth example.

As well, the predetermined values which are used in the eighth example and/or the ninth example may be used as the predetermined values "Fx5" and "Fx6" which are used in calculating the limiting values. Further, the left turning upper-limiting value and the left turning lower-limiting value may not be used the values which the right turning upper-limiting value and the right turning lower-limiting value are exchanged, and may not use the exchanged values, for example, by using different predetermined values.

An eleventh example of the present invention will be described.

In the eleventh example, the limiting values are set by the combination of setting methods of the limiting values in the eighth example and those of the ninth example. For example, the right turning upper-limiting value and the left turning lower-limiting value are set as the method of the eighth example, and the right turning lower-limiting value and the left turning upper-limiting value are set as the method of the ninth example. Then, the right turning upper-limiting value RU4, the right turning lower-limiting value RL4, the left turning upper-limiting value LU4 and the left turning lower-limiting value LL4 are set as following Equations 45 to 48.

$$RU4=Fx1 \quad \text{[Equation 45]}$$

$$RL4=-f-Fx4 \quad \text{[Equation 46]}$$

$$LU4=-f+Fx4 \quad \text{[Equation 47]}$$

$$LL4=-Fx1 \quad \text{[Equation 48]}$$

Figure 40:
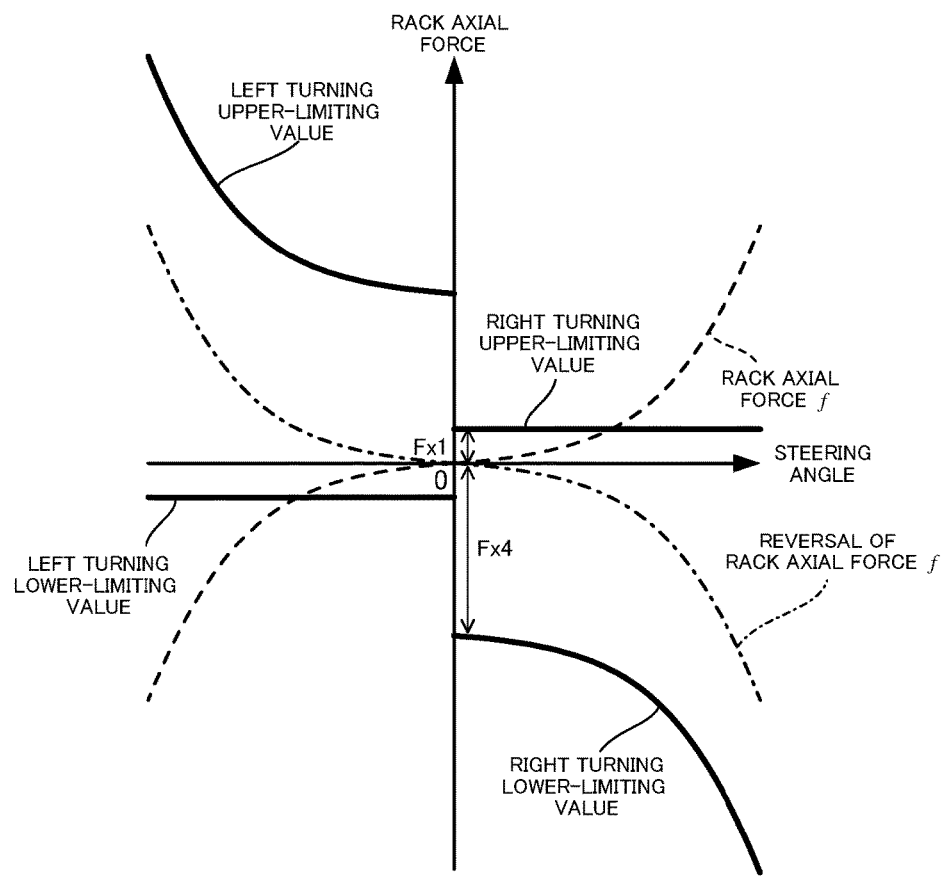
FIG. 40 is a diagram showing a varying example of the limiting value according to the eleventh example.

For example, in a case that the rack axial force f varies to the steering angle as shown by dotted lines in FIG. 40, the limiting values of the eleventh example vary as shown by solid lines in FIG. 40.

In the configuration examples and the operation examples of the eleventh example, only the operation of the eleventh example at the control-output limiting section is different from that of the ninth example as described above. Other configuration examples and other operation examples are same with those of the ninth example.

As well, as the combination of the setting methods of the limiting values, the right turning upper-limiting value and the left turning lower-limiting value may be set as described in the ninth example, and the right turning lower-limiting value and the left turning upper-limiting value may be set as described in the eighth example, as the above combination is alternated. The setting methods of the limiting values may be the combination of those of the eighth example and those of the tenth example.

A twelfth example of the present invention will be described.

Although the limiting values are set based on the rack axial force f in the ninth example to the eleventh example, the limiting values are changed by the steering speed in the twelfth example. Thereby, the strong control is performed so as to be a virtual rack end when the steering speed is high, and the control output is strongly limited so as to enhance the safety when the steering speed is low, resulting in enabling to take more flexible response.

Figure 41:
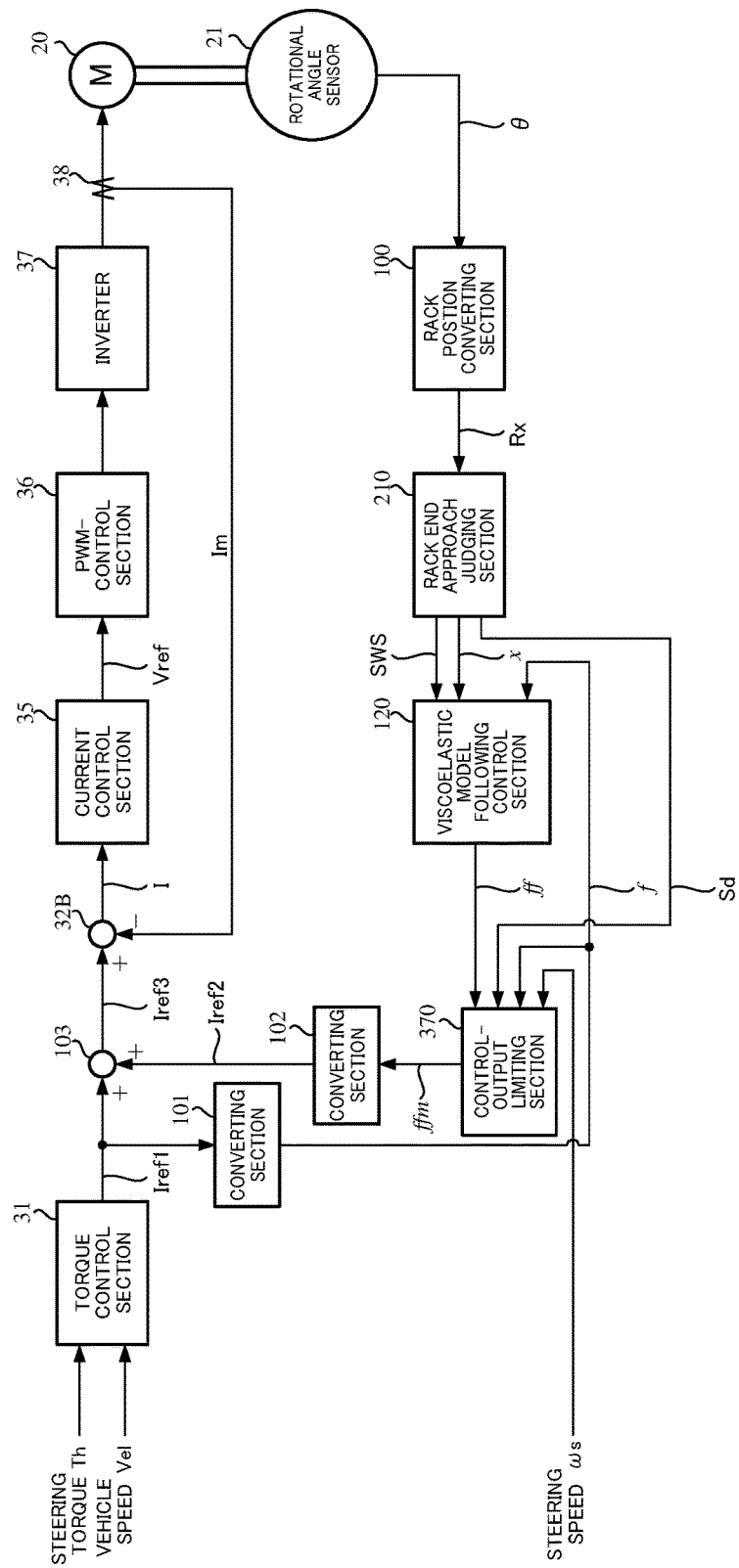
FIG. 41 is a block diagram showing a configuration example (the twelfth example) of the present invention.

FIG. 41 shows a configuration example of the twelfth example. In comparison with the configuration example of the ninth example shown in FIG. 35, a control-output limiting section 370 is provided in place of the control-output limiting section 270. The steering speed ωs other than the rack axial force ff, the direction signal Sd and the rack axial force f is inputted into the control-output limiting section 370.

When the steering speed is high, the control-output limiting section 370 sets the limiting values by the setting methods in the ninth example in order to strongly control the limiting values so as to become the virtual rack end, and on the contrary when the steering speed is low, the control-output limiting section 370 sets the limiting values by the setting methods in the tenth example which the control output is strongly limited. Further, in order to gradually perform the changes of the setting methods, limiting values which are set by the setting methods in the ninth and tenth examples are multiplied by respective gains, and the limiting values are obtained by adding the multiplied values.

Figure 42:
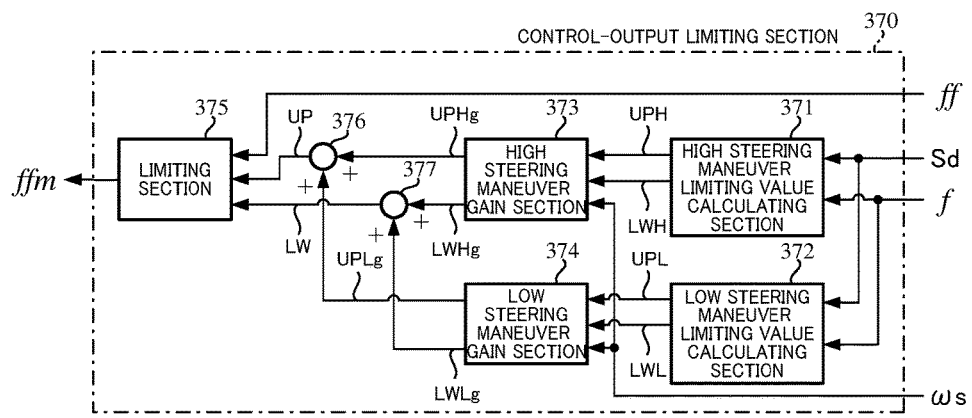
FIG. 42 is a block diagram showing a configuration example of the viscoelastic model following control section according to the twelfth example.

FIG. 42 shows a configuration example of the control-output limiting section 370. The control-output limiting section 370 comprises a high steering maneuver limiting value calculating section 371, a low steering maneuver limiting value calculating section 372, a high steering maneuver gain section 373, a low steering maneuver gain section 374, a limiting section 375 and adding sections 376 and 377.

The high steering maneuver limiting value calculating section 371 calculates an upper limiting value UPH and a lower limiting value LWH by using the setting methods in the ninth example and using the direction signal Sd and the rack axial force f. That is, when the direction signal Sd is "right turning", the right turning upper-limiting value RU2 (=f+Fx3), which is calculated from the Equation 37, is set as the upper limiting value UPH, and the right turning lower-limiting value RL2 (=−f−Fx4), which is calculated from the Equation 38, is set as the lower limiting value LWH. On the other hand, when the direction signal Sd is "left turning", the left turning upper-limiting value LU2 (=−f+Fx4), which is calculated from the Equation 39, is set as the upper limiting value UPH, and the left turning lower-limiting value LL2 (=f−Fx3), which is calculated from the Equation 40, is set as the lower limiting value LWH.

The low steering maneuver limiting value calculating section 372 calculates an upper limiting value UPL and a lower limiting value LWL by using the setting methods in the tenth example and using the direction signal Sd and the rack axial force f. That is, when the direction signal Sd is "right turning", the right turning upper-limiting value RU3 (=f+Fx5), which is calculated from the Equation 41, is set as the upper limiting value UPL, and the right turning lower-limiting value RL3 (=−f+Fx6), which is calculated from the Equation 42, is set as the lower limiting value LWL. When the lower limiting value LWL is more than zero, the lower limiting value LWL is set to zero. When the direction signal Sd is "left turning", the left turning upper-limiting value LU3 (=−f−Fx6), which is calculated from the Equation 43, is set as the upper limiting value UPL, and the left turning lower-limiting value LL3 (=f−Fx5), which is calculated from the Equation 44, is set as the lower limiting value LWL. When the upper limiting value UPL is smaller than zero, the upper limiting value UPL is set to zero.

Figure 43:
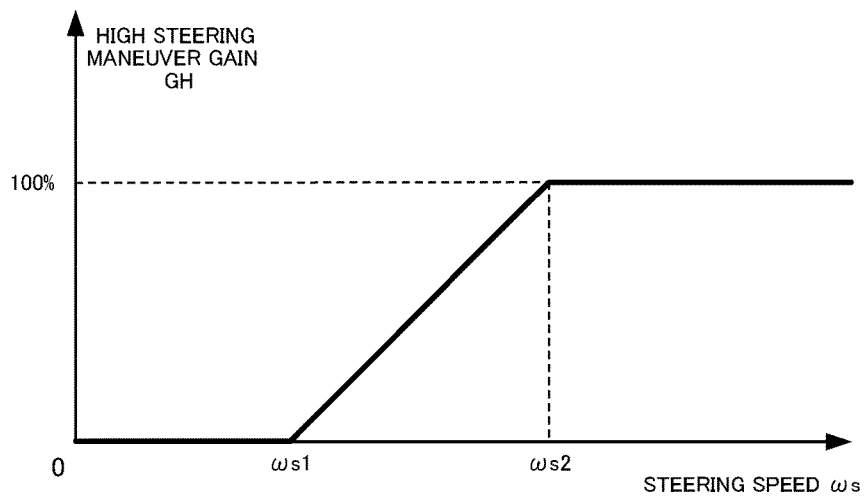
FIG. 43 is a diagram showing a characteristic example of a high steering maneuver gain to a steering speed.

The high steering maneuver gain section 373 calculates an upper limiting value UPHg and a lower limiting value LWHg by multiplying the upper limiting value UPH and the lower limiting value LWH by a high steering maneuver gain GH, which has a characteristic, for example, as shown in FIG. 43 corresponding; to the steering speed ωs, respectively. The characteristic of the high steering maneuver gain GH shown in FIG. 43 is 0% where the steering speed ωs is lower than a predetermined steering speed ωs1, linearly increases to the steering speed ωs where the steering speed ωs is between the predetermined steering speed ωs1 and a predetermined steering speed ωs2 (ωs2>ωs1), and is 100% where the steering speed ωs is more than the predetermined steering speed ωs2.

Figure 44:
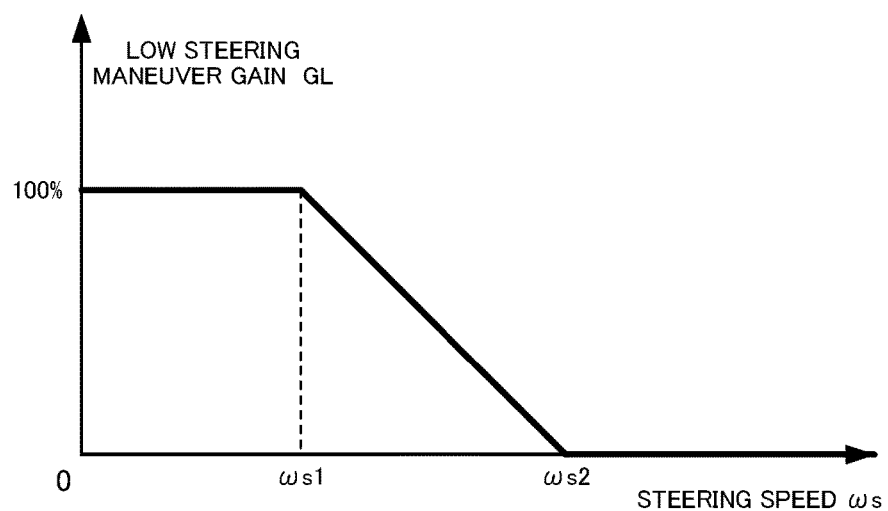
FIG. 44 is a diagram showing a characteristic example of a low steering maneuver gain to the steering speed.

The low steering maneuver gain section 374 calculates an upper limiting value UPLg and a lower limiting value LWLg by multiplying the upper limiting value UPL and the lower limiting value LWL by a low steering maneuver gain GL, which has a characteristic, for example, as shown in FIG. 44 corresponding; to the steering speed ωs, respectively. The characteristic of the low steering maneuver gain GL shown in FIG. 44 has a reverse characteristic of the high steering maneuver gain GH shown in FIG. 43.

The adding section 376 calculates an upper limiting value UP by adding the upper limiting value UPHg to the upper limiting value UPLg, and the adding section 377 calculates a lower limiting value LW by adding the lower limiting value LWHg to the lower limiting value LWLg.

The limiting section 375 limits the rack axial force ff by using the upper limiting value UP and the lower limiting value LW.

In such a configuration, an operation example of the twelfth example will be described with reference to a flowchart of FIG. 45.

Figure 45:
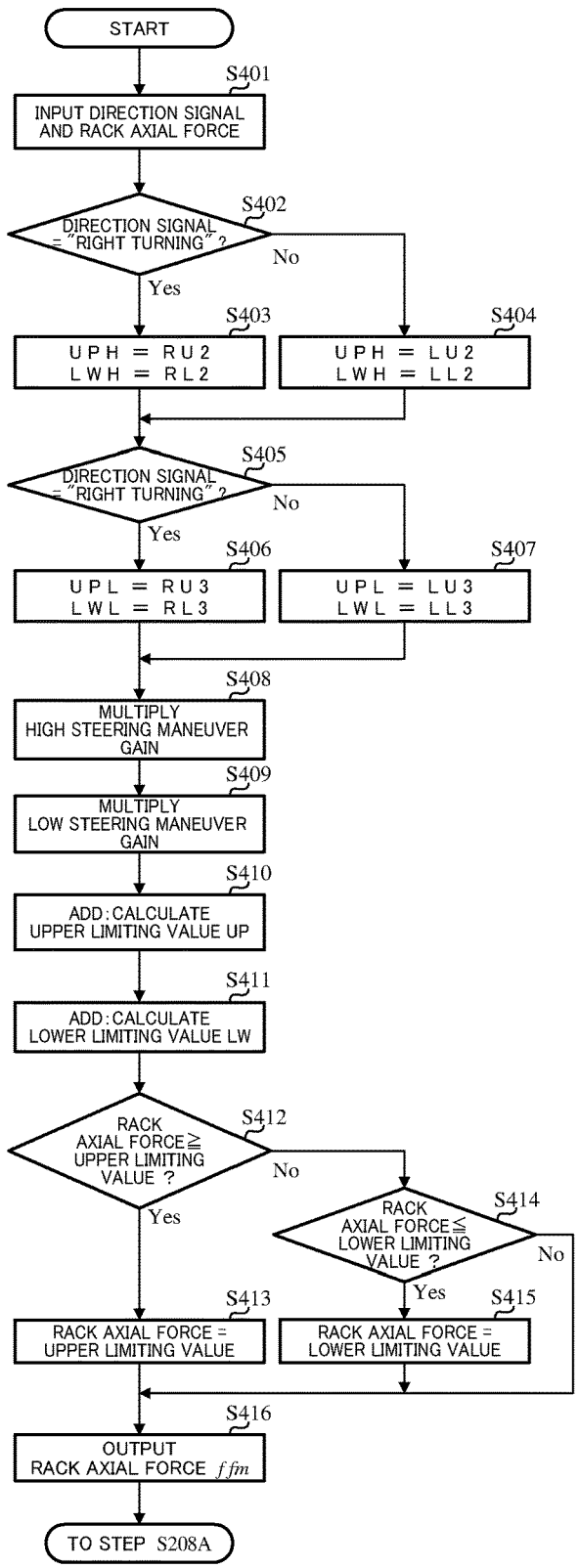
FIG. 45 is a flowchart showing an operation example (the twelfth example) of the controlled output limiting section.

FIG. 45 is a flowchart of the operation example of the control-output limiting section 370. Only the operation of the twelfth example at the control-output limiting section 370 is different from that of other examples, and other operations are same with the eighth example to the eleventh example.

The direction signal Sd which is outputted from the rack end approach judging section 210, and the rack axial force f which is outputted from the converting section 101 are inputted into the high steering maneuver limiting value calculating section 371 and the low steering maneuver limiting value calculating section 372 (Step S401).

The high steering maneuver limiting value calculating section 371 outputs the right turning upper-limiting value RU2 as the upper limiting value UPH, and the right turning lower-limiting value RL2 as the lower limiting value LWH (Step S403) when the direction signal Sd is "right steering" (Step S402). The high steering maneuver limiting value calculating section 371 outputs the left turning upper-limiting value LU2 as the upper limiting value UPH, and the left turning lower-limiting value LL2 as the lower limiting value LWH (Step S404) when the direction signal Sd is "left steering" (Step S402).

The low steering maneuver limiting value calculating section 372 outputs the right turning upper-limiting value RU3 as the upper limiting value UPL, and the right turning lower-limiting value RL3 as the lower limiting value LWL (Step S406) when the direction signal Sd is "right steering" (Step S405). The low steering maneuver limiting value calculating section 372 outputs the left turning upper-limiting value LU3 as the upper limiting value UPL, and the left turning lower-limiting value LL3 as the lower limiting value LWL (Step S407) when the direction signal Sd is "left steering" (Step S405). The order of the operation of the high steering maneuver limiting value calculating section 371 and the operation of the low steering maneuver limiting value calculating section 372 may be alternated, or the both operations may be performed in parallel.

The upper limiting value UPH, the lower limiting value LWH and the steering speed ωs are inputted into the high steering maneuver gain section 373. The high steering maneuver gain section 373 calculates the high steering maneuver gain GH corresponding to the steering speed ωs by using a characteristic shown in FIG. 43, respectively multiplies the upper limiting value UPH and the lower limiting value LWH by the high steering maneuver gain GH, and outputs the upper limiting value UPHg (=UPH× GH) and the lower limiting value LWHg (=LWH× GH) (Step S408).

The upper limiting value UPL, the lower limiting value LWL and the steering speed ωs are inputted into the low steering maneuver gain section 374. The low steering maneuver gain section 374 calculates the low steering maneuver gain GL corresponding to the steering speed ωs by using the characteristic shown in FIG. 44, respectively multiplies the upper limiting value UPL and the lower limiting value LWL by the low steering maneuver gain GL, and outputs the upper limiting value UPLg (=UPL× GL) and the lower limiting value LWLg (=LWL× GL) (Step S409). The order of the operation of the high steering maneuver gain section 373 and the operation of the low steering maneuver gain section 374 may be alternated, or the both operations may be performed in parallel.

The upper limiting values UPHg and UPLg are inputted into the adding section 376, and an added result is outputted as the upper limiting value UP (Step S410). The lower limiting values LWHg and LWLg are inputted into the adding section 377, and an added result is outputted as the lower limiting value LW (Step S411).

The upper limiting value UP and the lower limiting value LW, with the rack axial force ff outputted from the viscoelastic model following control section, are inputted into the limiting section 375. If the rack axial force ff is the upper limiting value UP or more (Step S412), the limiting section 375 sets the value of the rack axial force ff to the upper limiting value UP (Step S413). If the rack axial force ff is the lower limiting value LW or less (Step S414), the limiting section 375 sets the value of the rack axial force ff to the lower limiting value LW (Step S415). In other cases, the value of the rack axial force ff is not changed. The limited rack axial force ff is outputted as the rack axial force ffm (Step S416).

As well, the characteristics of the high steering maneuver gain GH and the low steering maneuver gain GL between the steering speeds ωs1 and ωs2 are not limited to linear characteristics as shown in FIGS. 43 and 44, and may be curved characteristics if a sum of the high steering maneuver gain GH and the low steering maneuver gain GL is 100%. Further, the limiting values at the high steering maneuver limiting value calculating section 371 and/or the low steering maneuver limiting value calculating section 372 may be set by the setting methods in the eighth example. In this case, the upper limiting value and the low limiting value are adjusted so as to become a virtual rack end by the strong control when the steering speed is high, and so as to enhance the safety by strongly limiting the control output when the steering speed is low.

A thirteenth example of the present invention will be described.

Although the limiting values are changed by the steering speed in the twelfth example, the limiting values are changed by the vehicle speed in the thirteenth example. For example, in a case of extremely low vehicle speed running including "the vehicle standstill", the strong control is performed so as to become a virtual rack end. When the vehicle speed is higher than a low running speed, the limiting values are gradually changed.

Figure 46:
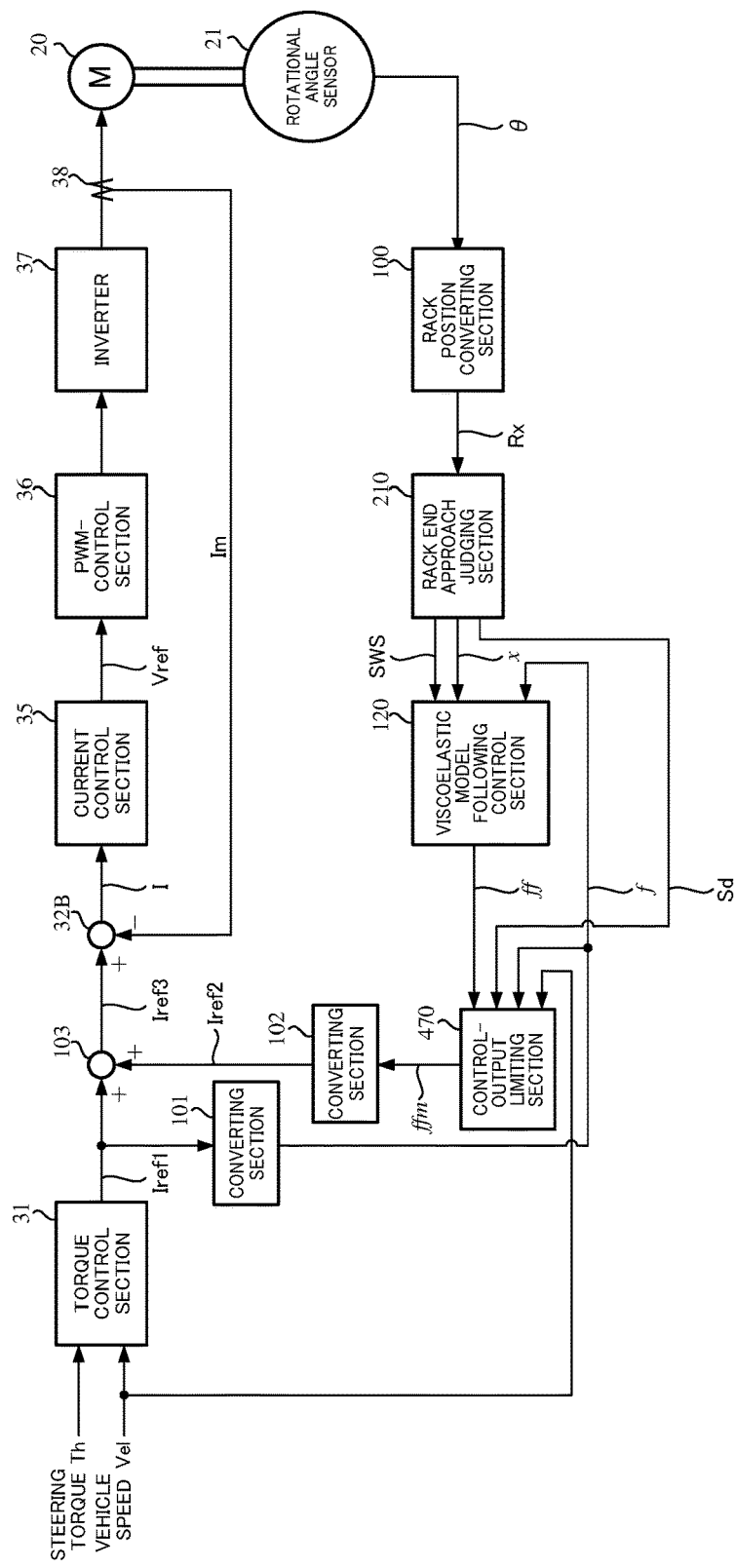
FIG. 46 is a block diagram showing a configuration example (the thirteenth example) of the present invention.

FIG. 46 shows a configuration example of the thirteenth example. In comparison with the configuration example of the twelfth example shown in FIG. 41, a control-output limiting section 470 is provided in place of the control-output limiting section 370. The vehicle speed Vel instead of the steering speed ωs is inputted into the control-output limiting section 470.

When the vehicle speed is low, the control-output limiting section 470 sets the limiting values by the setting methods in the ninth example so as to become the virtual rack end by a strongly control. When the vehicle speed is high, the control-output limiting section 470 sets the limiting values by the setting methods in the tenth example. Then, in order to gradually perform the change of the setting methods, the respective limiting values which are set by the setting methods in the ninth example and the tenth example are multiplied by the gains, and the values which add the multiplied values are set as the limiting values.

Figure 47:
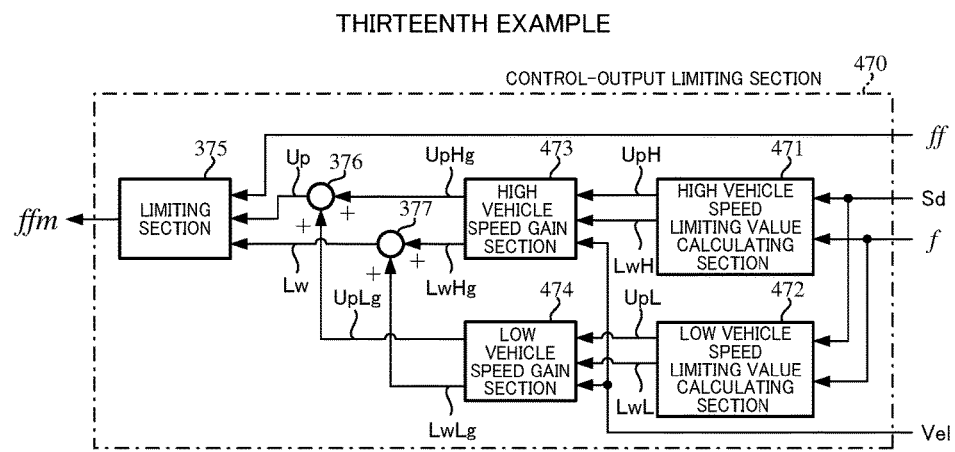
FIG. 47 is a block diagram showing a configuration example of the controlled output limiting section according to the thirteenth example.

FIG. 47 shows a configuration example of the control-output limiting section 470. The control-output limiting section 470 comprises a high vehicle speed limiting value calculating section 471, a low vehicle speed limiting value calculating section 472, a high vehicle speed gain section 473, a low vehicle speed gain section 474, a control section 375 and adding sections 376 and 377. Since the control section 375 and the adding sections 376 and 377 are the same configurations and the same operations as those of the twelfth examples, the explanations are omitted.

The high vehicle speed limiting value calculating section 471 calculates an upper limiting value UpH and a lower limiting value LwH by the setting method in the tenth example using the direction signal Sd and the rack axial force f in similar to the low steering maneuver limiting value calculating section 372 in the twelfth example.

The low vehicle speed limiting value calculating section 472 calculates an upper limiting value UpL and a lower limiting value LwL by the setting method in the ninth example using the direction signal Sd and the rack axial force f in similar to the high steering maneuver limiting value calculating section 371 in the eleventh example.

Figure 48:
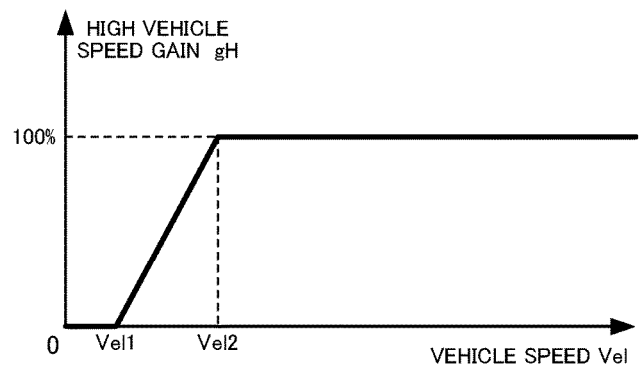
FIG. 48 is a diagram showing a characteristic example of a high vehicle speed gain to a vehicle speed.

The high vehicle speed gain section 473 calculates an upper limiting value UpHg and a lower limiting value LwHg by multiplying the upper limiting value UpH and the lower limiting value LwH by a high vehicle speed gain gH, which has a characteristic, for example, as shown in FIG. 48 corresponding to the vehicle speed Vel, respectively. The characteristic of the high vehicle speed gain gH shown in FIG. 48 is 0% where the vehicle speed Vel is lower than a predetermined vehicle speed Vel1, linearly increases to the vehicle speed Vel where the vehicle speed Vel is between the predetermined vehicle speed yell and a predetermined vehicle speed Vel2 (Vel2>Vel1), and is 100% where the vehicle speed Vel is more than the predetermined vehicle speed Vel2.

Figure 49:
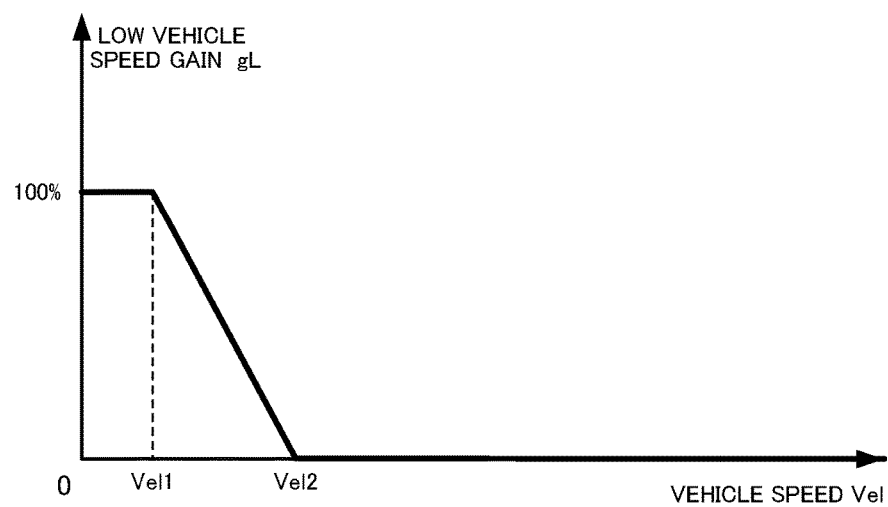
FIG. 49 is a diagram showing a characteristic example of a low vehicle speed gain to the vehicle speed.

The low vehicle speed gain section 474 calculates an upper limiting value UpLg and a lower limiting value LwLg by multiplying the upper limiting value UpL and the lower limiting value LwL by a low vehicle speed gain gL, which has a characteristic, for example, as shown in FIG. 49 corresponding to the vehicle speed Vel, respectively. The characteristic of the low vehicle speed gain gL shown in FIG. 49 has a reverse characteristic of the high speed maneuver gain gH shown in FIG. 48.

In such a configuration, an operation example of the thirteenth example will be described with reference to a flowchart of FIG. 50.

Figure 50:
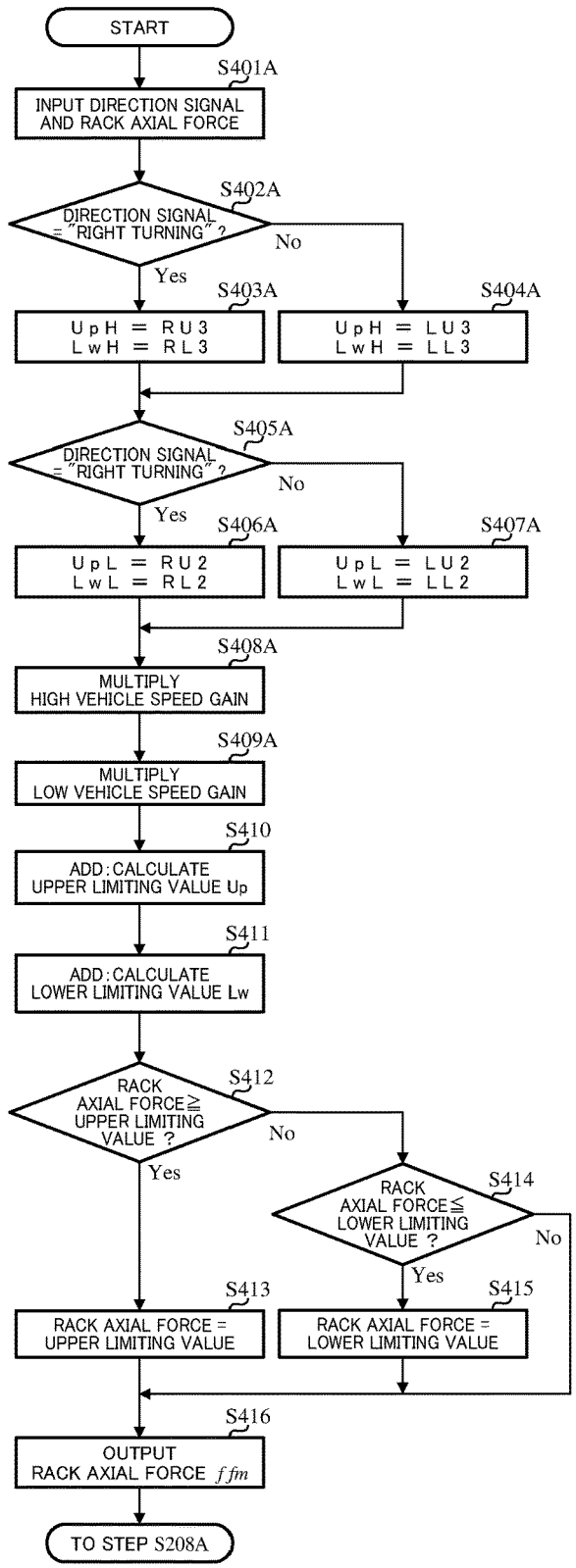
FIG. 50 is a flowchart showing an operation example (the thirteenth example) of the control amount limiting section.

FIG. 50 is a flowchart of the operation example of the control-output limiting section 470. Only the operation of the thirteenth example at the control-output limiting section 470 is different from that of other examples. Other operations are same with the twelfth example.

The direction signal Sd and the rack axial force f are inputted into the high vehicle speed limiting value calculating section 471 and the low vehicle speed limiting value calculating section 472 (Step S401A).

The high vehicle speed limiting value calculating section 471 outputs the right turning upper-limiting value RU3 as the upper limiting value UpH, and the right turning lower-limiting value RL3 as the lower limiting value LwH (Step S403A) when the direction signal Sd is "right steering" (Step S402A). The high vehicle speed limiting value calculating section 471 outputs the left turning upper-limiting value LU3 as the upper limiting value UpH, and the left turning lower-limiting value LL3 as the lower limiting value LwH (Step S404A) when the direction signal Sd is "left steering" (Step S402A).

The low vehicle speed limiting value calculating section 472 outputs the right turning upper-limiting value RU2 as the upper limiting value UpL, and the right turning lower-limiting value RL2 as the lower limiting value LwL (Step S406A) when the direction signal Sd is "right steering" (Step S405A). The low vehicle speed limiting value calculating section 472 outputs the left turning upper-limiting value LU2 as the upper limiting value UpL, and the left turning lower-limiting value LL2 as the lower limiting value LwL (Step S407A) when the direction signal Sd is "left steering" (Step S405A). The order of the operation of the high vehicle speed limiting value calculating section 471 and the operation of the low vehicle speed limiting value calculating section 472 may be alternated, or the both operations may be performed in parallel.

The upper limiting value UpH, the lower limiting value LwH and the vehicle speed Vel are inputted into the high vehicle speed gain section 473. The high vehicle speed gain section 473 calculates the high vehicle speed gain gH corresponding to the vehicle speed Vel by using the characteristic shown in FIG. 48, respectively multiplies the upper limiting value UpH and the lower limiting value LwH by the high vehicle speed gain gH, and outputs the upper limiting value UpHg (=UpH× gH) and the lower limiting value LwHg (=LwH× gH) (Step S408A).

The upper limiting value UpL, the lower limiting value LwL and the vehicle speed Vel are inputted into the low vehicle speed gain section 474. The low vehicle speed gain section 474 calculates the low vehicle speed gain gL corresponding to the vehicle speed Vel by using the characteristic shown in FIG. 49, and respectively multiplies the upper limiting value UpL and the lower limiting value LwL by the low vehicle speed gain gL, and outputs the upper limiting value UpLg (=UpL×gL) and the lower limiting value LwLg (=LwL×gL) (Step S409A). The order of the operation of the high vehicle speed gain section 473 and the operation of the low vehicle speed gain section 474 may be alternated, or the both operations may be performed in parallel.

Thereafter, the upper limiting value Up and the lower limiting value Lw are calculated from the upper limiting values UpHg and UpLg, and the lower limiting values LwHg and LwLg via the adding sections 376 and 377, in similar to the operation in the twelfth example (Steps S410 and S411). The rack axial force ffm is outputted from the upper limiting value Up, the lower limiting value Lw, and the rack axial force ff via the control section 375 (Steps S412 to S416).

As well, the characteristics of the high vehicle speed gain gH and the low vehicle speed gain gL between the vehicle speeds Vel1 and Vel2 are not limited to linear characteristics as shown in FIGS. 48 and 49, and may be curved characteristics if a sum of the high vehicle speed gain gH and the low vehicle speed gain gL is 100%. The limiting values at the high vehicle speed limiting value calculating section 471 and/or the low vehicle speed limiting value calculating section 472 may be set by the setting methods in the eighth example.

EXPLANATION OF REFERENCE NUMERALS 1 handle
2 column shaft (steering shaft, handle shaft)
10 torque sensor
12 vehicle speed sensor
13 battery 14 steering angle sensor
20 motor
21 rotational angle sensor
30 control unit (ECU)
31 torque control section
35 current control section
36 PWM-control section
100 rack position converting section
110, 210 rack end approach judging section
120, 220, 320 viscoelastic model following control section
121, 122 switching section
124 parameter setting section
130 feed-forward control section
140, 240 feed-back control section
150 rack displacement speed calculating section
160, 260 overheat protection control section
170, 270, 370, 470 control-output limiting section
250 motor rotational speed calculating section
371 high steering maneuver limiting value calculating section
372 low steering maneuver limiting value calculating section
373 high steering maneuver gain section
374 low steering maneuver gain section
375 limiting section
471 high vehicle speed limiting value calculating section
472 low vehicle speed limiting value calculating section
473 high vehicle speed gain section
474 low vehicle speed gain section

The invention claimed is:
1. An electric power steering apparatus comprising:
an electronic control unit (ECU) that calculates a first current command value based on at least a steering torque and performs an assist-control of a steering system by driving a motor based on said first current command value,
wherein said ECU is further configured to:
convert said first current command value to a first rack axial force;
convert a rotational angle of said motor to a judgment rack position;
judge that a steering approaches to a rack end based on said judgment rack position and to output a rack displacement and a switching signal;
generate, with a configuration of a model following control, a second rack axial force including a viscoelastic model as a reference model based on said first rack axial force, said rack displacement, and said switching signal;
convert said second rack axial force to a second current command value; and
calculate an offset, which is subtracted from said first rack axial force or an output of said viscoelastic model, based on vehicle state information;
wherein said generating of said second rack axial force by said ECU comprises:
outputting a third rack axial force by feed-forward controlling based on said first rack axial force;
outputting a fourth rack axial force by feed-back controlling based on said rack displacement and said first rack axial force;
switching-ON or -OFF an output of said third rack axial force by said switching signal;
switching-ON or -OFF an output of said fourth rack axial force by said switching signal; and
outputting said second rack axial force by adding said switched-ON or -OFF outputs of said third rack axial force and said fourth rack axial force; and
wherein said assist-control is performed based on a third current command value obtained by adding said second current command value to said first current command value so as to suppress a rack end hitting.

2. The electric power steering apparatus according to claim 1, wherein parameters of said feed-forward controlling and said feed-back controlling are changed corresponding to said rack displacement.

3. The electric power steering apparatus according to claim 1, wherein said vehicle state information includes at least said third current command value, said steering torque and a motor rotational speed or a rack displacement speed, and said offset is calculated when a state that at least said third current command value is larger than a predetermined current command value, said steering torque is larger than a predetermined steering torque value, and said motor rotational speed or said rack displacement speed is lower than a predetermined value, is continued.

4. The electric power steering apparatus according to claim 3, wherein said offset is updated to gradually increase from a calculation starting time.

5. The electric power steering apparatus according to claim 4, wherein when said offset is larger than a predetermined upper limiting value, said predetermined upper limiting value is set as said offset.

6. The electric power steering apparatus according to claim 4, wherein said offset at a time when said third current command value is smaller than a predetermined lower limiting value is memorized as an upper limiting offset, and said upper limiting offset is set as said offset during said third current command value is smaller than said predetermined lower limiting value.

7. The electric power steering apparatus according to claim 4, wherein an update of said offset is stopped when said steering torque is said predetermined steering torque value or less, or said motor rotational speed or said rack displacement speed is said predetermined value or more.

8. The electric power steering apparatus according to claim 3, wherein said offset is reset to zero when a steering position is out of a predetermined angle at front of said rack end.

9. The electric power steering apparatus according to claim 1, wherein said first rack axial force, said second rack axial force, said third rack axial force and said fourth rack axial force are equivalent to a first column axial torque, a second column axial torque, a third column axial torque and a fourth column axial torque, respectively.

10. An electric power steering apparatus comprising:
an electronic control unit (ECU) that calculates a first current command value based on at least a steering torque and performs an assist-control of a steering system by driving a motor based on said first current command value,
wherein said ECU is further configured to:
convert said first current command value to a first rack axial force;
convert a rotational angle of said motor to a judgment rack position;
judge that a steering approaches to a rack end based on said judgment rack position and to output a rack displacement and a switching signal;
generate, with a configuration of a model following control, a second rack axial force including a viscoelastic model as a reference model based on said first rack axial force, said rack displacement, and said switching signal;
convert said second rack axial force to a second current command value; and
calculate an offset, which is subtracted from said first rack axial force or an output of said viscoelastic model, based on vehicle state information;
wherein said generating of said second rack axial force by said ECU comprises:
outputting a third rack axial force by feed-forward controlling based on said rack displacement;
outputting a fourth rack axial force by feed-back controlling based on said rack displacement and said first rack axial force;
switching-ON or -OFF an output of said third rack axial force by said switching signal;
switching-ON or -OFF an output of said fourth rack axial force by said switching signal; and
outputting said second rack axial force by adding said switched-ON or -OFF outputs of said third rack axial force and said fourth rack axial force; and
wherein said assist-control is performed based on a third current command value obtained by adding said second current command value to said first current command value so as to suppress a rack end hitting.

11. The electric power steering apparatus according to claim 10, wherein parameters of said feed-forward controlling and said feed-back controlling are changed corresponding to said rack displacement.

12. The electric power steering apparatus according to claim 10, wherein said vehicle state information includes at least said third current command value, said steering torque and a motor rotational speed or a rack displacement speed, and said offset is calculated when a state that at least said third current command value is larger than a predetermined current command value, said steering torque is larger than a predetermined steering torque value, and said motor rotational speed or said rack displacement speed is lower than a predetermined value, is continued.

13. The electric power steering apparatus according to claim 12, wherein said offset is updated to gradually increase from a calculation starting time.

14. The electric power steering apparatus according to claim 13, wherein when said offset is larger than a predetermined upper limiting value, said predetermined upper limiting value is set as said offset.

15. The electric power steering apparatus according to claim 13, wherein said offset at a time when said third current command value is smaller than a predetermined lower limiting value is memorized as an upper limiting offset, and said upper limiting offset is set as said offset during said third current command value is smaller than said predetermined lower limiting value.

16. The electric power steering apparatus according to claim 13, wherein an update of said offset is stopped when said steering torque is said predetermined steering torque value or less, or said motor rotational speed or said rack displacement speed is said predetermined value or more.

17. The electric power steering apparatus according to claim 12, wherein said offset is reset to zero when a steering position is out of a predetermined angle at front of said rack end.

18. The electric power steering apparatus according to claim 10, wherein said first rack axial force, said second rack axial force, said third rack axial force and said fourth rack axial force are equivalent to a first column axial torque, a second column axial torque, a third column axial torque and a fourth column axial torque, respectively.

19. An electric power steering apparatus comprising:
an electronic control unit (ECU) that calculates a first current command value based on at least a steering torque and performs an assist-control of a steering system by driving a motor based on said first current command value, comprising:
a configuration of a model following control including a viscoelastic model as a reference model within a predetermined angle at front of a rack end;
wherein said ECU is further configured to:
convert said first current command value to a first rack axial force;
convert a rotational angle of said motor to a judgment rack position;
judge that a steering approaches to a rack end based on said judgment rack position and to output a rack displacement and a switching signal;
generate, with a configuration of said model following control, a second rack axial force including said viscoelastic model based on said first rack axial force, said rack displacement, and said switching signal;
limit said second rack axial force by setting different upper limiting value and lower limiting value corresponding to a steering direction for said second rack axial force; and
convert said limited second rack axial force to a second current command value, and
wherein said assist-control is performed based on a third current command value corrected by adding said second current command value to said first current command value so as to suppress a rack end hitting.

20. The electric power steering apparatus according to claim 19, wherein said configuration of said model following control is a feed-back controlling.

21. The electric power steering apparatus according to claim 19, wherein said configuration of said model following control is a feed-forward controlling.

22. The electric power steering apparatus according to claim 19, wherein said configuration of said model following control is a feed-forward controlling and a feed-back controlling.

23. The electric power steering apparatus according to claim 19, wherein parameters of said reference model are changeable based on a rack displacement.

24. The electric power steering apparatus according to claim 19, wherein said generating of said second rack axial force comprises:
outputting a third rack axial force by feed-forward controlling based on said first rack axial force or said rack displacement;
outputting a fourth rack axial force by feed-back controlling based on said rack displacement and said first rack axial force;
switching-ON or -OFF an output of said third rack axial force by said switching signal;
switching-ON or -OFF an output of said fourth rack axial force by said switching signal; and
outputting said second rack axial force by adding said switched-ON or -OFF outputs of said third rack axial force and said fourth rack axial force.

25. The electric power steering apparatus according to claim 24, wherein parameters of said feed-forward controlling and said feed-back controlling are changed corresponding to said rack displacement.

26. The electric power steering apparatus according to claim 19, wherein said upper limiting value and said lower limiting value are set based on said first rack axial force.

27. The electric power steering apparatus according to claim 19, wherein said upper limiting value and said lower limiting value are changed according to a steering speed.

28. The electric power steering apparatus according to claim 27, wherein, in a change according to said steering speed, said upper limiting value and said lower limiting value are gradually changed to a change of said steering speed.

29. The electric power steering apparatus according to claim 19, wherein said upper limiting value and said lower limiting value are changed according to a vehicle speed.

30. The electric power steering apparatus according to claim 29, wherein, in a change according to said vehicle speed, said upper limiting value and said lower limiting value are gradually changed to a change of said vehicle speed.

31. The electric power steering apparatus according to claim 19, wherein said first rack axial force and said second rack axial force are equivalent to a first column axial torque and a second column axial torque, respectively.

* * * * *